(12) United States Patent
Tsuchiyama et al.

(10) Patent No.: US 9,926,730 B2
(45) Date of Patent: Mar. 27, 2018

(54) PANEL BODY

(71) Applicant: OKAMURA CORPORATION, Kanagawa (JP)

(72) Inventors: Waku Tsuchiyama, Yokohama (JP); Haruhiko Kitajima, Yokohama (JP); Masayuki Kuroe, Yokohama (JP)

(73) Assignee: OKAMURA CORPORATION, Kanagawa (JP)

( * ) Notice: Subject to any disclaimer, the term of this patent is extended or adjusted under 35 U.S.C. 154(b) by 0 days.

(21) Appl. No.: 15/032,608

(22) PCT Filed: Oct. 31, 2014

(86) PCT No.: PCT/JP2014/079121
§ 371 (c)(1),
(2) Date: Apr. 27, 2016

(87) PCT Pub. No.: WO2015/064755
PCT Pub. Date: May 7, 2015

(65) Prior Publication Data
US 2016/0245005 A1     Aug. 25, 2016

(30) Foreign Application Priority Data

Nov. 1, 2013  (JP) ................................. 2013-228256
Nov. 1, 2013  (JP) ................................. 2013-228257
(Continued)

(51) Int. Cl.
*E04F 17/08*     (2006.01)
*E05D 15/06*     (2006.01)
(Continued)

(52) U.S. Cl.
CPC .............. *E05D 15/06* (2013.01); *A47B 13/02* (2013.01); *A47B 83/00* (2013.01); *A47B 83/001* (2013.01);
(Continued)

(58) Field of Classification Search
CPC ....... A47B 83/001; A47B 83/00; A47B 13/02; A47B 96/04; E04B 2/7425; E04B 2/7409;
(Continued)

(56) References Cited

U.S. PATENT DOCUMENTS 2,262,426 A * 11/1941 Hall .................... B60R 13/0206
                                                    52/511
4,862,659 A *  9/1989 Wilson .................. E04B 2/7422
                                                    174/499
(Continued)

FOREIGN PATENT DOCUMENTS

CA          1075424 A      4/1980
CN       201671206 U     12/2010
(Continued)

OTHER PUBLICATIONS

Office Action dated Feb. 23, 2017 of the Chinese Patent Application No. 201480059158.4.
(Continued)

*Primary Examiner* — Katherine W Mitchell
*Assistant Examiner* — Abe Massad
(74) *Attorney, Agent, or Firm* — Nixon Peabody LLP; Jeffrey L. Costellia

(57) ABSTRACT

A panel body (11) includes: a panel-like base material (12); a groove (25) which is continuous along at least a part of an outer circumferential end portion of the base material (12), and is recessed to the inside of the base material (12); a soft material (13) which is provided on one or more surface of the base material (12); a cover material (14) which covers
(Continued)

the base material (12) and the soft material (13), and in which the outer circumferential end portion is caught in the groove (25) in the outer circumferential edge portion of the base material (12); and a fixing member (30) which fixes the cover material (14) in the groove (25).

14 Claims, 35 Drawing Sheets

(30) Foreign Application Priority Data

| Nov. 1, 2013 | (JP) | 2013-228260 |
|---|---|---|
| Nov. 1, 2013 | (JP) | 2013-228261 |
| Nov. 1, 2013 | (JP) | 2013-228264 |

(51) Int. Cl.
| | | |
|---|---|---|
| *A47G 5/00* | (2006.01) | |
| *E04B 2/74* | (2006.01) | |
| *A47B 13/02* | (2006.01) | |
| *A47B 83/00* | (2006.01) | |
| *A47C 7/40* | (2006.01) | |

(52) U.S. Cl.
CPC ............ *A47C 7/40* (2013.01); *A47G 5/00* (2013.01); *E04B 2/7409* (2013.01); *E04B 2/7425* (2013.01); *E04B 2002/749* (2013.01); *E04B 2002/7479* (2013.01); *E04B 2002/7483* (2013.01)

(58) Field of Classification Search
CPC ....... E04B 2002/749; E04B 2002/7479; E04B 2002/7483; A47G 5/00
See application file for complete search history.

(56) References Cited

U.S. PATENT DOCUMENTS

| 4,891,922 | A | * | 1/1990 | Hozer | E04B 2/7422 |
| | | | | | 160/135 |
| 4,953,246 | A | * | 9/1990 | Matthews | A61G 7/00 |
| | | | | | 5/424 |
| 5,531,539 | A | * | 7/1996 | Crawford | A47G 5/00 |
| | | | | | 160/135 |
| 5,606,841 | A | * | 3/1997 | Carter, Jr. | E04B 2/7448 |
| | | | | | 52/311.2 |
| 6,158,178 | A | | 12/2000 | Jeffers et al. | |
| 6,256,941 | B1 | * | 7/2001 | Yu | E04B 2/7433 |
| | | | | | 181/284 |
| 6,599,055 | B2 | * | 7/2003 | Auer | E04B 2/7427 |
| | | | | | 16/225 |
| 7,614,196 | B2 | * | 11/2009 | McConnell | B32B 5/22 |
| | | | | | 160/327 |

FOREIGN PATENT DOCUMENTS

| CN | 102296771 A | 12/2011 |
|---|---|---|
| CN | 202202521 U | 4/2012 |
| JP | 59-045130 A | 3/1984 |
| JP | 33-112860 S | 1/1988 |
| JP | 63-112860 U | 7/1988 |
| JP | UM-A-63-156318 | 10/1988 |
| JP | 01-244045 | 9/1989 |
| JP | UM-A-04-73120 | 6/1992 |
| JP | 05-094411 U | 12/1993 |
| JP | H06-129034 A | 5/1994 |
| JP | UM-A-07-016817 | 3/1995 |
| JP | 07-327786 A | 12/1995 |
| JP | 08-326186 A | 12/1996 |
| JP | 09-177209 | 7/1997 |
| JP | 09-177209 A | 7/1997 |
| JP | 10-028622 | 2/1998 |
| JP | 3000252 B2 | 1/2000 |
| JP | 2002-138604 | 5/2002 |
| JP | 2002-138604 A | 5/2002 |
| JP | 2003-239922 A | 8/2003 |
| JP | 2004-076274 A | 3/2004 |
| JP | 2004-225340 A | 8/2004 |
| JP | 2005-139819 | 6/2005 |
| JP | 2005-232869 | 9/2005 |
| JP | 3799131 B2 | 7/2006 |
| JP | 2006-336199 | 12/2006 |
| JP | 2007-138650 | 6/2007 |
| JP | 2007-239359 | 9/2007 |
| JP | 4518972 B2 | 8/2010 |
| JP | 4598539 B2 | 12/2010 |
| JP | 4750264 B2 | 5/2011 |

OTHER PUBLICATIONS

International Search Report, dated Jan. 6, 2015, issued in International Patent Application No. PCT/JP2014/079121, 4 pages.
Search Report dated May 16, 2017 of European Patent Application No. 14857825.5.
Japanese Office Action (Application No. 2013-228256) dated Oct. 3, 2017.
Japanese Office Action (Application No. 2013-228257) dated Oct. 3, 2017.
Japanese Office Action (Application No. 2013-228260) dated Oct. 3, 2017.
Japanese Office Action (Application No. 2013-228264) dated Oct. 3, 2017.
Japanese Office Action (Application No. 2013-228261) dated Oct. 31, 2017.
Chinese Office Action (Application No. 201480059158.4) dated Oct. 24, 2017.

* cited by examiner

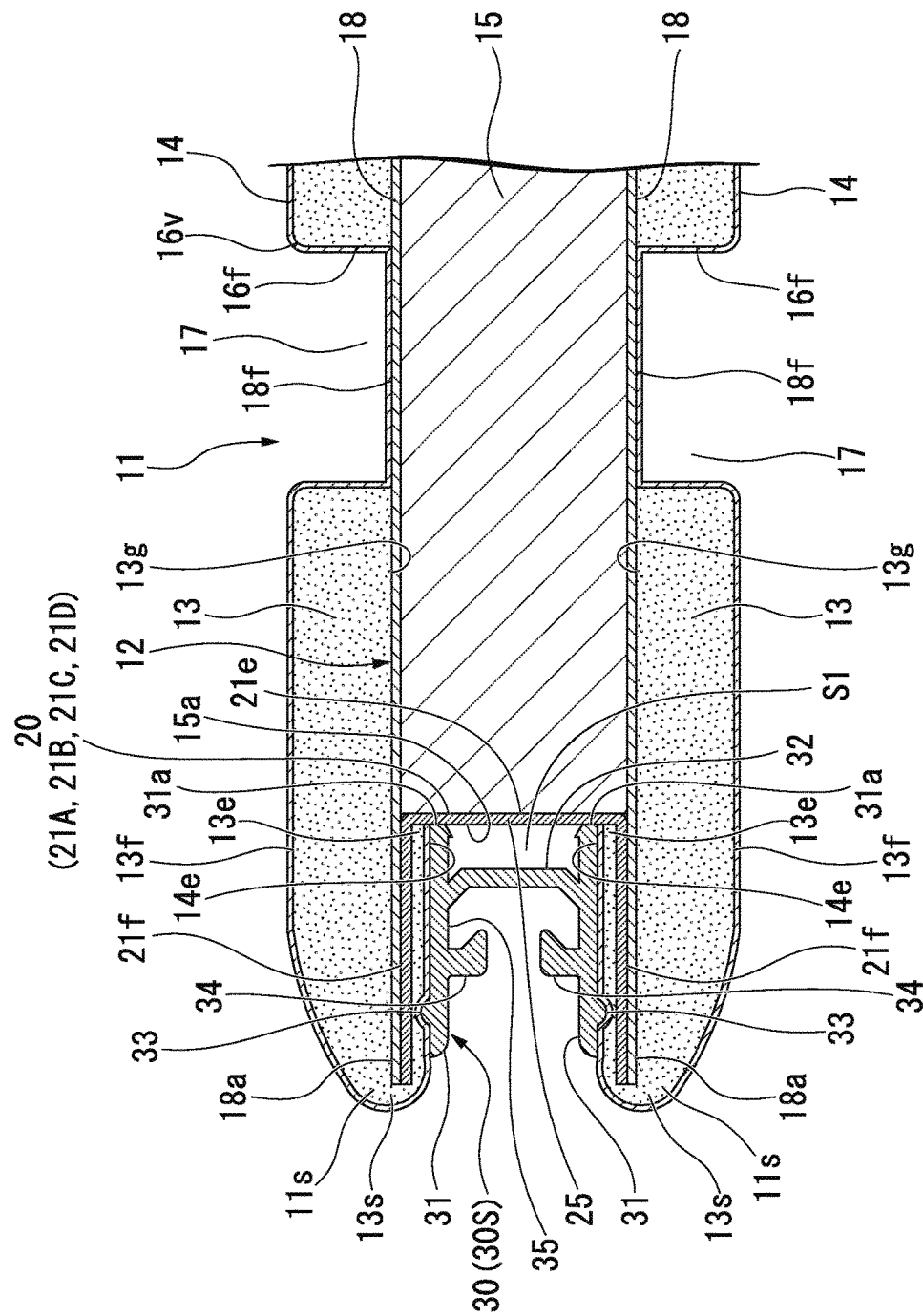

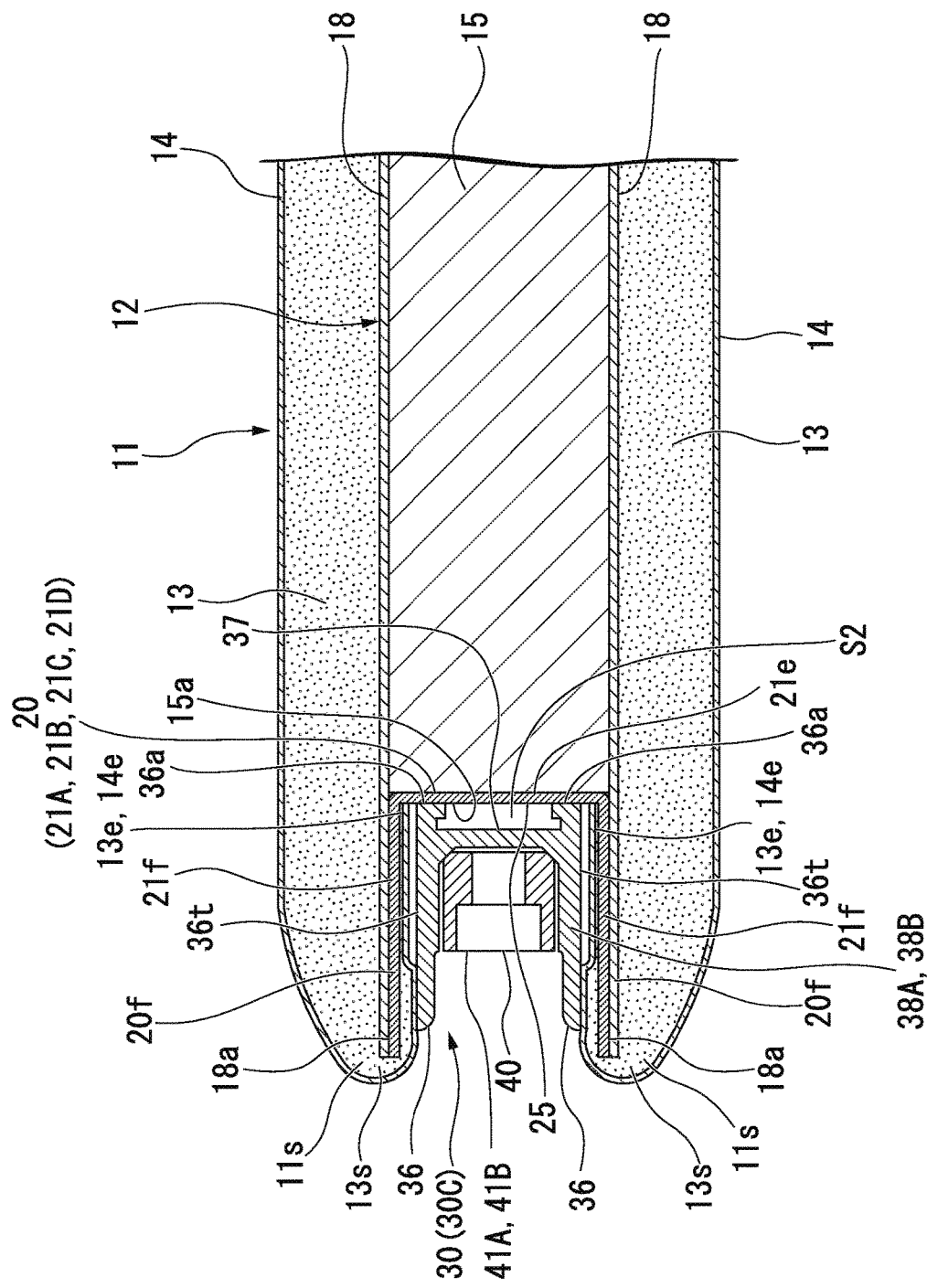

PANEL BODY

CROSS-REFERENCE TO RELATED APPLICATIONS

This application is the U.S. national phase of International Patent Application No. PCT/JP2014/079121, filed Oct. 31, 2014, which claims the benefit of Japanese Patent Application No. 2013-228256, filed Nov. 1, 2013; Japanese Patent Application No. 2013-228257, filed Nov. 1, 2013; Japanese Patent Application No. 2013-228260, filed Nov. 1, 2013; Japanese Patent Application No. 2013-228261, filed Nov. 1, 2013; and Japanese Patent Application No. 2013-228264, filed Nov. 1, 2013, the contents of all of which are incorporated herein by reference in their entirety.

TECHNICAL FIELD

The present invention relates to partition equipment, a panel body which configures the partition equipment, a panel unit, a furniture system, and a bracket attaching structure.

Priority is claimed on Japanese Patent Application No. 2013-228256, filed on Nov. 1, 2013, Japanese Patent Application No. 2013-228257, filed on Nov. 1, 2013, Japanese Patent Application No. 2013-228260, filed on Nov. 1, 2013, Japanese Patent Application No. 2013-228261, filed on Nov. 1, 2013, and Japanese Patent Application No. 2013-228264, filed on Nov. 1, 2013, the contents of which are incorporated herein by reference.

BACKGROUND ART

In a space of an office, public facilities, or commercial facilities, a degree of freedom in using the space can be increased by dividing a part of a large space formed in the facilities into small spaces. Here, as shown in Patent Document 3 and Patent Document 4, in the space, partition equipment (partition), such as a panel, is widely installed. It is possible to block others' attention or sound from the periphery to some extent by installing the partition equipment. It is possible to partition a part of the space by the partition equipment, to provide a space unique to a worker, or to provide a space for a meeting or the like.

As disclosed in Patent Document 1 and Patent Document 2, such partition equipment includes a core material, a cover material provided on a surface of the core material, and a frame provided along an outer circumferential portion of the core material and the cover material. The partition equipment is provided to be free-standing on a floor surface or to be fixed to a wall of furniture, such as a desk, or a wall of a wall space.

As such a panel, a panel main body which is made by forming a paper sheet having a honeycomb structure in a rectangular shape, and a panel which is provided with a vertical frame and a horizontal frame which are formed by extrusion molding of an aluminum alloy provided in edge portions on four sides of the panel main body, are suggested (refer to the following Patent Document 2). By linking and disposing the plurality of panels in a space, the space is divided across a predetermined distance.

In addition, in a case where various optional members are added or linked to other articles in the partition equipment, a locking structure for locking the optional member or the articles to the partition equipment is necessary.

Here, in Patent Document 5 and Patent Document 6, in the partition equipment, a locking structure in which a locking groove for locking the optional member to a surface of the panel, is disclosed.

In addition, in PTL 7, a locking structure which attaches a leg main body (optional member) which supports a top board by locking a hook of an attaching fitting to a locking slit provided in a support column of the partition equipment, is disclosed.

CITATION LIST

Patent Document

[PTL 1] Japanese Patent Publication No. 3000252
[PTL 2] Japanese Unexamined Patent Application, First Publication No. H 9-177209
[PTL 3] Japanese Unexamined Patent Application, First Publication No. 2002-138604
[PTL 4] Japanese Patent Publication No. 4750264
[PTL 5] Japanese Patent Publication No. 4518972
[PTL 6] Japanese Patent Publication No. 4598539
[PTL 7] Japanese Patent Publication No. 3799131

SUMMARY OF INVENTION

Technical Problem

However, the above-described partition equipment in the related art is provided with a frame which is made of a hard material, such as a metal or a resin, in an outer circumferential portion. Therefore, an impression of appearance of the partition equipment is also hard and inorganic.

When the above-described plurality of panel bodies are disposed to be adjacent, there is a possibility that a void between core materials of the adjacent panel bodies is generated. In this case, there is a possibility that light of a space of one panel body leaks to a space of the other panel body from the void.

In a case where the panels described in Patent Document 2 are disposed being linked to each other, and the furniture, such as a desk, is installed along the panels, there is a case where the optional member, such as the top board, which becomes a workbench, is attached to the panel. In this case, since an attaching member, such as the attaching fitting or the like, which attaches the optional member is provided in the panel, the appearance is not excellent.

In the configurations shown in Patent Document 5 to Patent Document 7, the support column provided with the locking groove or the locking slit is exposed to the surface of the panel body which configures the partition equipment. Therefore, there is a possibility that the appearance of the partition equipment is damaged.

Since the locking groove or the support column is provided in the panel body which configures the partition equipment, there is a possibility that the weight of the panel body increases, the structure becomes complicated, manufacturing man-hours increase, and manufacturing costs increases.

Here, an object of the present invention is to provide a panel body which can make the appearance have a softer impression.

By considering the above-described situation, an object of the present invention is to provide a panel unit and a furniture system which can prevent the light from leaking from between an object and the panel body.

In addition, an object of the present invention is to provide a bracket attaching structure which attaches a bracket to a base material so as not to make the attached part distinct, in a state where the base material is attached to an object.

In addition, an object of the present invention is to provide partition equipment which is light in weight, simple in structure, and inexpensive, and a furniture system, while an article attaching member to which the article can be attached is provided, and negative effect of appearance is limited.

Solution to Problem

In a first aspect of the present invention, a panel body includes: a panel-like base material; a groove which is continuous along at least a part of an outer circumferential end portion of the base material, and is recessed to the inside of the base material; a soft material which is provided at least on one surface of the base material; a cover material which covers the base material and the soft material, and in which the outer circumferential end portion is caught in the groove in the outer circumferential edge portion of the base material; and a fixing member which fixes the cover material in the groove.

According to the first aspect of the present invention, since the cover material which covers the base material and the soft material goes around the outer circumferential edge portion of the base material, and is caught in the groove, in the outer circumferential portion of the panel body, the outer circumferential portion of the panel body is covered by the cover material without exposing the base material. Furthermore, since the cover material is fixed by the fixing member in the groove, it is possible to prevent the fixing member from being exposed to the outer circumferential portion of the panel body.

In a second aspect of the present invention, in accordance with the above-described first aspect, the outer circumferential end portion of the soft material is caught in the groove in the outer circumferential edge portion of the base material together with the cover material.

According to the second aspect of the present invention, since not only the cover material but also the soft material covered by the cover material goes around the outer circumferential edge portion of the base material and is caught in the groove, the appearance of the outer circumferential portion of the panel body becomes softer.

In a third aspect of the present invention, in accordance with the above-described first or second aspect, the soft material forms an uneven shape on the surface of the base material, and the cover material forms an unevenness portion along the uneven shape by covering the base material and the soft material.

According to the third aspect of the present invention, since the uneven portion is formed at a part covered by the cover material, design of the panel body is improved.

In a fourth aspect of the present invention, in accordance with the above-described third aspect, the soft material has elasticity and forms the uneven shape having an angle portion on the surface of the base material, and the cover material elastically deforms the angle portion in the direction of compression, and covers the soft material and the base material.

According to the fourth aspect of the present invention, the angle portion of the soft material is elastically deformed in the direction of compression by the cover material. Therefore, the formed unevenness portion is pressed to the outside by a repulsive force of the soft material at a part where the cover material abuts against the angle portion.

Therefore, the shape of the unevenness portion is maintained, the cover material stretches, and it is possible to prevent the cover material from becoming loose.

Advantageous Effects of Invention

According to the present invention, the appearance of the panel body can make a softer impression.

In addition, according to the panel unit and the furniture system according to the present invention, it is possible to prevent the light from leaking from between the object and the panel body. In addition, according to the panel body provided with a bracket attaching structure according to the present invention, in a state where the object is attached to the base material, it is possible to attach the bracket to the base material so as not to make the attached part distinct. In addition, according to the present invention, while the article attaching member to which the article or the like can be attached is provided, negative effect of appearance is limited, and the partition equipment which is light in weight, simple in structure, and inexpensive, can be achieved.

BRIEF DESCRIPTION OF DRAWINGS

FIG. 5A is a sectional view showing a structure of a straight line portion of the panel body.

FIG. 6A is a sectional view showing a structure of a corner portion of the panel body.

DESCRIPTION OF EMBODIMENTS

Hereinafter, a first embodiment for realizing a panel body according to the present invention will be described with reference to the attached drawings. However, the present invention is not limited to the embodiment.

(Partition Equipment)

Figure 1:
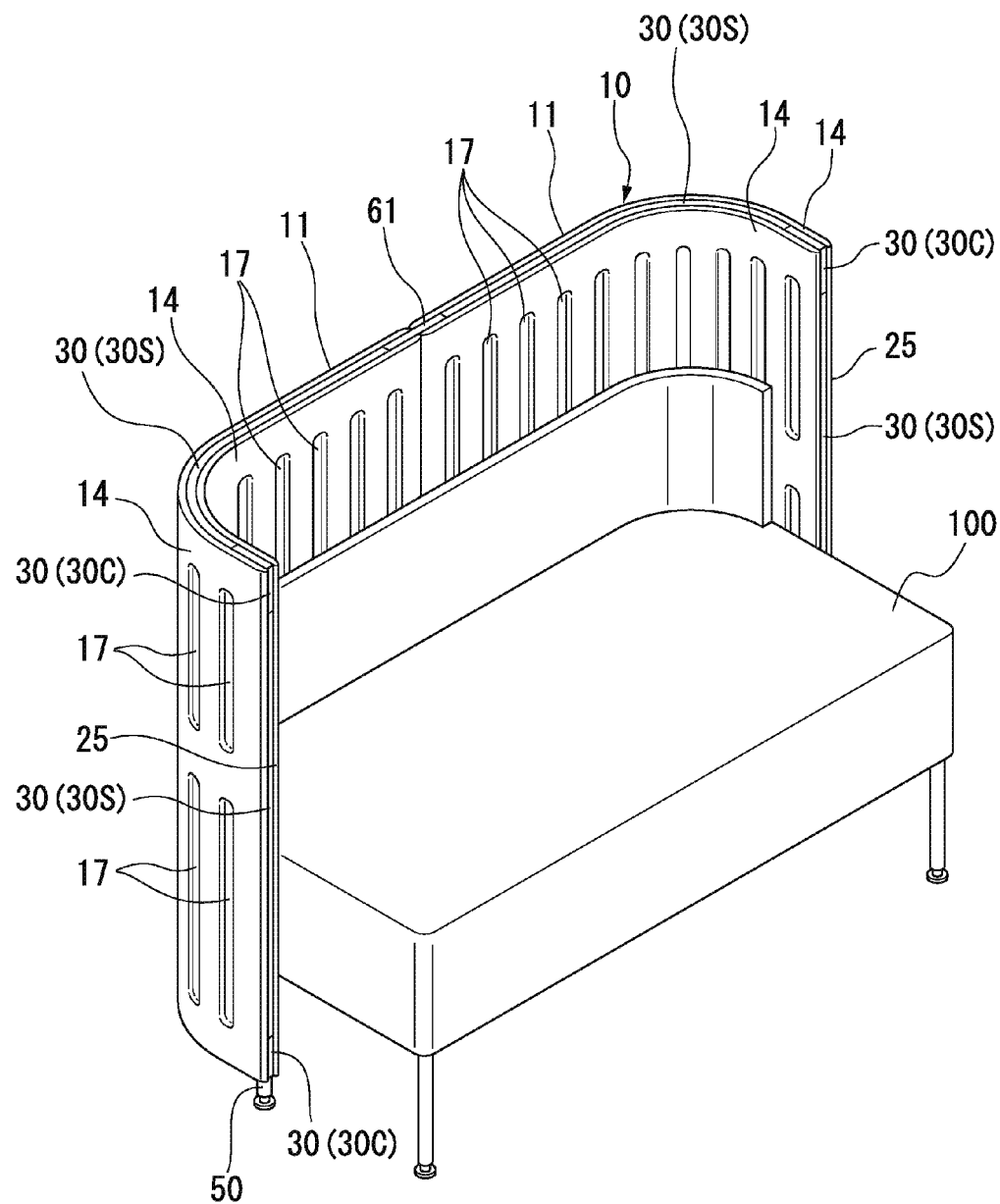
FIG. 1 is a perspective view showing an example of partition equipment which is configured by using a panel body in the embodiment.
Figure 2:
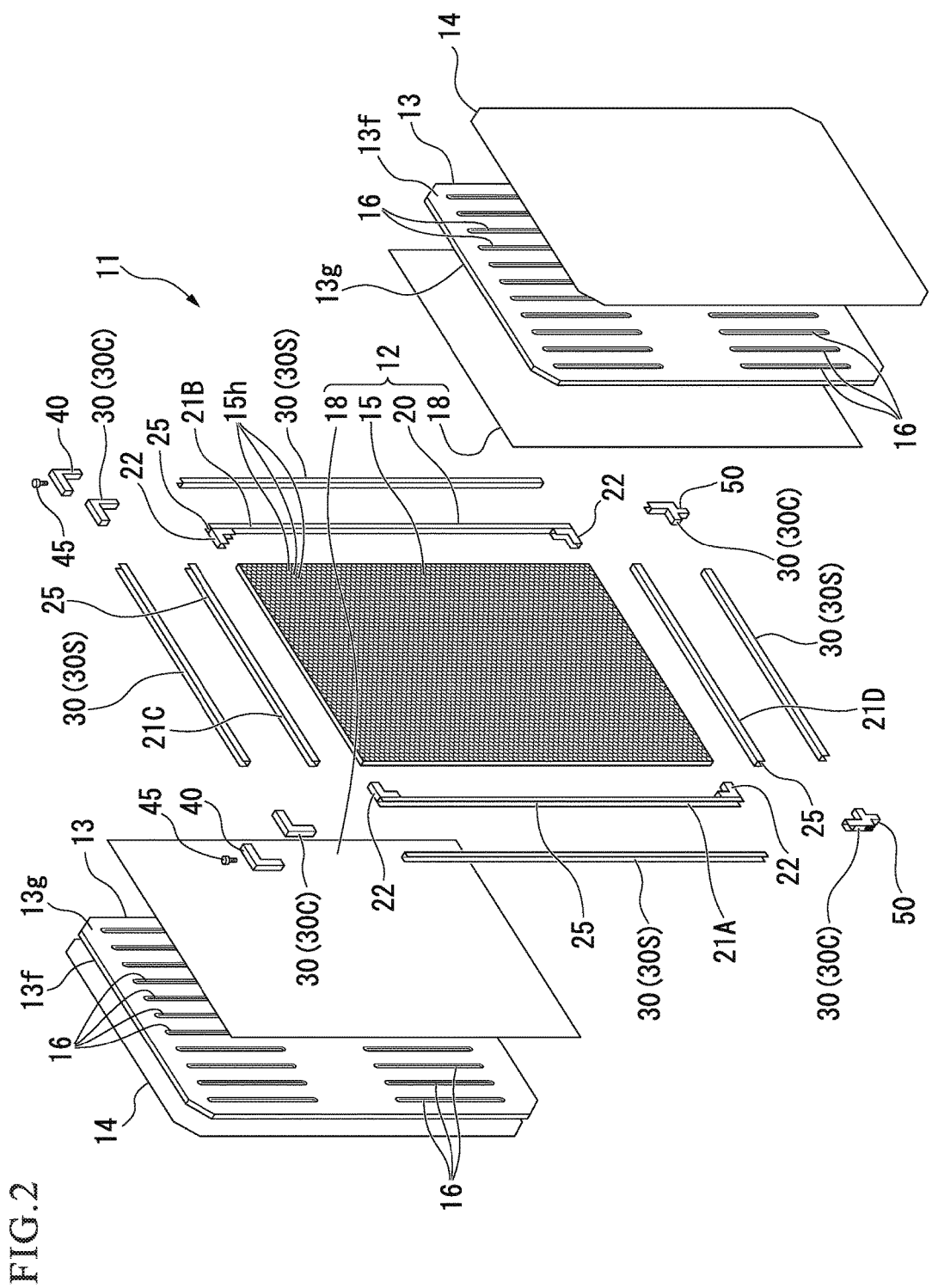
FIG. 2 is a perspective developed view showing a configuration of the panel body.
Figure 3:
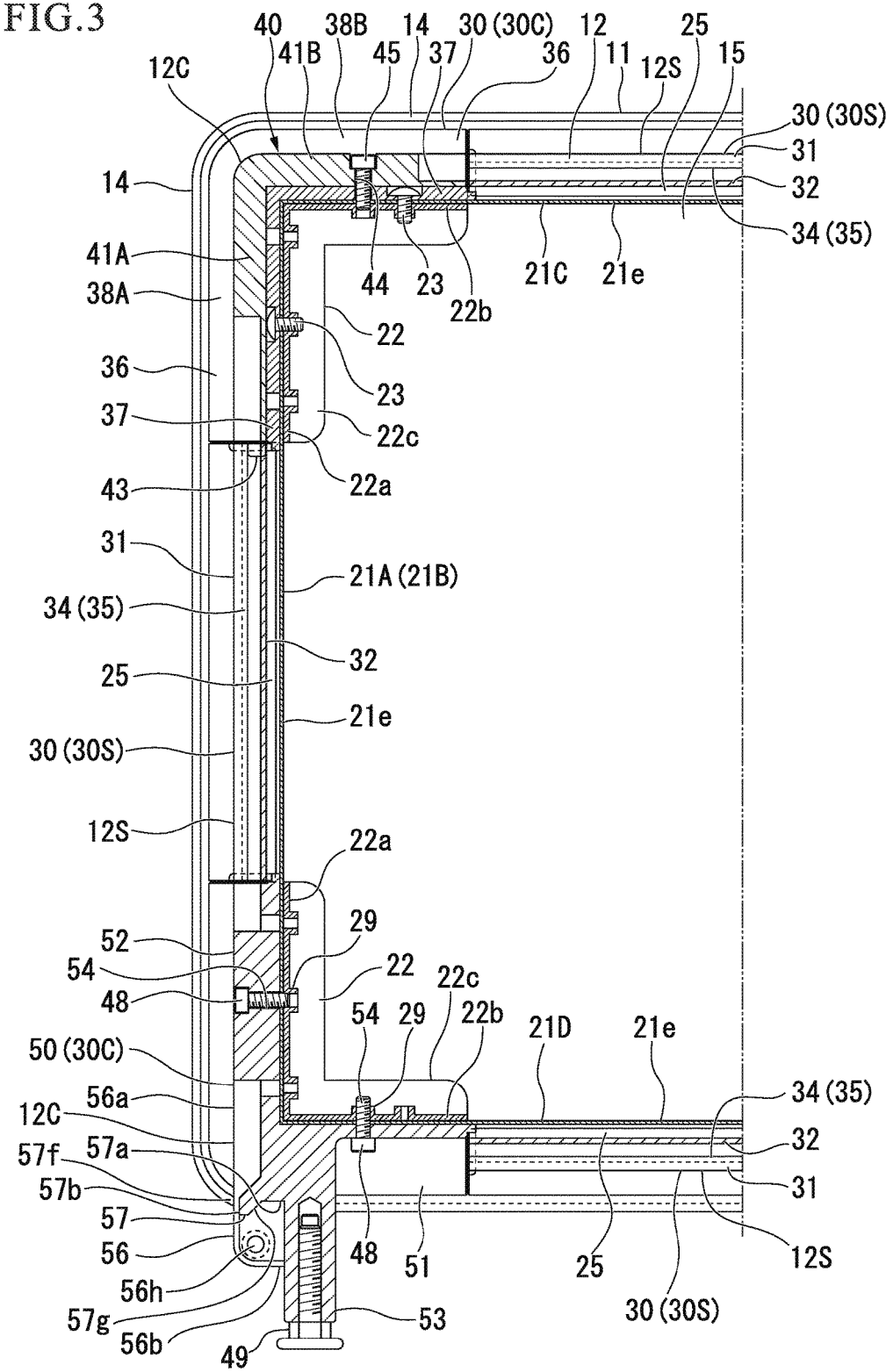
FIG. 3 is a half-sectional view in an intermediate portion in the board thickness direction of the panel body.
Figure 4:
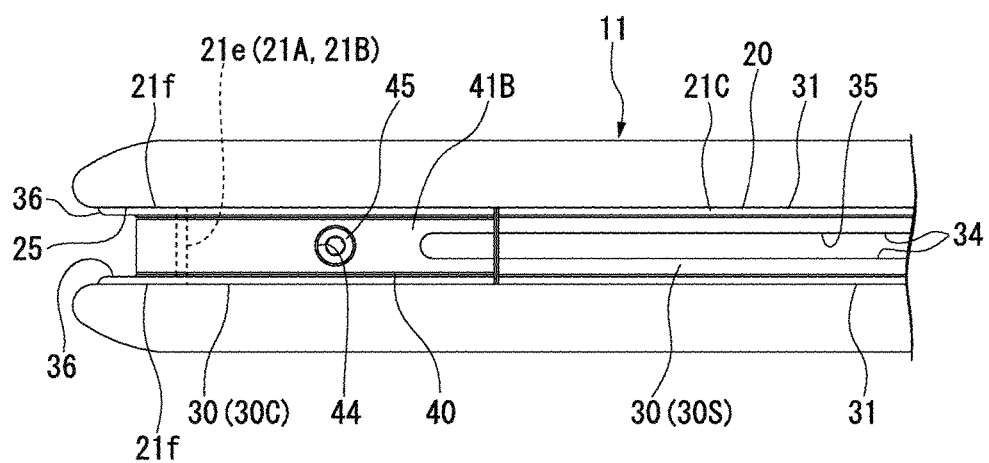
FIG. 4 is an upper view showing an end portion of the panel body.

FIG. 1 is a perspective view showing an example of partition equipment which is configured by using a panel body in the embodiment. FIG. 2 is a perspective developed view showing a configuration of the panel body having a shape of a flat plate. FIG. 3 is a half-sectional view in an intermediate portion in the board thickness direction of the panel body. FIG. 4 is an upper view showing an end portion of the panel body. FIG. 5A is a sectional view showing a structure of a straight line portion of the panel body. FIG. 6A is a sectional view showing a structure of a corner portion of the panel body.

As shown in FIG. 1, partition equipment 10 is configured of one or more panel bodies 11, and two panel bodies 11 in the embodiment. In other words, the partition equipment 10 is provided with one panel body 11, and the other panel body 11 which is an example of furniture (object) disposed to abut against the panel body 11. In the embodiment, the partition equipment 10 is installed on a rear surface side of a sofa 100. The partition equipment 10 is installed on a floor surface by a support leg 50, and is attached and fixed to the sofa 100 by a bracket or the like which is not shown.

Figure 19:
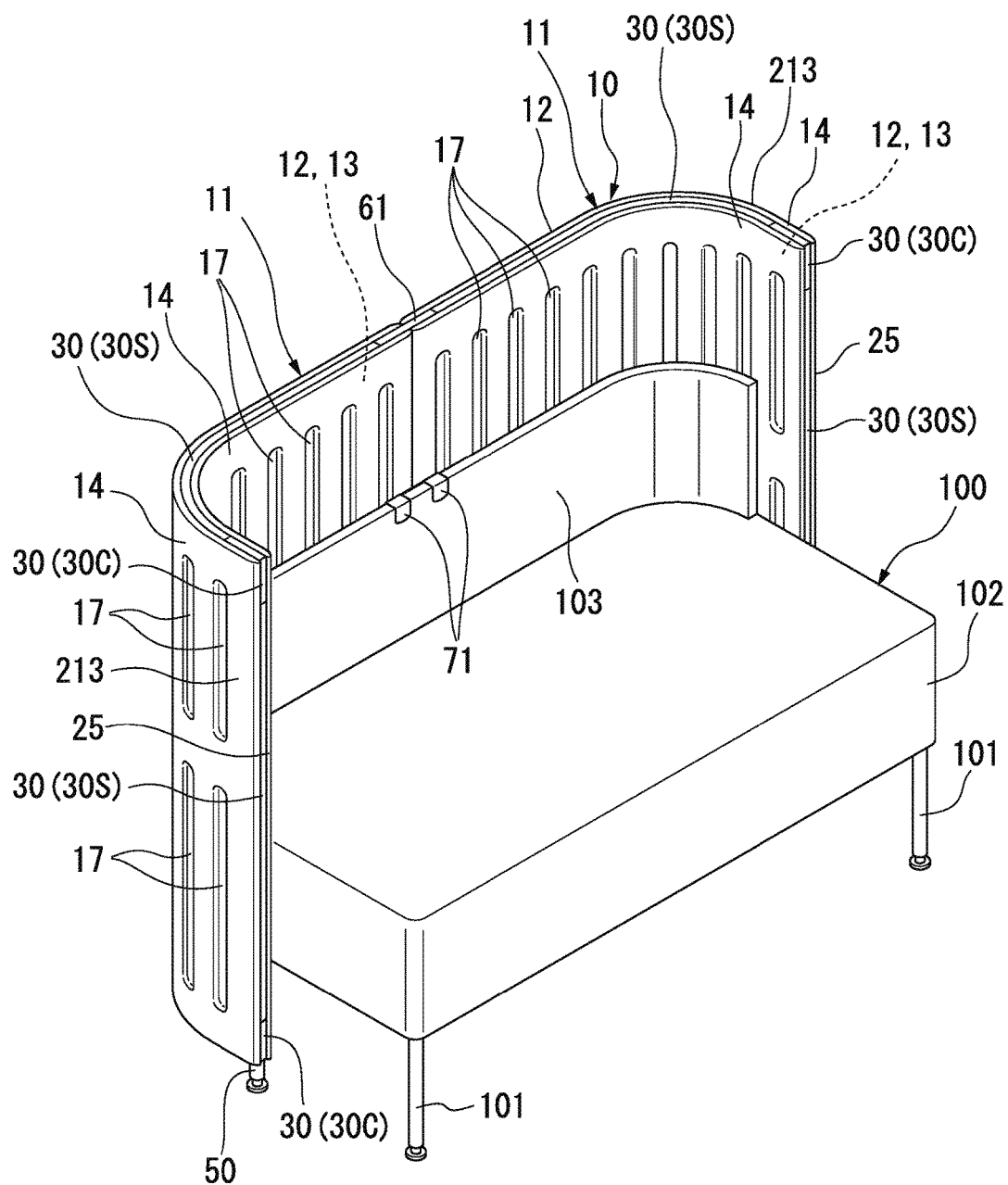
FIG. 19 is a perspective view showing an example of a bracket attaching structure in one embodiment.

In FIG. 19, the partition equipment 10 includes one panel body 11 which is an object installed on a rear surface side of the sofa 100, the other panel body 11 attached to the panel body 11, and brackets 71 attached to one panel body 11 and the other panel body 11.

(Sofa)

As shown in FIG. 19, the sofa 100 includes four leg portions 101 and 101 which extend upward from the floor surface, a seat portion 102 which is supported by the leg portions 101 and 101, and a backrest portion 103 which extends further upward than the seat portion 102.

Four leg portions 101 are provided at an interval in the depth direction and in the width direction of the sofa 100. Upper ends of the leg portions 101 are attached to a lower surface of the seat portion 102. An upper surface of the seat portion 102 is considered a seat surface on which a user can seat.

The seat portion 102 has a substantially rectangular shape in a plan view which is long in the width direction. Both left and right sides of a rear portion of the seat portion 102 are formed to be curved.

(Panel Body)

The panel body 11 can have a shape of a flat plate, a substantial L shape which is bent or curved in the intermediate portion when viewed in a plan view or a side view, or a substantial C shape which is entirely curved in a plan view, along a shape or the like of installed furniture. Hereinafter, the panel body 11 which has a shape of a flat plate will be described.

As shown in FIG. 2, the panel body 11 includes a panel base material (base material) 12, a cushion material (soft material) 13 which is provided along both surfaces of the panel base material 12, and a cover material 14 which covers the panel base material 12 and the cushion material 13, and a fixing member (fixing means) 30.

(Panel Base Material)

The panel base material 12 includes a panel-like core material 15, a frame 20 which is provided along an outer circumferential portion of the core material 15, and a base sheet 18 which is provided to cover the core material 15 and both surfaces of the frame 20.

The core material 15 is formed of, for example, a paper-based material, a resin-based material, or a wooden material. It is preferable that the core material 15 is as light as possible. Here, in the embodiment, the core material 15 is formed of a paper-based material, and has a honeycomb structure in which multiple holes 15h which penetrate it in the board thickness direction are aligned, for example, the plurality of holes 15h having a hexagonal section are combined in zigzags.

(Frame)

As shown in FIGS. 2 and 3, the frame 20 is provided in the outer circumferential portion of the core material 15. The frame 20 includes frame materials 21A, 21B, 21C, and 21D which are provided along four sides of the core material 15. Each of the frame materials 21A, 21B, 21D, and 21D is formed of a metal-based material or a resin-based material.

The frame materials 21A and 21B extend in a vertical direction along two sides which oppose each other in the core material 15, and are provided on both sides in the width direction of the panel body 11. The frame materials 21C and 21D extend in a horizontal direction being orthogonal to the frame materials 21A and 21B, and are provided on both sides of the panel body 11 in the vertical direction. The frame materials 21A and 21B and the frame materials 21C and 21D are bonded by a bolt 23, welding, adhering, or the like, via an L-shaped bracket 22. The frame 20 of which the entire shape is rectangular is formed by the frame materials 21A, 21B, 21C, and 21D.

As shown in FIGS. 4 to 6B, each of the frame materials 21A, 21B, 21C, and 21D is formed to have a substantially U-shaped section which is configured of a base portion 21e which opposes an outer circumferential end surface 15a of the core material 15 on an inner circumferential side of the frame 20, and side wall portions 21f which respectively stand toward the outer circumferential side of the frame 20 from both sides of the base portion 21e in the width direction. Accordingly, a part which is surrounded by the base portion 21e and the side wall portions 21f and 21f on both sides is a groove 25.

In this manner, the panel base material 12 is continuous along the outer circumferential end portion, and has the groove 25 which is recessed to the inside from the outer circumferential end portion of the panel base material 12.

Here, as shown in FIG. 3, in the L-shaped bracket 22, a first plate portion 22a which is provided in the end portion of the frame material 21A or 21B along the frame material 21A or 21B, a second plate portion 22b which is orthogonal to the first plate portion 22a, and is provided in the end portion of the frame material 21C or 21D along the frame material 21C or 21D, and a rib portion 22c which is provided on the inner side of the L-shaped bracket 22 in the bending direction along the first plate portion 22a and the second plate portion 22b, are integrally formed.

The rib portion 22c is formed to protrude toward the inner circumferential side of the panel body 11 from the first plate portion 22a and the second plate portion 22b, being orthogonal to the first plate portion 22a and the second plate portion 22b. The rib portions 22c are respectively formed on both sides of the first plate portion 22a and the second plate portion 22b in the width direction, that is, on one surface side and on the other surface side of the panel body 11.

The rib portion 22c can function not only as a reinforcing member which enhances bending strength of the first plate portion 22a and the second plate portion 22b, but also as a pressing member of an angle portion of the core material 15.

In other words, the core material 15 is nipped between the rib portions 22c which are respectively provided on one surface side and on the other surface side of the panel base material 12. In the panel base material 12, since the bracket 22 is provided at four corners, it is possible to hold the core material 15 on the inner side of the frame 20.

In addition, in FIG. 2, an example of the panel body 11 having a shape of a flat plate is shown, but in a case where the panel body 11 has a substantial L shape or a substantial C shape when viewed in a plan view or in a side view, the upper and lower frame materials 21C and 21D or the left and right frame materials 21A and 21B of the frame 20 are bent or curved in accordance with the shape of the panel body 11.

As shown in FIGS. 5A and 6A, the sheet-like base sheet 18 is provided on both surfaces of the core material 15 to cover the frame 20 and the core material 15. The base sheet 18 is formed of cardboard or the like. An outer dimension of the base sheet 18 is greater than that of the core material 15, and an outer circumferential portion 18a is adhered to a surface 20f of the frame 20 by an adhesive or the like.

(Cushion Material)

The cushion material 13 is provided along the base sheet 18 which forms the surface of the panel base material 12. The cushion material 13 is provided to cover the entire core material 15 via the base sheet 18. Furthermore, in the cushion material 13, an outer circumferential end portion 13s is provided to cover the side wall portion 21f of each of the frame materials 21A, 21B, 21C, and 21D which configures the frame 20. In other words, the cushion material 13 is provided to cover the core material 15 and the frame 20.

The cushion material 13 is formed of material having flexibility and elasticity, for example, a urethane foam material.

Figure 7A:
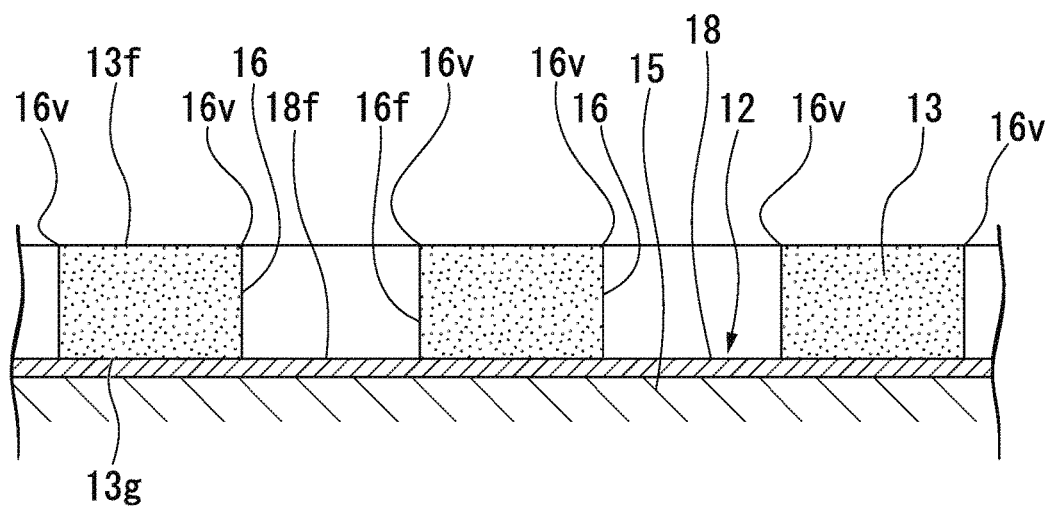
FIG. 7A is a view showing a state where a cover material is not mounted, in the sectional view illustrating a cushion material provided along a surface of a panel base material.
Figure 7B:
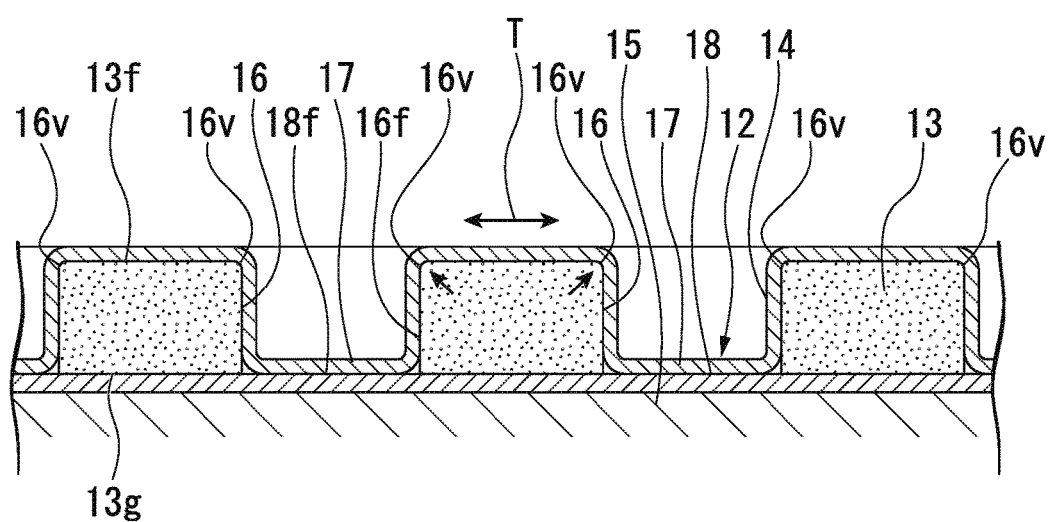
FIG. 7B is a view showing a state where the cover material is mounted, in the sectional view illustrating the cushion material provided along the surface of the panel base material.

FIGS. 7A and 7B are sectional views showing the cushion material 13 which is provided along the surface of the panel base material 12. FIG. 7A is a sectional view of the cushion material 13 in a state where the cover material 14 is not mounted. FIG. 7B is a sectional view of the cushion material 13 in a state where the cover material 14 is mounted.

As shown in FIG. 2, a plurality of through holes 16 are formed in the cushion material 13. The through hole 16 has, for example, an oval shape having the vertical direction as a long axial direction. On an outer surface 13f of the cushion material 13, the plurality of through holes 16 are arranged at an interval in the vertical direction and in the horizontal direction which is orthogonal to the vertical direction.

As shown in FIGS. 5A, 7A, and 7B, each through hole 16 is formed to penetrate in the thickness direction of the cushion material 13 to an opposing surface 13g which opposes the panel base material 12 side from the outer surface 13f which is oriented to a side opposite to the panel base material 12 in the cushion material 13. As shown in FIG. 7A, in each through hole 16, an inner circumferential surface 16f is formed to be orthogonal to the outer surface 13f. Accordingly, an angle portion 16v is formed on a circumferential edge of the through hole 16.

As the cushion material 13 in which the through hole 16 is formed is provided on the surface of the panel base material 12, an uneven shape having the angle portion 16v is formed on the surface of the panel base material 12.

(Cover Material)

As shown in FIGS. 5A and 7B, the cover material 14 is provided to cover the entire cushion material 13. The cover material 14 is adhered along the outer surface 13f of the cushion material 13, the inner circumferential surface 16f which is orthogonal to the outer surface 13f in the through hole 16, and an exposed surface 18f of the base sheet 18 which is exposed in a bottom portion of the through hole 16. In this manner, as the cover material 14 is along the plurality of through holes 16 formed in the cushion material 13, a plurality of oval recessed portions (unevenness portions) 17 are formed on the surface of the panel body 11. In each recessed portion 17, the cover material 14 is adhered to the base sheet 18 which forms the surface of the panel base material 12 through the through hole 16.

The cover material 14 is formed of an elastically deformable material, such as polyester, and covers the cushion material 13 and the panel base material 12 in a stretched state. In the cushion material 13, the angle portion 16v which is projected to the outside at the circumferential edge of the through hole 16 on the outer surface 13f side is pressed to the inside by the cover material 14. Accordingly, the cushion material 13 is elastically deformed in the direction of compression in the angle portion 16v, and the angle portion 16v of the through hole 16 becomes an arc-shaped section.

As shown in FIGS. 5A and 6A, the cushion material 13 and the cover material 14 have an outer dimension which is greater than that of the panel base material 12. In the cushion material 13 and the cover material 14, outer circumferential end portions 13e and 14e go around the outer circumferential edge portion of the panel base material 12, that is, the side wall portion 21f of each of the frame materials 21A, 21B, 21C, and 21D, and are caught in the groove 25. At a part where the outer circumferential end portions 13e and 14e of the cushion material 13 and the cover material 14 go around the side wall portion 21f of each of the frame materials 21A, 21B, 21C, and 21D, the cushion material 13 is compressed by the cover material 14. Accordingly, the panel body 11 is formed so that the thickness thereof gradually becomes smaller when approaching an outer circumferential end portion 11s. The panel body 11 is formed in a circular arc shape at a part where the cushion material 13 and the cover material 14 go around the side wall portion 21f of each of the frame materials 21A, 21B, 21C, and 21D in the outer circumferential end portion 11s.

Figure 5B:
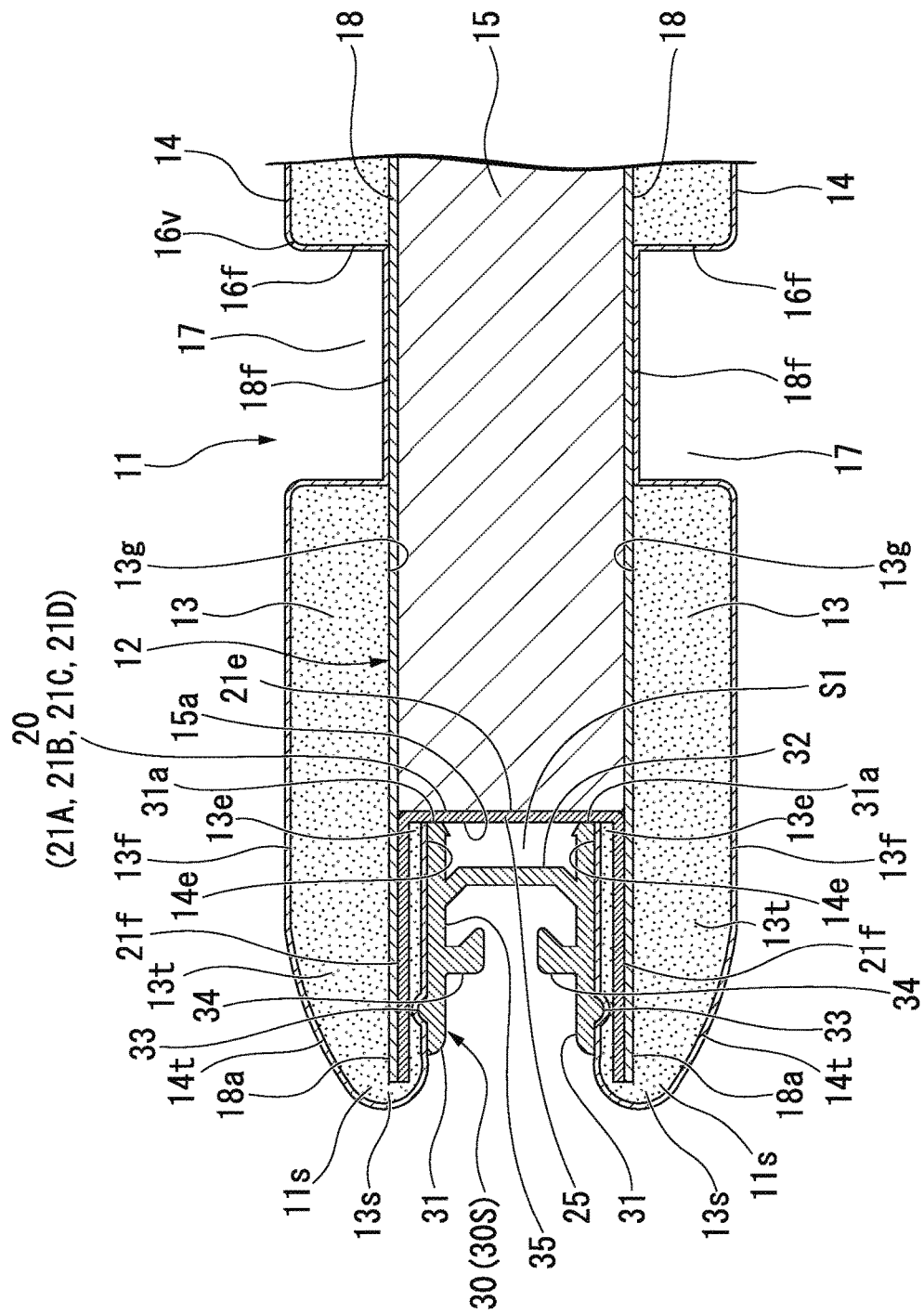
FIG. 5B is a sectional view showing a structure of the straight line portion of the panel body.
Figure 6B:
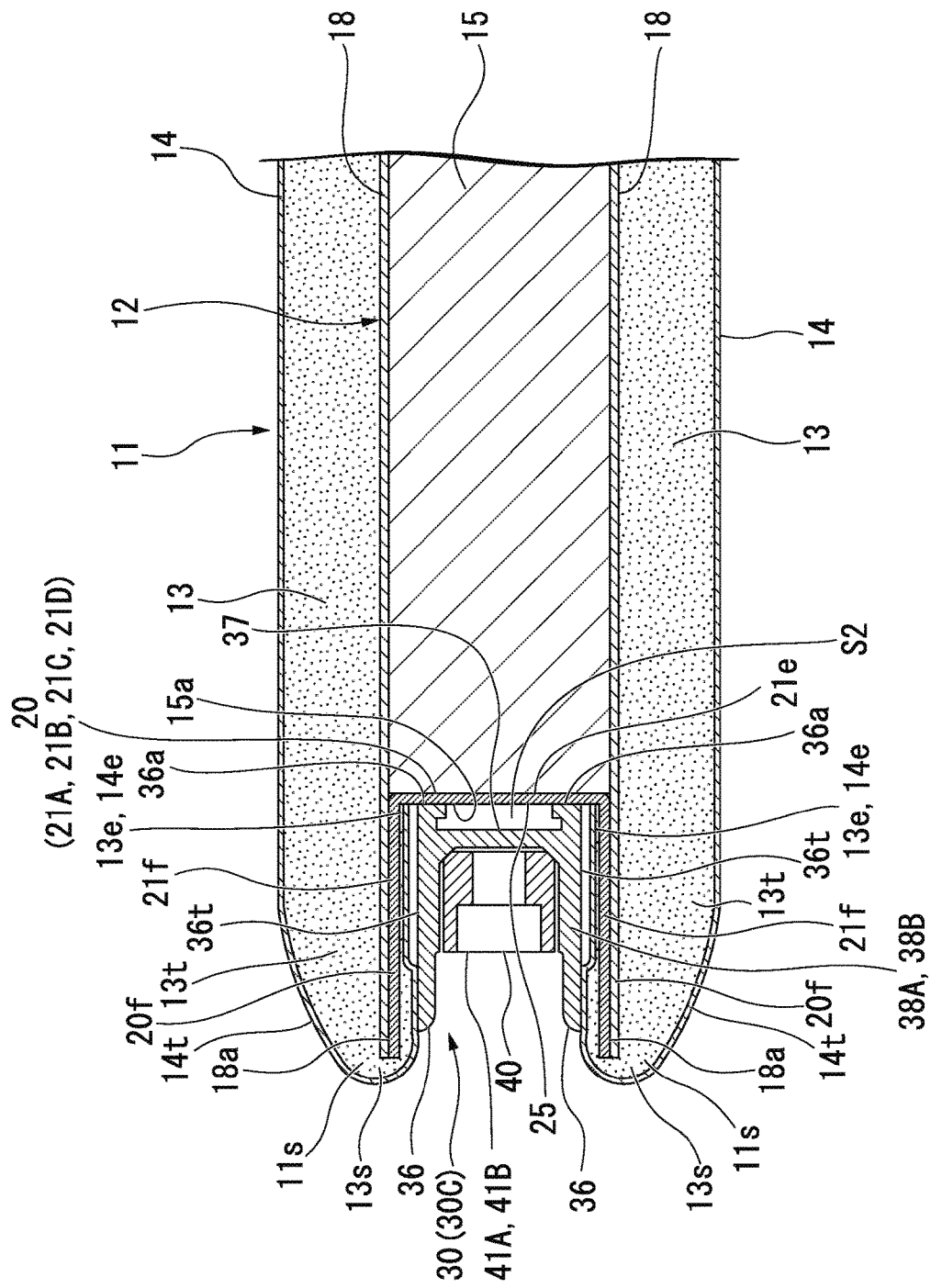
FIG. 6B is a sectional view showing a structure of the corner portion of the panel body.

The cushion material 13 and the cover material 14 configure the cover structure. As shown in FIGS. 5B and 6B, parts which are disposed on the outer circumferential surface side of the core material 15 in the edge portion of the cushion material 13 and the cover material 14, are protrusion portions 13t and 14t which protrude further outward than the outer circumferential end surface (edge portion) 15a of the core material 15.

(Fixing Member)

A fixing member 30 is fitted to the groove 25. The fixing member 30 nips the outer circumferential end portions 13e and 14e of the cushion material 13 and the cover material 14 which are caught in the groove 25 between the inner circumferential surface of the groove 25 and the outer circumferential surface of the fixing member 30. In other words, the fixing member 30 nips the outer circumferential end portions 13e and 14e of the cushion material 13 and the cover material 14 which are caught in the groove 25 between the inner circumferential surface of the groove 25 and the outer circumferential surface of the fixing member 30. Accordingly, the outer circumferential end portions 13e and 14e of the cushion material 13 and the cover material 14 are fixed to the side wall portion 21f of the frame 20.

As shown in FIG. 2, the fixing member 30 includes a straight line part fixing member 30S which is disposed at a straight line part 12S of the outer circumferential portion of the rectangular panel base material 12, and a corner portion fixing member 30C which is disposed in a corner portion 12C of the outer circumferential portion of the rectangular panel base material 12.

As shown in FIG. 5A, the straight line part fixing member 30S includes side part plate portions 31 and 31 which are disposed parallel to each other, and a linking plate portion 32 which links the side part plate portions 31 and 31 to be integrated, in a sectional shape which is orthogonal to the direction in which the straight line part fixing member 30S is continuous.

The side part plate portions 31 and 31 nip the outer circumferential end portions 13e and 14e of the cushion material 13 and the cover material 14 between the side part plate portions 31 and 31 and the side wall portion 21f which forms the groove 25 of the frame 20. Therefore, the interval between the side part plate portions 31 and 31 is formed to be smaller than the interval between the side wall portions 21f and 21f of the groove 25 by a predetermined dimension. When the straight line part fixing member 30S is fitted into the groove 25, the side part plate portions 31 and 31 are formed so that tip end portions 31a and 31a abut against the base portion 21e of the groove 25.

The linking plate portion 32 is formed to be more offset in the direction of being separated from the base portion 21e of the groove 25 than the tip end portions 31a and 31a of the side part plate portions 31 and 31. Accordingly, the straight line part fixing member 30S becomes a substantially H-shaped section by the side part plate portions 31 and 31 and the linking plate portion 32. A space S1 is formed at a part which is surrounded by the tip end portions 31a and 31a sides of the side part plate portions 31 and 31, the linking plate portion 32, and the base portion 21e of the groove 25, in a state where the straight line part fixing member 30S is fitted into the groove 25. The space S1 functions as an accommodation space which can accommodate a residual portion of the outer circumferential end portions 13e and 14e of the cushion material 13 and the cover material 14 which are caught in the groove 25, that is, a more tip end part (not shown) than the part which abuts against the base portion 21e of the frame 20 among the outer circumferential end portions 13e and 14e.

In the side part plate portions 31 and 31, projections 33 and 33 are formed on a side opposing the side wall portions 21f and 21f of the groove 25. The projections 33 and 33 bite into the outer circumferential end portions 13e and 14e of the cushion material 13 and the cover material 14 which are nipped between the side part plate portions 31 and 31 and the side wall portions 21f and 21f. Accordingly, the straight line part fixing member 30S prevents the cushion material 13 and the cover material 14 from falling out of the groove 25.

Furthermore, in the side part plate portions 31 and 31, projection strips 34 and 34 which protrude toward the inside from the side part plate portions 31 and 31 are formed on a side of being further separated from the base portion 21e of the groove 25 than the linking plate portion 32. A holding groove (optional portion attaching portion) 35 that mounts an optional member or the like is formed by being surrounded by the projection strips 34 and 34, the side part plate portions 31 and 31, and the linking plate portion 32.

As shown in FIG. 3, the corner portion fixing member 30C which is disposed at a corner portion of the upper portion of the panel body 11 is formed of a first straight line-like portion 38A which extends in the vertical direction, and a second straight line-like portion 38B which is bent from an upper end of the first straight line-like portion 38A and extends in the horizontal direction, in a substantial L shape.

The first straight line-like portion 38A is fitted into the groove 25 in the upper end portion of the frame material 21A or the frame material 21B which extends in the vertical direction. The second straight line-like portion 38B is formed to continuous from one end of the first straight line-like portion 38A, and is fitted into the groove 25 in both end portions of the frame material 21C or the frame material 21D which extends in the horizontal direction.

As shown in FIGS. 6A and 6B, the first straight line-like portion 38A and the second straight line-like portion 38B include a side part plate portions 36 and 36 which are disposed parallel to each other, and a linking plate portion 37 which links the side part plate portions 36 and 36 to be integrated, in a sectional shape which is orthogonal to the direction in which the first straight line-like portion 38A and the second straight line-like portion 38B are continuous to each other.

The side part plate portions 36 and 36 nip the outer circumferential end portions 13e and 14e of the cushion material 13 and the cover material 14 between the side wall portions 21f and 21f which form the groove 25 of the frame 20. Therefore, the interval between the side part plate portions 36 and 36 is formed to be smaller than the interval between the side wall portions 21f and 21f of the groove 25 by a predetermined dimension. When the corner portion fixing member 30C is fitted into the groove 25, the side part plate portions 36 and 36 are formed so that tip end portions 36a and 36a abut against the base portion 21e of the groove 25.

In the side part plate portions 36 and 36, projected portions 36t and 36t are formed on a side opposing the side wall portions 21f and 21f of the groove 25. The projected portions 36t and 36t nip the outer circumferential end portions 13e and 14e of the cushion material 13 and the cover material 14 between the side part plate portions 36 and 36 and the side wall portions 21f and 21f.

The linking plate portion 37 is formed to be more offset in the direction of being separated from the base portion 21e of the groove 25 than the tip end portions 36a and 36a of the side part plate portions 36 and 36. Accordingly, the corner portion fixing member 30C becomes a substantially H-shaped section by the side part plate portions 36 and 36 and the linking plate portion 37. In a state where the straight line part fixing member 30S is fitted into the groove 25, a space S2 is formed at a part which is surrounded by the tip end portions 36a and 36a sides of the side part plate portions 36 and 36, the linking plate portion 37, and the base portion 21e of the groove 25. The space S2 functions as an accommodation space which can accommodate a residual portion of the outer circumferential end portions 13e and 14e of the cushion material 13 and the cover material 14 which are caught in the groove 25, that is, a more tip end part (not shown) than the part which abuts against the base portion 21e of the frame 20 among the outer circumferential end portions 13e and 14e. The linking plate portion 37 is closer to the base portion 21e than the linking plate portion 32 in the straight line part fixing member 30S, and the space S2 is formed to be smaller than the space S1.

As shown in FIG. 3, the corner portion fixing member 30C is fixed to the groove 25 by a corner cap 40. The corner cap 40 has a substantial L shape which is made of a first straight line-like portion 41A and a second straight line-like portion 41B which is continuous to one end of the first straight line-like portion 41A and extends being orthogonal to the first straight line-like portion 41A. As shown in FIGS. 6A and 6B, the first straight line-like portion 41A and the second straight line-like portion 41B are inserted between the side part plate portions 36 and 36 with respect to the first straight line-like portion 38A and the second straight line-like portion 38B of the corner portion fixing member 30C, and abuts against the linking plate portion 37.

As shown in FIG. 3, a projection piece 43 is formed to protrude downward in a lower end portion of the first straight line-like portion 41A. The projection piece 43 is inserted into the holding groove 35 (refer to FIG. 5A) between the linking plate portion 32 and the projection strip 34, in the upper end portion of the straight line part fixing member 30S.

As shown in FIG. 3, a bolt through hole 44 into which a bolt 45 is inserted is formed in the second straight line-like portion 41B. By the bolt 45 which is inserted into the bolt through hole 44, the corner cap 40, the corner portion fixing member 30C, the frame material 21C, and the second plate portion 22b of the bracket 22 are integrally fastened.

(Support Leg)

As shown in FIG. 3, in a corner portion of a lower portion of the above-described panel body 11, the support leg 50 is provided as the corner portion fixing member 30C. The support leg 50 makes the panel body 11 stand on a floor surface by being grounded on the floor surface.

The support leg 50 integrally includes a lower part support portion 51 which is accommodated in the groove 25 of the lower end portion of the frame 20, a side part support portion 52 which extends upward from one end of the lower part support portion 51, and is accommodated in the groove 25 of the lower end portion of the side portion of the frame 20, and a support leg portion 53 which extends further downward than the lower part support portion 51.

The lower part support portion 51 is fixed to abut against the base portion 21e which forms the bottom surface of the groove 25 of the lower end portion of the frame 20. The side part support portion 52 is fixed to abut against the base portion 21e which forms the bottom surface of the groove 25 of the side end portion of the frame 20.

In the lower part support portion 51 and the side part support portion 52, a bolt through hole 54 into which a bolt 48 is inserted is formed. The bolt 48 which is inserted into the bolt through hole 54 is screwed into a female screw hole portion 29 which is formed at a predetermined position of the base portion 21e of the groove 25. Accordingly, the support leg 50 is fixed to the panel body 11.

The support leg portion 53 extends further downward than the lower part support portion 51, and a height adjustment screw 49 can be screwed to the lower end portion of the support leg portion 53.

(Linking Structure of Panel Body)

Figure 8:
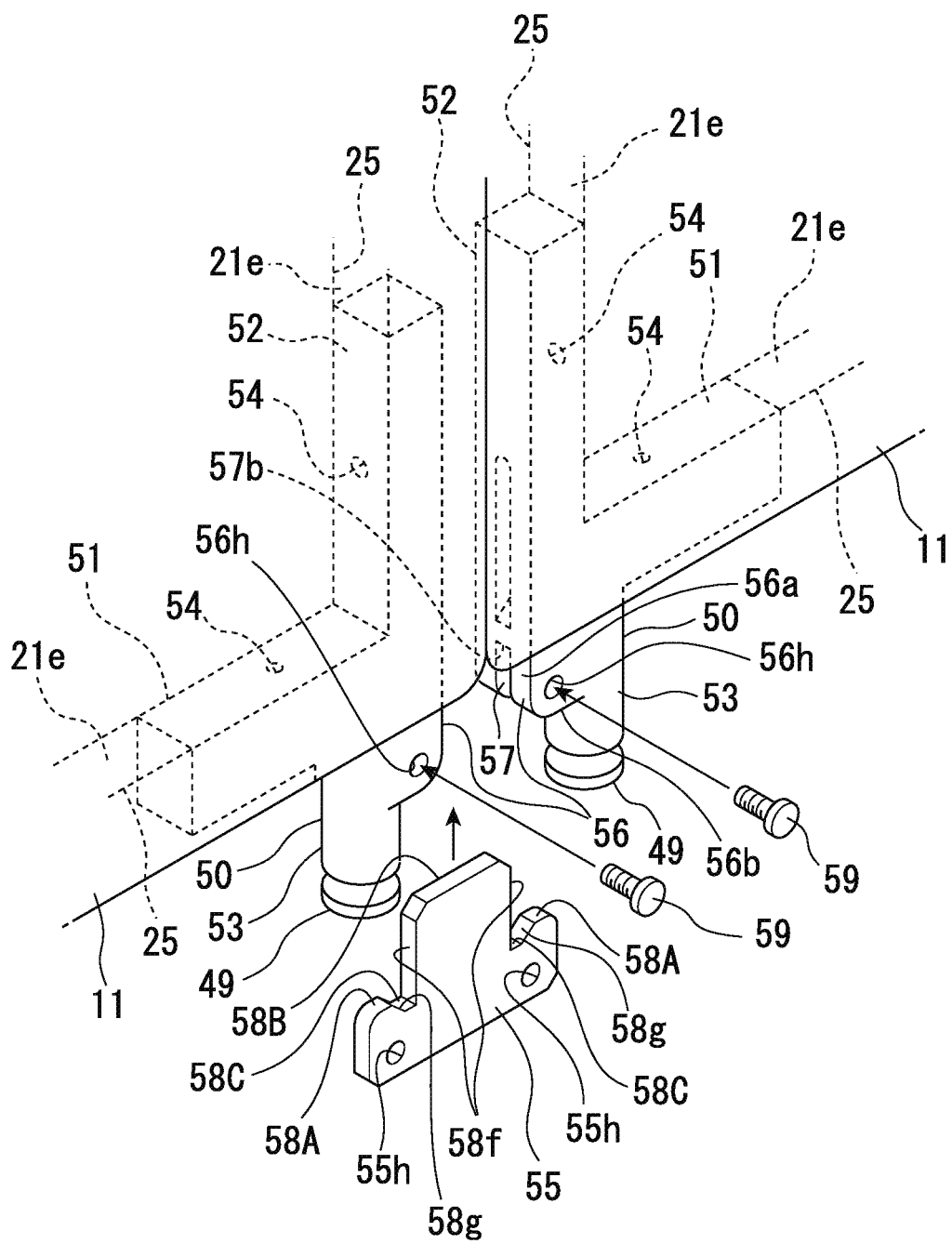
FIG. 8 is a perspective view showing a support leg provided in an angle portion of a lower portion of the panel body, and an example of a linking structure in the lower portion of the adjacent panel bodies.
Figure 9:
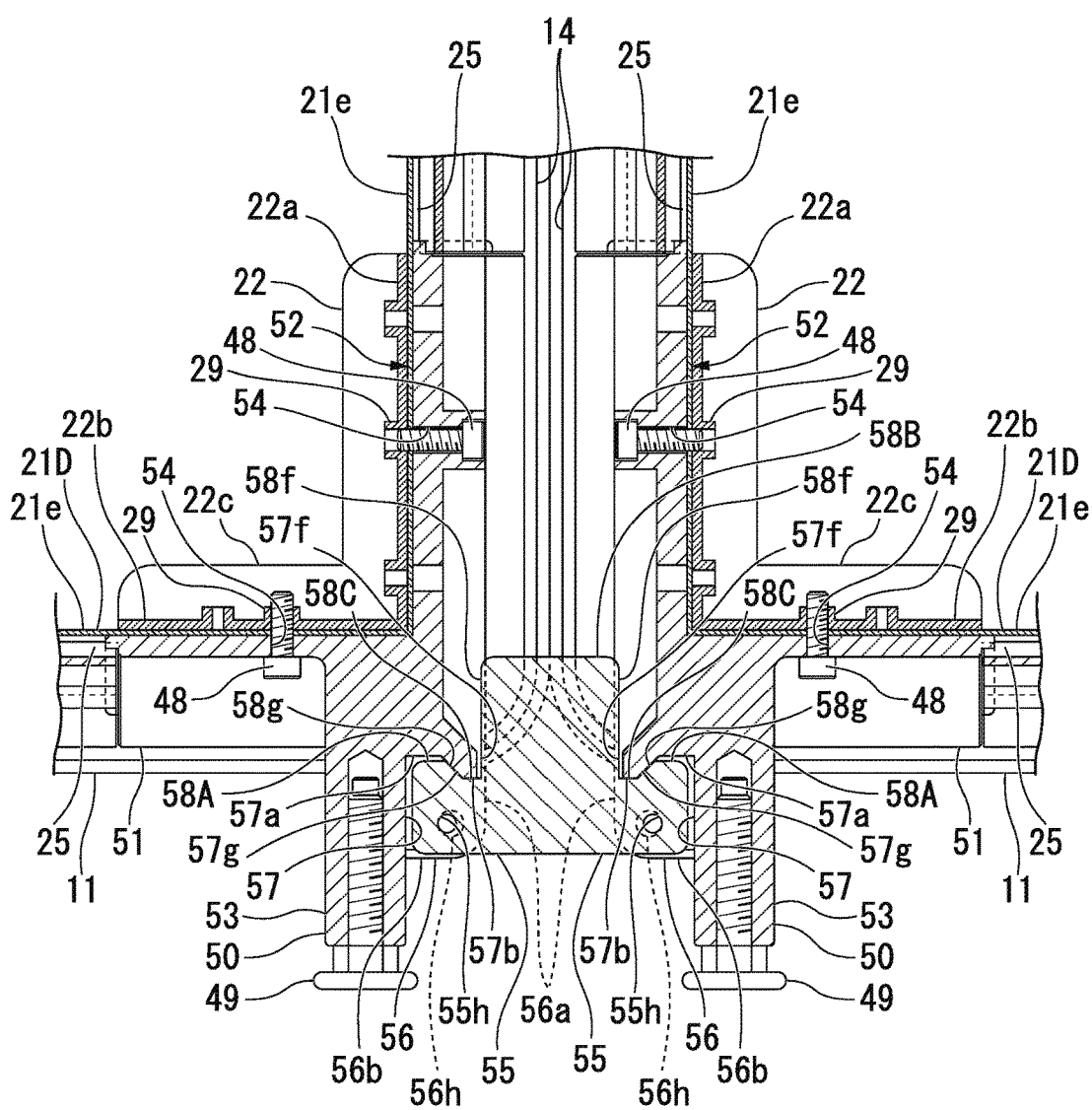
FIG. 9 is a sectional view showing a linking structure in the lower portions of the adjacent panel bodies.

FIG. 8 is a perspective view showing the support leg 50 provided in the angle portion of the lower portion of the panel body 11, and an example of a linking structure in the lower portions of the adjacent panel bodies 11 and 11. FIG. 9 is a sectional view showing a linking structure in the lower portions of the adjacent panel bodies 11 and 11.

As shown in FIGS. 8 and 9, one end of a linking member (lower side linking portion) 55 that links the support leg 50 to the other panel body 11 disposed adjacent to the support leg 50 can be locked to the support leg 50. Therefore, a bulged portion 56 which is bulged further downward than the lower part support portion 51 is integrally formed in the support leg 50.

In the bulged portion 56, a slit 57 into which one end of the plate-like linking member 55 can be inserted is formed in the intermediate portion of the support leg 50 which is along the thickness direction of the panel body 11. The slit 57 is opened to a side surface 56a and a lower surface 56b on a side adjacent to the other panel body 11 in the bulged portion 56.

As shown in FIG. 9, in an upper portion of the slit 57, an insertion recessed portion 57a into which a projection portion 58A of the linking member 55 which will be described later is inserted, is formed to be recessed upward. In the upper portion of the slit 57, on the side surface 56a side of the bulged portion 56, a projection portion 57b which is adjacent to the insertion recessed portion 57a and protrudes downward, is formed.

In the bulged portion 56, a locking hole 56h that locks the linking member 55 which is inserted into the slit 57 is formed to penetrate along the thickness direction of the panel body 11.

In both end portions of the linking member 55, through holes 55h are respectively formed. In both end portions of the linking member 55, the projection portions 58A which protrude upward are respectively formed. In the linking member 55, a center projection portion 58B which protrudes upward is formed between the projection portions 58A and 58A of both end portions of the linking member 55. An engagement recessed portion 58C which is recessed downward is formed between the center projection portion 58B and the projection portion 58A on both sides of the center projection portion 58B.

In the projection portion 57b and the engagement recessed portion 58C, the side surface 56a side and the center projection portion 58B side of the bulged portion 56 are considered perpendicular surfaces 57f and 58f which extend in the vertical direction, and the sides opposite thereto are considered inclination surfaces 57g and 58g which are separated from the perpendicular surfaces 57f and 58f when approaching the upper part. Accordingly, the projection portion 57b and the engagement recessed portion 58C have a tapered shape of which a width dimension thereof gradually becomes smaller when approaching the lower part of any of the projection portion 57b and the engagement recessed portion 58C.

As the projection portion 57b of the slit 57 is fitted to the engagement recessed portion 58C, the linking member 55 and the support leg 50 can be easily positioned in the direction in which the panel bodies 11 and 11 are adjacent to each other.

In order to link the panel bodies 11 and 11 adjacent to each other, both end portions of the linking member 55 in which the through hole 55h is formed is inserted into the slit 57 of the support leg 50. The projection portions 57b of the support leg 50 provided in the panel bodies 11 on both sides are respectively fitted to the engagement recessed portions 58C of both end portions of the linking member 55. Here, the projection portion 57b and the engagement recessed portion 58C have a tapered shape of which the width dimension gradually becomes smaller when approaching the lower part of any of the projection portion 57b and the engagement recessed portion 58C. Therefore, as the projection portion 57b is inserted into the engagement recessed portion 58C, the linking member 55 and the support leg 50 are respectively positioned in the direction in which the panel bodies 11 and 11 are adjacent to each other. Accordingly, the through hole 55h of the both end portions formed in the linking member 55, and the locking hole 56h of the support leg 50, communicate each other. Here, the linking bolt 59 is inserted and fastened to the through hole 55h and the locking hole 56h. Accordingly, the lower end portions of the adjacent panel bodies 11 and 11 are linked together by the linking member 55.

In this manner, as the lower side linking portion 55 links the support legs 50 and 50 of the adjacent panel bodies 11 and 11, the panel bodies 11 and 11 are linked in the lower end portion.

The support legs 50 and 50, and the lower side linking portion 55, configure the lower side linking portion which links the lower end portions of the adjacent panel bodies 11 and 11.

Figure 10:
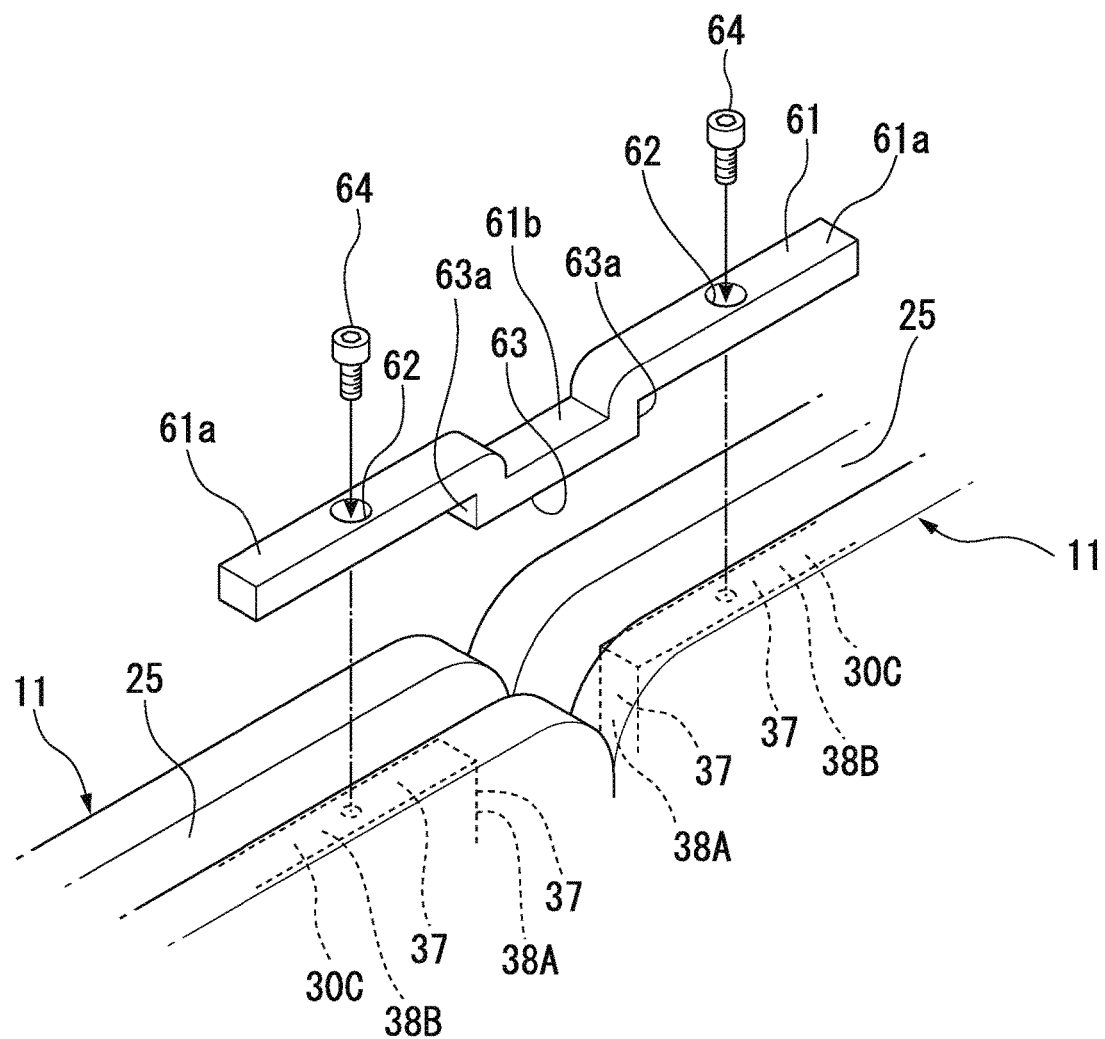
FIG. 10 is a perspective view showing an example of the linking structure in an upper portion of the adjacent panel bodies.

FIG. 10 is a perspective view showing an example of a linking structure in the upper portions of the panel bodies 11 and 11.

As shown in FIG. 10, the adjacent panel bodies 11 and 11 can respectively link the upper end portions thereof by an upper part inking member (upper side linking portion) 61.

Instead of the corner cap 40, the upper part linking member 61 is attached to the corner portion fixing member 30C. A bolt through hole 62 is formed in both end portions 61a and 61a of the upper part linking member 61.

On the lower surface side of an intermediate portion 61b of the upper part linking member 61, an interval regulation portion 63 which regulates the interval of the corner portion fixing members 30C and 30C which are disposed on the upper portions of the adjacent panel bodies 11 and 11, is formed to protrude downward. As the interval regulation portion 63 is inserted between the corner portion fixing members 30C and 30C which are disposed in the upper portions of the adjacent panel bodies 11 and 11, it is possible to regulate the interval between the adjacent panel bodies 11 and 11.

The upper end portions of the adjacent panel bodies 11 and 11 are linked by the upper part linking member 61 as follows.

First, the upper part linking member 61 is loaded onto the corner portion fixing members 30C and 30C which are disposed in the upper portions of the adjacent panel bodies 11 and 11. At this time, the lower surfaces of both end portions 61a and 61a of the upper part linking member 61 are inserted between the side part plate portions 36 and 36, and abut against the linking plate portion 37, with respect to the second straight line-like portion 38B of the corner portion fixing member 30C. As the interval regulation portion 63 is inserted between the corner portion fixing members 30C and 30C which are disposed in the upper portions of the adjacent panel bodies 11 and 11, it is possible to regulate the interval between the adjacent panel bodies 11 and 11. More specifically, as both side surfaces 63a and 63a of the interval regulation portion 63 abut against the linking plate portion 37 of the first straight line-like portion 38A of the corner portion fixing member 30C, it is possible to appropriately position the interval between the adjacent panel bodies 11 and 11. In this state, the upper part linking member 61, the corner portion fixing member 30C, the frame material 21C (refer to FIG. 3), and the second plate portion 22b (refer to FIG. 3) of the bracket 22, are fastened to be integrated by a bolt 64 which is inserted into the bolt through hole 62. Accordingly, the upper end portions of the adjacent panel bodies 11 and 11 are linked.

In this manner, the linking member which fixes the adjacent panel bodies 11 and 11 is configured of the lower side linking portion 55 and the upper side linking member 61.

A panel unit which can be linked to the other panel body 11 is configured of one panel body 11, the lower side linking portion 55 and the upper side linking member 61.

Figure 16:
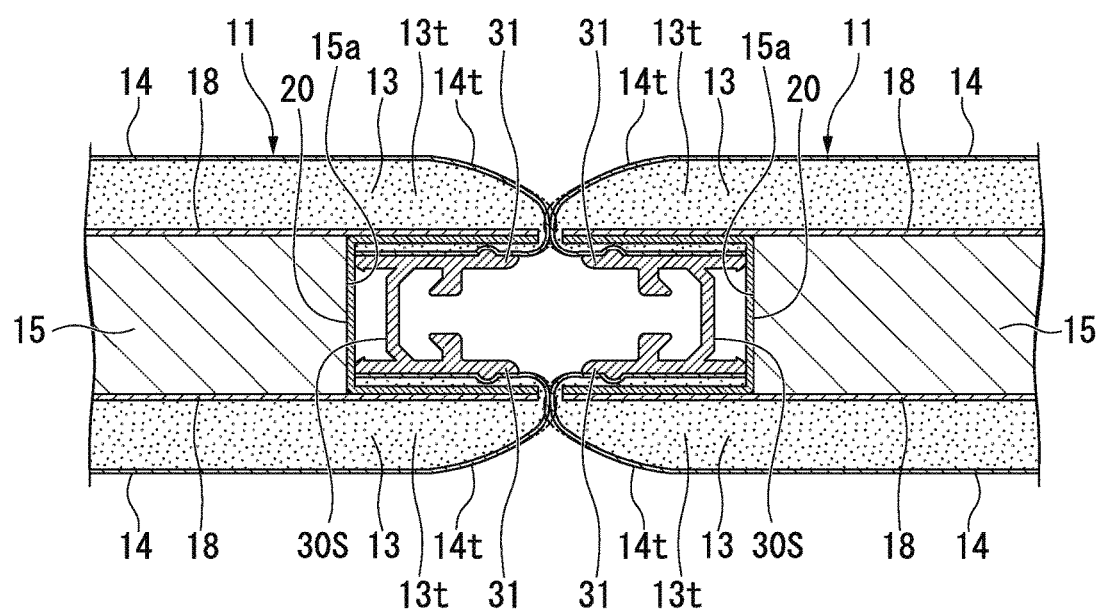
FIG. 16 is a sectional view showing a structure of a linking part of the adjacent panel bodies.

FIG. 16 is a sectional view showing a structure of a linking part of the adjacent panel bodies 11 and 11.

As shown in FIG. 16, the adjacent panel bodies 11 and 11 are fixed in a state where the distance between the outer circumferential end portion 11s of one panel body 11, and the outer circumferential end surface 15a of the core material 15 of the other panel body 11, is maintained. Meanwhile, the protrusion portions 13t and 13t of the cushion materials 13 and 13 which protrude further outward than the outer circumferential end surface 15a of the core material 15 of the panel body 11, abut against each other by interposing the protrusion portions 14t and 14t of the cover materials 14 and 14. The protrusion portions 13t and 13t of the cushion materials 13 and 13 press against each other in the direction of opposing each other, and the tip end parts of the protrusion portions 13t and 13t are elastically deformed to be round. Accordingly, the abutting area of the protrusion portions 13t and 13t which abut against each other increases.

(Linking Structure of Sofa and Panel Body)

Next, a linking structure of the sofa 100 and the panel body 11 will be described.

Figure 20:
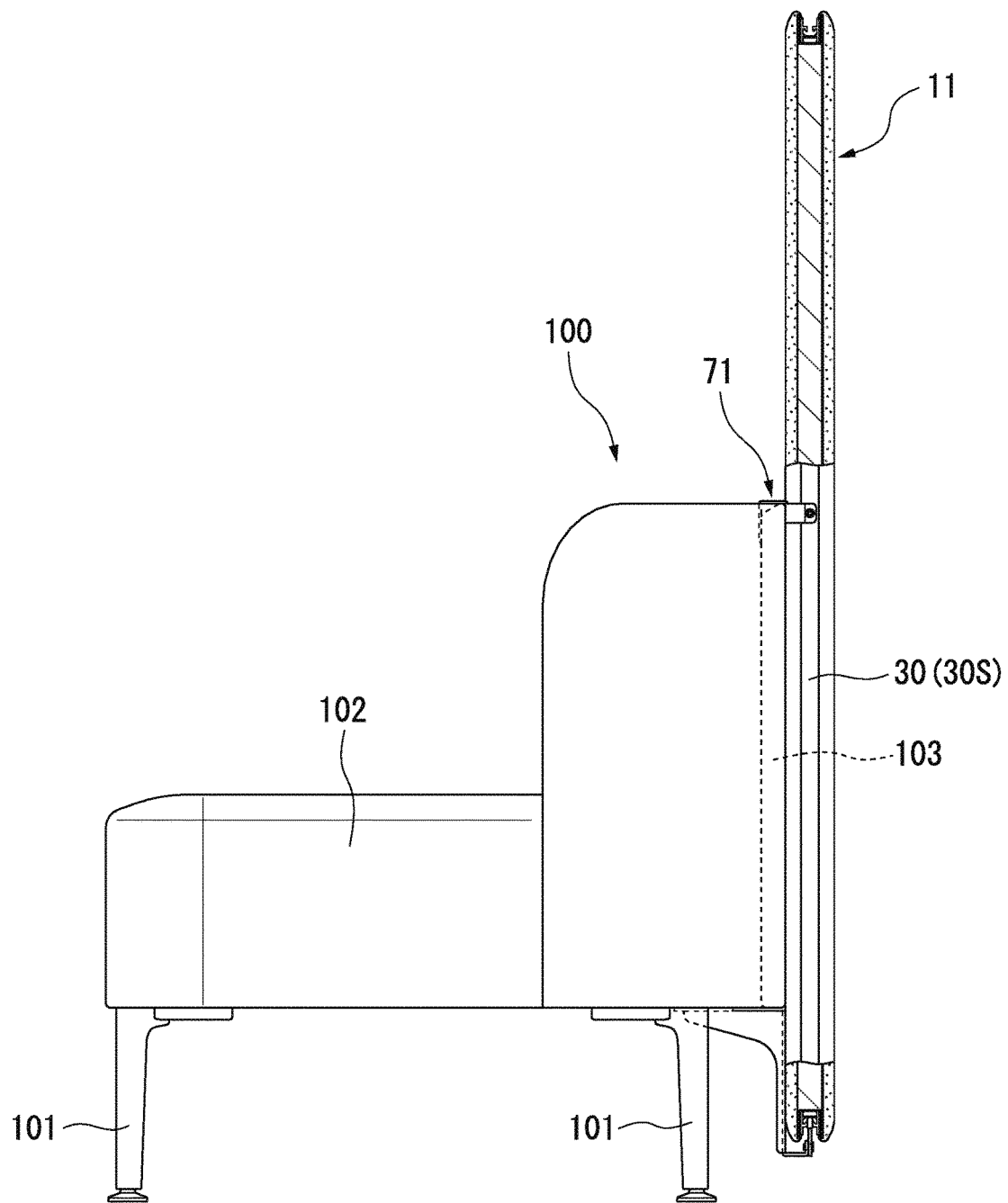
FIG. 20 is a side view showing a structure of a linking part between a sofa and the panel body.
Figure 21:
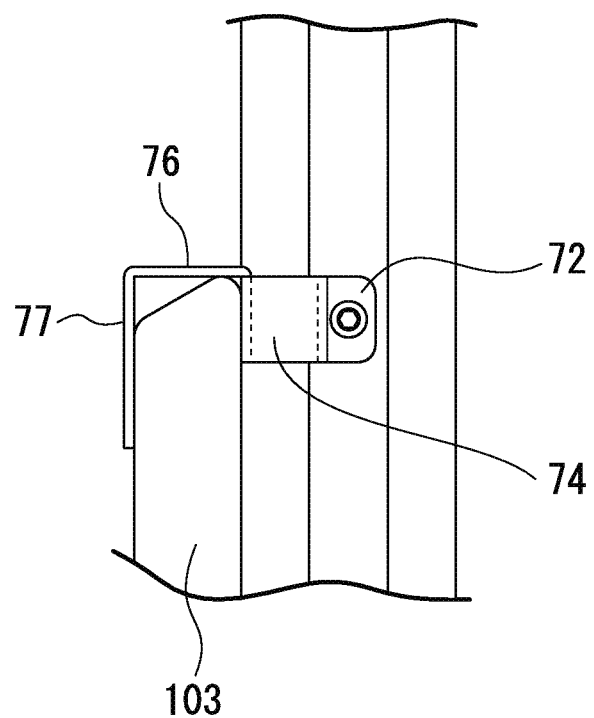
FIG. 21 is an enlarged view of the main portions of FIG. 20.
Figure 22:
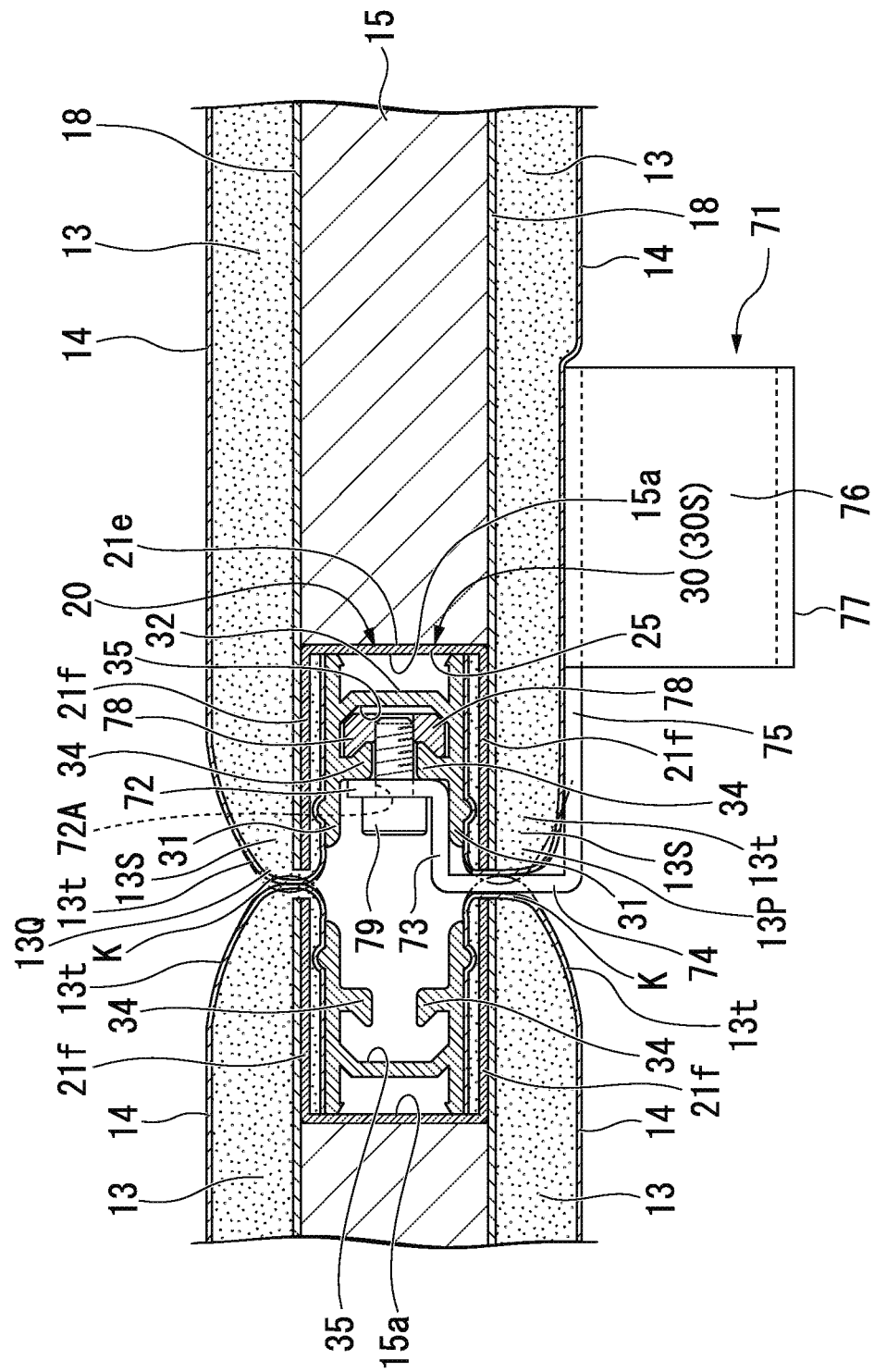
FIG. 22 is a sectional view showing a structure of the linking part between the sofa and the panel body.
Figure 23:
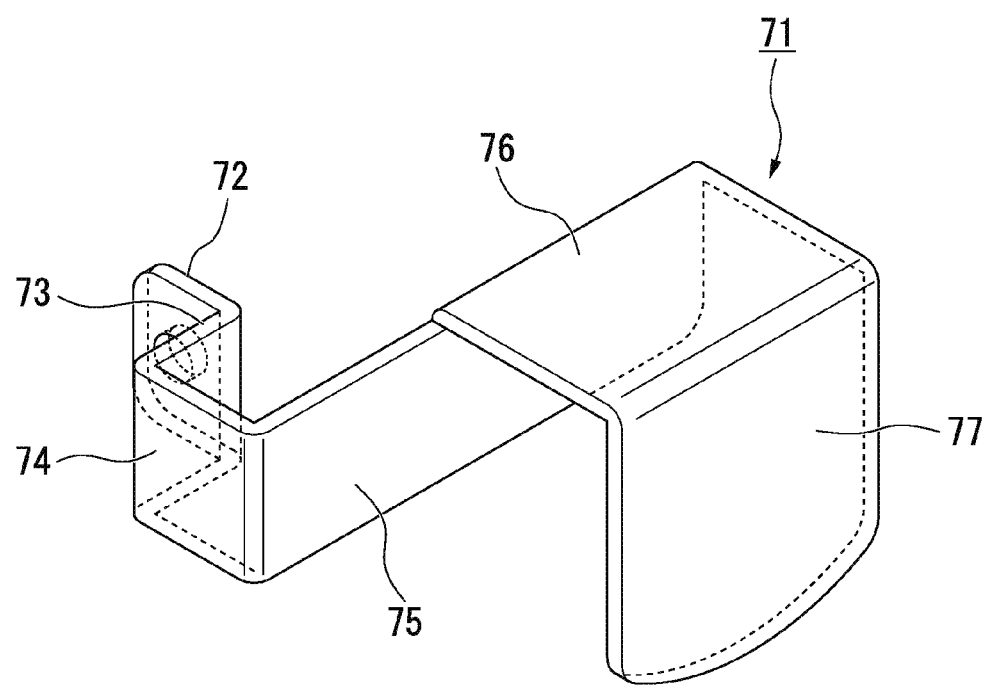
FIG. 23 is a perspective view of a linking member which links the sofa and the panel body to each other.

FIG. 20 is a side view showing a structure of the linking part between the sofa 100 and the panel body 11. FIG. 21 is an enlarged view of main portions of FIG. 20. FIG. 22 is a sectional view showing a structure of the linking part between the sofa 100 and the panel body 11. FIG. 23 is a perspective view of a furniture upper linking member 71 which links the sofa 100 and the panel body 11.

As shown in FIGS. 20 and 23, an upper portion of the sofa 100 and an upper portion of the panel body 11 are linked to each other via the furniture upper linking member (bracket) 71.

The furniture upper linking member 71 includes a locking portion (attaching portion) 72 which is attached to the end portion (wall surface) in the width direction of the panel body 11; and a side wall portion 73 which is curved from the end portion of the locking portion 72, and extends along the side part plate portion 31 of the straight line part fixing member 30S provided in the groove 25 of the panel base material 12. The furniture upper linking member 71 includes an outer wall portion 74 which is curved from the end portion of the side wall portion 73, and extends along the outer circumferential end portion 13s of the panel body 11; and a nipping wall portion 75 which is curved from the end portion of the outer wall portion 74, extends along the cover material 14 of the panel body 11. The furniture upper linking member 71 includes an upper wall portion 76 which is disposed along an upper end of the backrest portion 103 of the sofa 100; and a front wall portion 77 which is disposed along a front surface of the backrest portion 103 from the end portion of the upper wall portion 76.

In the locking portion 72 of the furniture upper linking member 71, a through hole 72A is formed. A bolt 79 which is inserted from the through hole 72A is provided in the holding groove 35 of the straight line part fixing member 30S fixed to the frame material 21A (or frame material 21B) of the panel body 11, and is screwed to a base portion 78 in which a female screw is provided. In this manner, in a state where the furniture upper linking member 71 is attached to the panel body 11, the upper portion of the backrest portion 103 of the sofa 100 is nipped by the nipping wall portion 75 and the front wall portion 77 of the furniture upper linking member 71.

At this time, a cushion member 13P on a side where the outer wall portion 74 of the furniture upper linking member 71 is disposed in the panel body 11, is pressed by the outer wall portion 74. Accordingly, a width dimension of the cushion member 13P on the side where the furniture upper linking member 71 is disposed, is shorter than a width dimension of a cushion member 13Q on a side where the furniture upper linking member 71 is not disposed. The end portion of the cushion member 13Q, and the end surface of the outer wall portion 74 of the furniture upper linking member 71 disposed along the cushion member 13P, are in a plane.

In other words, the groove 25 is formed toward the inside from the outer circumferential end surface (side surface) 15a, in the core material 15 of one panel body 11. In a state where the furniture upper linking member 71 is not attached, the protrusion portions 13t and 13t of the opposing cushion materials 13 and 13 abut against each other. When the furniture upper linking member 71 is disposed to abut against one protrusion portion 13t, the protrusion portion 13t of the cushion material 13 is elastically deformed in the direction in which the width dimension of the cushion material 13 becomes short, and a void portion K in which the furniture upper linking member 71 can be disposed between the panel bodies 11 and 11 is formed. The void portion K is formed to communicate with the groove 25 from both front and rear surface sides of the panel base material 12, between the outer circumferential end surface 15a of one core material 15 and the other panel body 11. The furniture upper linking member 71 is disposed to pass through the void portion K from the inside of the groove 25, and the nipping wall portion 75, the upper wall portion 76, and the front wall portion 77 are disposed on one surface of the panel base material 12.

In this state, the protrusion portion 13t of the cushion member 13Q on the side where the furniture upper linking member 71 is not disposed, and the protrusion portion 13t of the cushion material 13 of the other panel body 11 which opposes the cushion member 13Q, presses against each other in the opposing direction. Accordingly, the tip end parts of the protrusion portions 13t and 13t are elastically deformed to be round. Accordingly, the abutting area of the protrusion portions 13t and 13t which abut against each other, increases.

The protrusion portion 13t of the cushion member 13P on the side where the furniture upper linking member 71 is disposed, and the protrusion portion 13t of the cushion material 13 of the other panel body 11 opposing the cushion member 13P, presses against each other in the opposing direction via the outer wall portion 74 of the furniture upper linking member 71. Accordingly, the tip end parts of the protrusion portions 13t and 13t are elastically deformed to be round. Accordingly, the abutting area of the protrusion portions 13t and 13t which abut against each other, increases.

Figure 24:
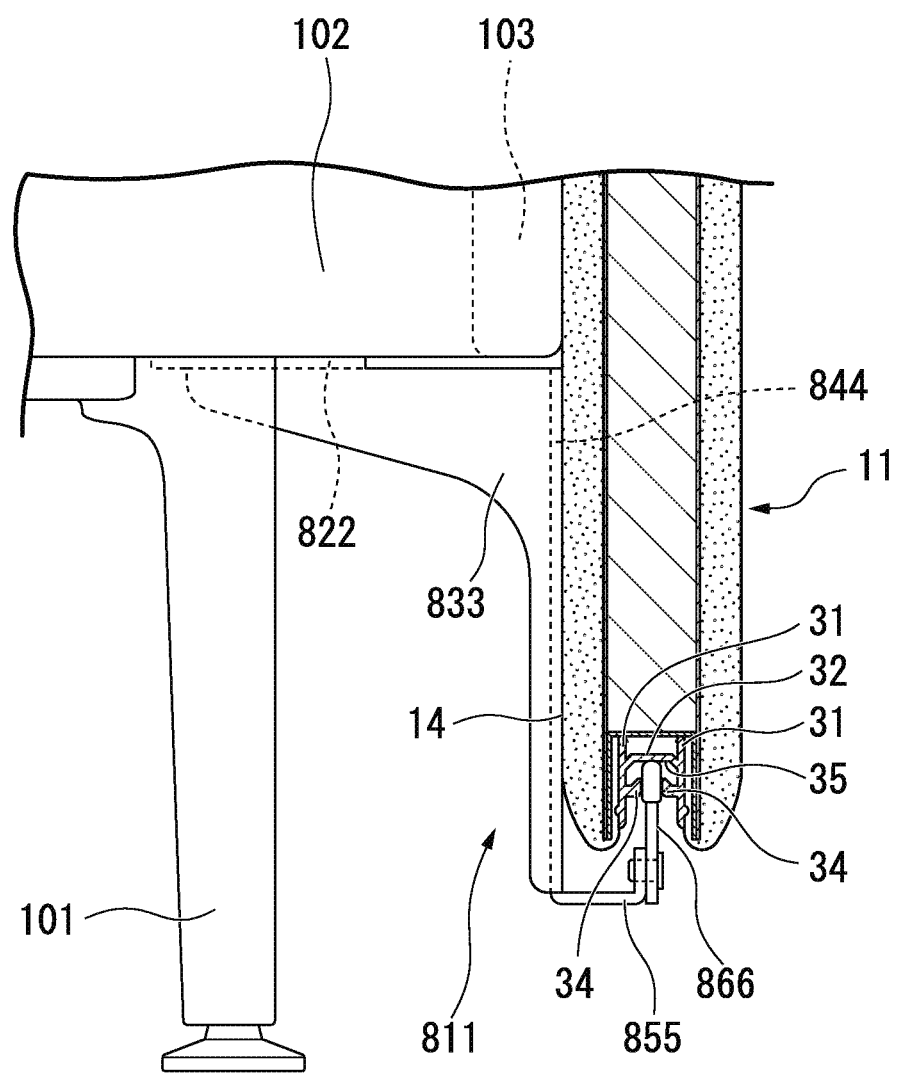
FIG. 24 is an enlarged view of main portions of FIG. 20.
Figure 25:
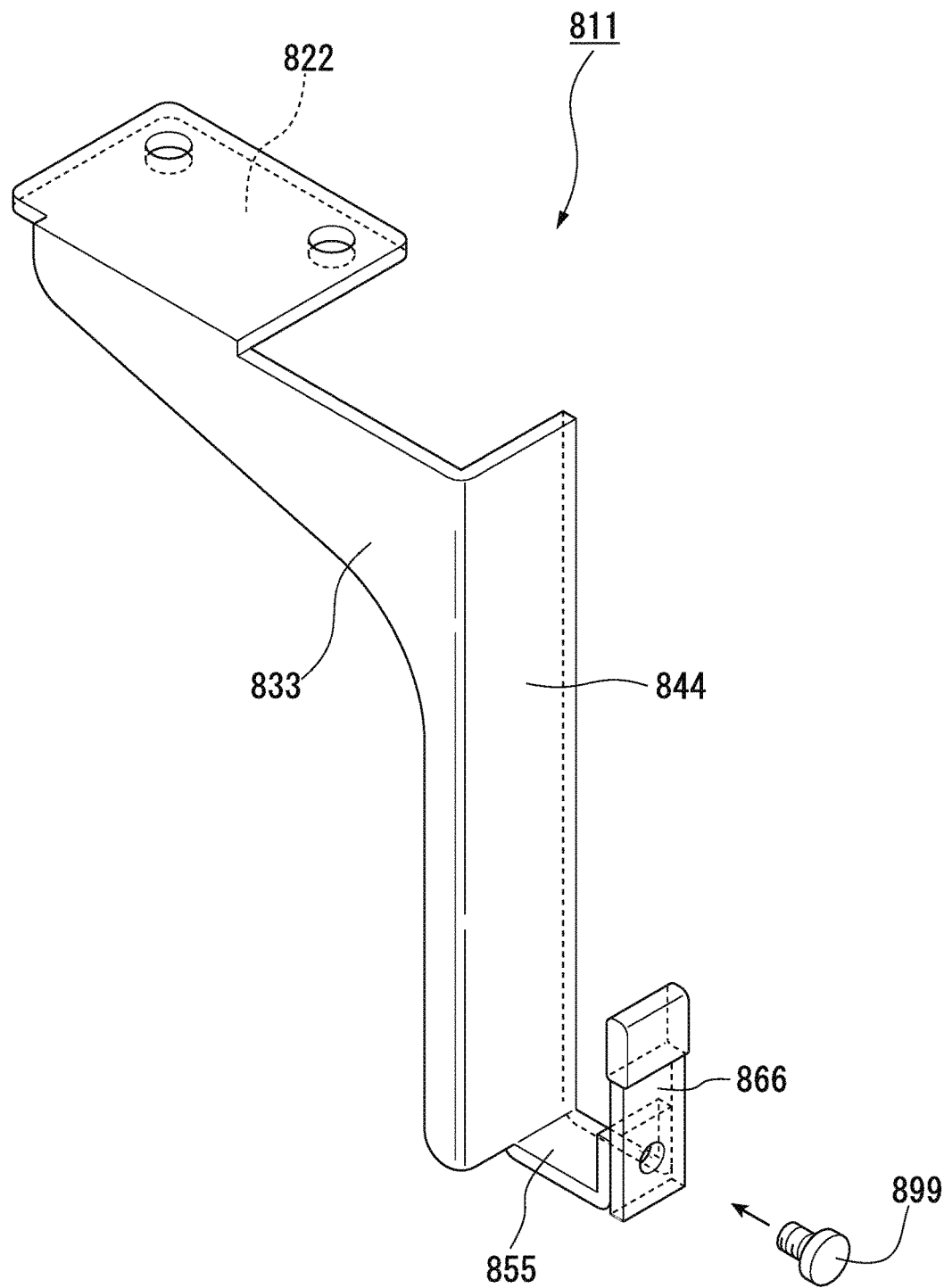
FIG. 25 is a perspective view of another linking member which links the sofa and the panel body to each other.

FIG. 24 is an enlarged view of main portions of FIG. 22. FIG. 25 is a perspective view of a furniture lower linking member 811 which links the sofa 100 and the panel body 11.

As shown in FIGS. 20, 24, and 25, a lower portion of the sofa 100 and the lower portion of the panel body 11, are linked to each other via the furniture lower linking member 811.

The furniture lower linking member 811 includes a support wall portion 822 which is attached to the lower surface of the seat portion 102 of the sofa 100 by a bolt which is not illustrated; and a curved wall portion 833 which is formed to be curved downward from the end portion of the support wall portion 822. The furniture lower linking member 811 includes a vertical wall portion 844 which is curved from an end portion of the curved wall portion 833, and is disposed along the cover material 14 of the panel body 11; a lower wall portion 855 which is curved from a lower end of the vertical wall portion 844, and extends toward the panel body 11 side; and a locking portion 866 which extends upward from an end portion of the lower wall portion 855, and is attached to the lower end of the panel body 11. The locking portion 866 and the lower wall portion 855 are made to be integrated by being screwed by a bolt 899.

The locking portion 866 of the furniture lower linking member 811 is locked by the projection strips 34 and 34 which are formed in the side part plate portion 31 of the straight line part fixing member 30S fixed to the frame material 21A (or frame material 21B) of the panel body 11.

In this manner, the panel body 11 maintains a state of being along the rear surface of the sofa 100, via the furniture upper linking member 71 and the furniture lower linking member 811.

When detaching the panel body 11 from the sofa 100, the bolt 79 which is screwed to the base portion 78 of the panel body 11 of the furniture upper linking member 71 is unfastened, and the upper wall portion 76 and the front wall portion 77 are detached from the backrest portion 103 of the sofa 100. Furthermore, the locked state of the locking portion 866 of the furniture lower linking member 811 and the projection strips 34 and 34 of the panel body 11, may be released.

(Manufacturing Method)

Next, a manufacturing method of the above-described panel body 11 will be described.

Figure 11A:
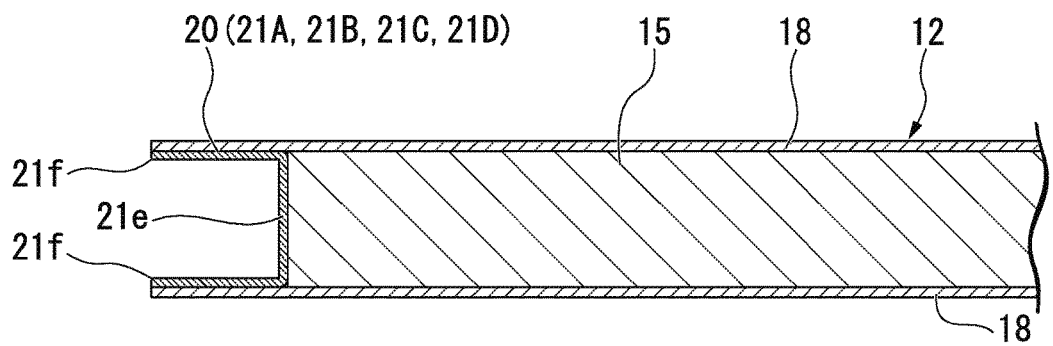
FIG. 11A is a sectional view in a state where the panel base material is assembled, in a view showing a flow of a panel body manufacturing method.
Figure 11B:
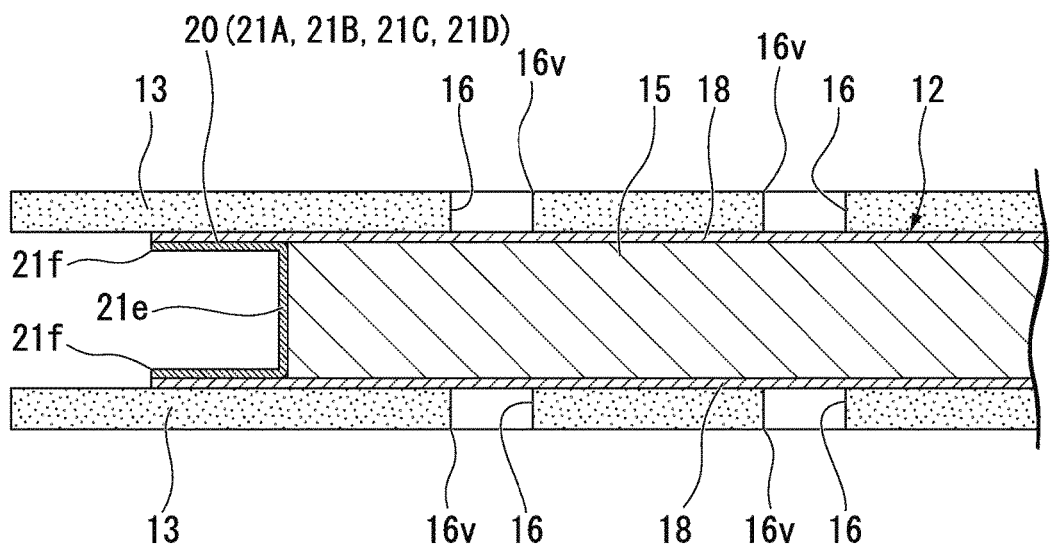
FIG. 11B is a sectional view in a state where the cushion material is provided on the surface of the panel base material, in the view showing the flow of the panel body manufacturing method.
Figure 11C:
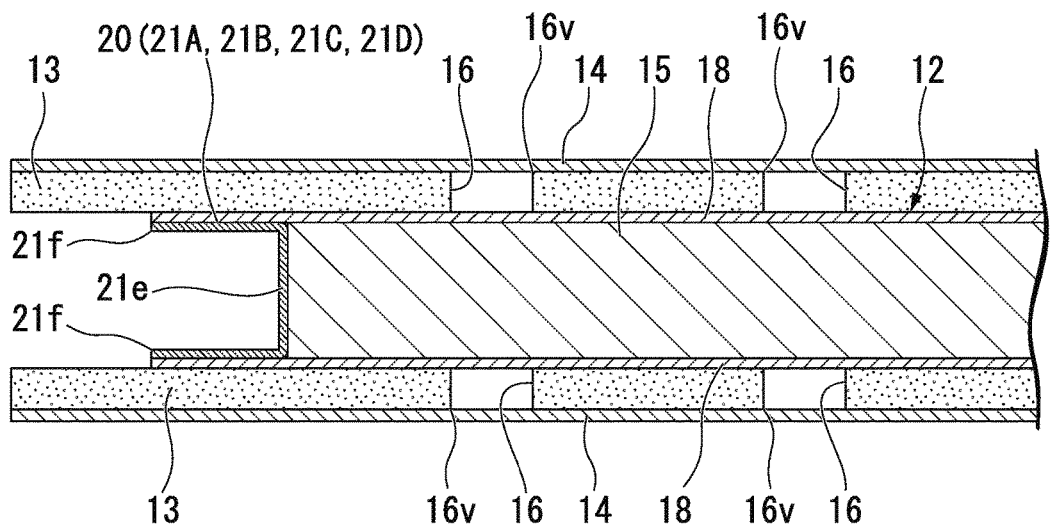
FIG. 11C is a sectional view in a state where the cover material is along the surface of the cushion material, in the view showing the flow of the panel body manufacturing method.

FIGS. 11A to 11C are views showing a flow of the manufacturing method of the panel body 11. FIG. 11A is a sectional view of a state where the panel base material 12 is assembled. FIG. 11B is a sectional view of a state where the cushion material 13 is provided on the surface of the panel base material 12. FIG. 11C is a sectional view of a state where the cover material 14 is along the surface of the cushion material 13.

(Panel Base Material Assembly Process)

First, as shown in FIG. 11A, the frame 20 having a predetermined shape is assembled.

Next, the base sheet 18 is adhered to one surface side (for example, a lower side in FIG. 11A) of the frame 20. The frame 20 is placed so that the side (one surface side) to which the base sheet 18 is adhered is oriented downward. Next, the panel-like core material 15 is put into the frame 20, and is adhered to the lower base sheet 18. Next, the base sheet 18 is adhered to the other surface side (for example, the upper side in FIG. 11A) of the frame 20 which is oriented upward. Accordingly, the panel base material 12 which is formed of the core material 15, the frame 20, and the base sheet 18 is configured.

(Cushion Material Pasting Process)

Next, as shown in FIG. 11B, on both surface sides of the panel base material 12, the cushion materials 13 in which the plurality of through holes 16 having the angle portion 16v at the circumferential edge are formed in advance, are respectively adhered to the base sheet 18. Accordingly, the uneven shape is formed on the surface of the panel base material 12 by the cushion material 13.

(Cover Material Disposing Process)

Next, as shown in FIG. 11C, the cover material 14 is disposed along the cushion material 13 to cover the cushion material 13. At this time, the adhesive is respectively coated on the cushion material 13 and the cover material 14.

(Recessed Portion Forming Process)

By pressing the material of the panel body 11 which is in a state of FIG. 11C by a press mold, the cover material 14 is formed along the uneven shape by the cushion material 13. Accordingly, the cover material 14 is tightly adhered in accordance with the shape of the cushion material 13. As a result, the cover material 14 is adhered to be along the outer surface 13f of the cushion material 13, the inner circumferential surface 16f which is orthogonal to the outer surface 13f in the through hole 16, and the exposed surface 18f of the base sheet 18 which is exposed in a bottom portion of the through hole 16. Accordingly, as shown in FIG. 7B, the cover material 14 is along the uneven shape which is made of the plurality of through holes 16 formed in the cushion material 13 and a plurality of oval recessed portions 17 are formed on the surface of the panel body 11.

In this manner, as a result of making the cover material 14 adhered, in the cushion material 13, the angle portion 16v which is projected to the outside at the circumferential edge of the through hole 16 on the outer surface 13f side is pressed to the inner side by the cover material 14. Accordingly, the cushion material 13 is elastically deformed in the direction of compression in the angle portion 16v, and the angle portion 16v of the through hole 16 becomes an arc-shaped section.

(Fixing Member Mounting Process)

Next, as shown in FIGS. 5A and 6A, the outer circumferential end portions 13e and 14e of the cushion material 13 and the cover material 14 which become wider to the outer circumferential side than the outer circumferential edge portion of the frame 20, go around the outer circumferential edge portion of the panel base material 12, and are caught in the groove 25.

In addition, the straight line part fixing member 30S, the corner portion fixing member 30C, and the support leg 50 which configure the fixing member 30, are fitted and fixed to the groove 25.

Accordingly, the panel body 11 is completed.

The above-described panel body 11 includes the panel base material 12; the groove 25 which is continuous along the outer circumferential end portion of the panel base material 12, and is recessed to the inside of the panel base material 12; the cushion material 13 which is provided on both surfaces of the panel base material 12; the cover material 14 which covers the panel base material 12 and the cushion material 13, and in which the outer circumferential end portion 14e is caught in the groove 25 in the outer circumferential edge portion of the panel base material 12; and the fixing member 30 which fixes the cover material 14 in the groove 25.

Accordingly, in the outer circumferential portion of the panel body 11, the cover material 14 which covers the panel base material 12 and the cushion material 13 goes around the outer circumferential edge portion of the panel base material 12, and is caught in the groove 25. Therefore, the outer circumferential portion of the panel body 11 is covered by the cover material 14 without exposing the panel base material 12. Furthermore, since the cover material 14 is fixed by the fixing member 30 in the groove 25, it is possible to prevent the fixing member 30 from being exposed to the outer circumferential portion of the panel body 11. When approaching the outer circumferential end portion 11s, the thickness of the panel body 11 gradually decreases, and at a part where the cushion material 13 and the cover material 14 go around the side wall portion 21f of each of the frame materials 21A, 21B, 21C, and 21D, the panel body 11 is formed in a circular arc shape. Accordingly, the appearance of the panel body 11 can have a soft and organic impression.

By nipping the cover material 14 by the fixing member 30 fitted into the groove 25, it is possible to reliably fix the outer circumferential portion of the cover material 14 into the groove 25.

In addition, in the fixing member 30, the space S1 in which a residual portion of the outer circumferential end portions 13e and 14e of the cushion material 13 and the cover material 14 is accommodated, is formed between the fixing member 30 and the groove 25.

By accommodating the residual portion of the outer circumferential end portion 14e of the cover material 14 in the space S1, the residual portion of the cover material 14 is nipped between the groove 25 and the fixing member 30, and it is possible to prevent the fixing member 30 from floating. In this manner, it is possible to excellently hold the cover material 14 into the groove 25.

The fixing member 30 includes the straight line part fixing member 30S which is disposed at the straight line part 12S of the outer circumferential portion of the panel base material 12; and the corner portion fixing member 30C which is disposed in the corner portion 12C of the outer circumferential end portion 14e of the panel base material 12.

Accordingly, it is possible to separately perform work of mounting the straight line part fixing member 30S on the straight line part 12S of the panel base material 12, and work of mounting the corner portion fixing member 30C on the corner portion 12C of the panel base material 12. In the corner portion 12C of the panel base material 12, the work of catching the cover material 14 into the groove 25 takes effort compared to the straight line part 12S. By separately performing the work of mounting the corner portion fixing member 30C and the work of mounting the straight line part fixing member 30S, the work is likely to be smoothly performed.

The fixing member 30 includes the side part plate portions 31 and 31 which oppose the side wall portions 21f and 21f on both sides that form the groove 25, and nip the outer circumferential end portion 14e of the cover material 14 between the side wall portion 21f and the side plate portions 31 and 31; and the linking plate portion 32 which links the side plate portions 31 and 31 on both sides to be integrated.

Accordingly, the side part plate portions 31 and 31 on both sides can nip and fix the outer circumferential end portions 13e and 14e of the cover material 14 between the side wall portion 21f that forms the groove 25 and the side part plate portions 31 and 31.

The linking plate portion 32 is formed to be more offset in the direction of being separated from the bottom surface of the groove 25, than the tip end portions 31a and 31a of the side part plate portions 31 and 31 on both sides.

Accordingly, the space S1 is formed at a part which is surrounded by the tip end portions 31a and 31a sides of the side part plate portions 31, the linking plate portion 32, and the bottom surface of the groove 25. The space S1 functions as an accommodation space which can accommodate the residual portion of the outer circumferential end portion 14e of the cover material 14 in the groove 25.

In the side plate portion 31, the projections 33 and 33 are formed on a side opposing the side wall portions 21f of the groove 25. The projections 33 and 33 bite into the outer circumferential end portion 13e of the cushion material 13 and the outer circumferential end portion 14e of the cover material 14 which are nipped between the side part plate portion 31 and the side wall portions 21f on both sides of the groove 25. Accordingly, the fixing member 30, the cushion material 13, and the cover material 14 are prevented from falling out of the groove 25.

As shown in FIGS. 5B and 6B, in the partition equipment 10 configured in this manner, the adjacent panel bodies 11 and 11 are fixed by the lower side linking portion 55 and the upper side linking portion 61 so that the core material 15 of one panel body 11 is separated from the outer surface of the other panel body 11, that is, the cover material 14. In this state, the protrusion portion 13t of the cushion material 13 which protrudes further toward the other panel body 11 side than the outer circumferential end surface 15a of the core material 15 of the one panel body 11, abuts against the protrusion portion 13t of the other panel body 11. In other words, a void is not generated between the protrusion portions 13t and 13t. Accordingly, the light on the rear side of the panel bodies 11 and 11, is blocked by the abutting part of the protrusion portions 13t and 13t of the cushion materials 13 and 13. Accordingly, it is possible to prevent the light on the rear side of the panel bodies 11 and 11 from getting into the front side of the panel bodies 11 and 11 from the linking part of the adjacent panel bodies 11 and 11. Therefore, even in a case where the core material 15 of one panel body 11 is disposed to be separated from the other panel body 11, it is possible to prevent the light from leaking from between the panel bodies 11 and 11.

In addition, since the cushion material 13 and the cover material 14 cover the entire core material 15, it is possible to make appearance having a uniform feeling across the entire panel body 11 in a front view. Therefore, it is possible to achieve an excellent appearance of the partition equipment 10.

In addition, the outer circumferential end portions 13e and 14e of the cushion material 13 and the cover material 14 go around the outer circumferential edge portion of the panel base material 12, that is, the side wall portion 21f of each of the frame materials 21A, 21B, 21C, and 21D, and are caught in the groove 25. Accordingly, the cushion materials 13 and 13 abut against each other across the caught part in a planar shape. Therefore, since the abutting area of the cushion materials 13 and 13 increases, it is possible to further prevent the light from leaking.

In addition, since the cushion material 13 can be elastically deformed, the protrusion portion 13t of the cushion material 13 is pressed to each other and elastically deformed, at the abutting part between the protrusion portion 13t of the cushion material 13 and the protrusion portion 13t of the other cushion material 13. Therefore, since the abutting area of the cushion materials 13 and 13 increases, it is possible to further prevent the light from leaking.

Upper portions of the adjacent panel bodies 11 and 11 are linked to each other by the upper side linking portion 61, and the lower portions of the adjacent panel bodies 11 and 11 are linked to each other by the lower side linking portion 55. Therefore, it is possible to stably link the adjacent panel bodies 11 and 11 across the vertical direction.

Furthermore, in the above-described panel body 11, the outer circumferential end portion 13e of the cushion material 13 is caught in the groove 25 at the outer circumferential edge portion of the panel base material 12 together with the cover material 14. In this manner, since not only the cover material 14, but also the cushion material 13 covered by the cover material 14, goes around the outer circumferential edge portion of the panel base material 12 and is caught in the groove 25, the impression of the appearance of the outer circumferential portion of the panel body 11 becomes softer.

The cushion material 13 forms the unevenness shape on the surface of the panel base material 12 by the through hole 16, and the cover material 14 forms the recessed portion 17 by covering the panel base material 12 and the cushion material 13 along the uneven shape.

In this manner, since the recessed portion 17 is formed at the part covered by the cover material 14, the design of the panel body 11 is improved.

The cushion material 13 forms the uneven shape having the angle portion 16v on the surface of the elastic panel base material 12, and the cover material 14 elastically deforms the angle portion 16v in the direction of compression and covers the cushion material 13 and the panel base material 12.

Accordingly, in the formed recessed portion 17, the angle portion 16v of the cushion material 13 is elastically deformed in the direction of compression by the cover material 14. Therefore, the cover material 14 is pressed by the repulsive force of the angle portion 16v at a part where the cover material 14 abuts against the angle portion 16v. Therefore, the shape of the recessed portion 17 is maintained, and the cover material 14 stretches in the direction shown by an arrow T in FIG. 7B in the direction along the outer surface 13f of the cushion material 13, and can prevent the cover material 14 from becoming loose.

In this manner, it is possible to provide the panel body 11 having excellent design at a low cost.

In addition, in the cushion material 13, the through hole 16 having the angle portion 16v at the circumferential edge is formed.

Accordingly, it is possible to form an uneven shape on the surface of the panel base material 12.

If the size of the cushion material 13 is smaller than the size of the surface of the panel base material 12, it is possible to form the uneven shape on the surface of the panel base material 12 by the angle portion 16v in the outer circumferential edge portion of the cushion material 13. In this case, in order to form the uneven shape according to the design, it is necessary that the cushion material 13 is accurately positioned relative to the surface of the panel base material 12. Meanwhile, when the through hole 16 is formed in the cushion material 13, only by disposing the cushion material 13 along the surface of the panel base material 12, it is possible to accurately realize the uneven shape. Accordingly, a degree of freedom of design of the uneven shape is improved.

In the cushion material 13, the through hole 16 having the angle portion 16v on the circumferential edge is formed. The cover material 14 is directly adhered to the exposed surface 18f of the base sheet 18 which is a surface of the panel base material 12 through the through hole 16.

Accordingly, compared to a case where the uneven shape is formed by the recessed portion which does not penetrate the cushion material 13, in the recessed portion 17 formed at the part covered by the cover material 14, the step becomes large, dynamic, and the design is improved.

The cushion material 13 is generally formed of a sponge-like porous material or the like. In this case, it is difficult to ensure the adhering strength since the contact area between the cushion material 13 and the cover material 14 is small. Meanwhile, since the cover material 14 is directly adhered to the surface of the panel base material 12 on the inner side of the through hole 16, the cover material 14 and the cushion material 13 are adhered so as to form a surface. Therefore, compared to the part where the cover material 14 is adhered to the cushion material 13, the cover material 14 is firmly adhered. Accordingly, it is possible to prevent the cover material 14 from being peeled as time elapses, and to stably maintain the shape over a long period of time.

Furthermore, the cover material 14 is formed of an elastically deformable material, and covers the cushion material 13 and the panel base material 12 in a stretched state.

Accordingly, the cover material 14 stretches, and the design is improved.

Here, the panel base material 12 includes the core material 15 having the honeycomb structure, and sheet materials which are provided on both surfaces of the core material 15. Accordingly, the panel base material 12 has sufficient strength while being light in weight.

In addition, the above-described manufacturing method of the panel body 11 includes a process of pasting the cushion material 13 onto the surface of the panel base material 12; a process of disposing the cover material 14 to cover the panel base material 12 and the cushion material 13; and a process of matching the cover material 14 to the uneven shape by pressing the cover material 14 against the cushion material 13, and elastically deforming the angle portion 16v of the cushion material 13 in the direction of compression by the cover material 14. Accordingly, it is possible to manufacture the above-described panel body 11.

Modification Examples

Figure 17:
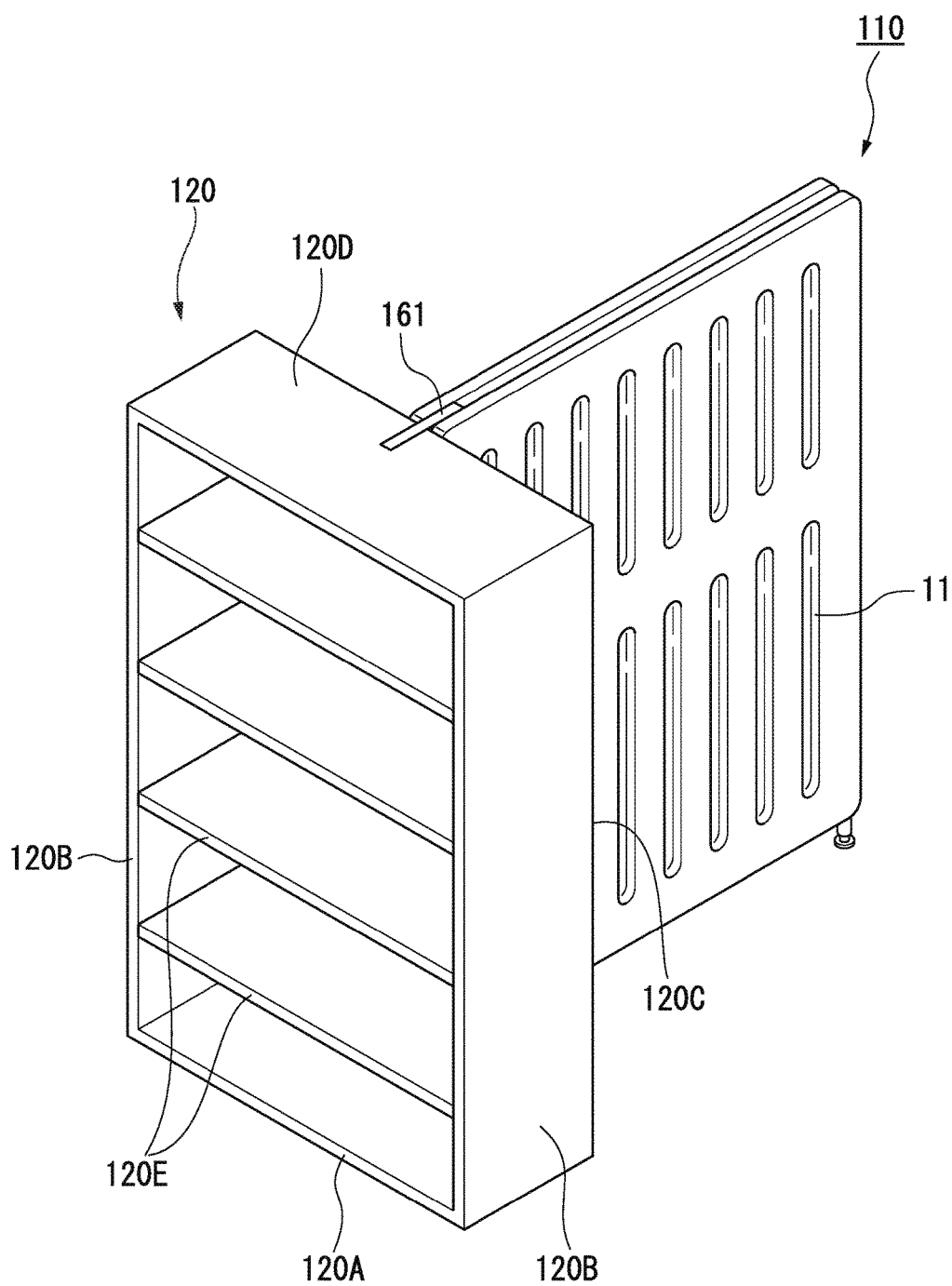
FIG. 17 is a perspective view showing an example of a furniture system in the modification example.
Figure 18:
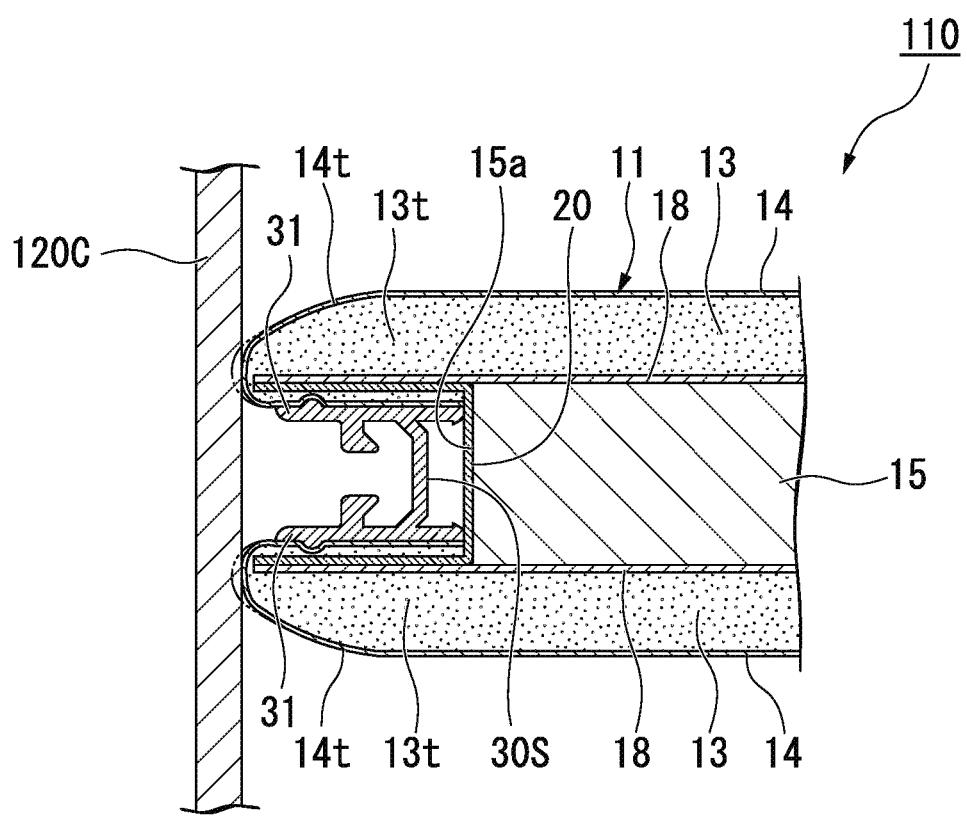
FIG. 18 is a sectional view showing a structure of the linking part between the panel body and furniture of the furniture system in the modification example.

Modification examples of the above-described embodiment will be described. As shown in FIGS. 17 and 18, the partition equipment 110 of the modification example includes the panel body 11, and shelves 120 which are provided in the end portion of the panel body 11.

The shelves 120 include a bottom board 120A; one pair of side boards 120B and 120B which extend upward from both ends of the bottom board 120A; a rear board 120C which links the side boards 120B and 120B to each other; and a top board 120D which links the side boards 120B and 120B, and the rear board 120C, and is disposed on the side opposite to the bottom board 120A. The selves 120 include a plurality of shelf boards 120E and 120E disposed to be separated in the vertical direction between the bottom board 120A and the top board 120D.

The rear board 120C side of the top board 120D of the selves 120, and the selves 120 side of the upper end of the panel body 11, are linked to each other by a linking member 161. Similarly, the rear board 120C side of the bottom board 120A of the selves 120, and the selves 120 side of the lower end of the panel body 11, are linked to each other by the linking member which is not shown.

In the partition equipment 110, the protrusion portions 13t and 14t of the cushion material 13 and the cover material 14 abut against the rear board 120C of the selves 120, and a void is not generated between the cushion material 13 and the rear board 120C. Accordingly, it is possible to prevent the light on the rear side of the panel body 11 from getting into the front side of the panel body 11 from the linking member between the panel body 11 and the selves 120. Therefore, even in a case where the core material 15 of the panel body 11 is disposed to be separated from the selves 120, it is possible to prevent the light from leaking from the linking part between the panel body 11 and the selves 120.

(Modification Example of Sectional Shape of Fixing Member 30)

In the embodiment, the fixing member 30 which fixes the cover material 14 in the groove 25 is described as an example, but if the cover material 14 can be fixed, the fixing member 30 may be any other configuration elements. For example, the sectional shape and the structure of the fixing member 30 are not limited.

Figure 14A:
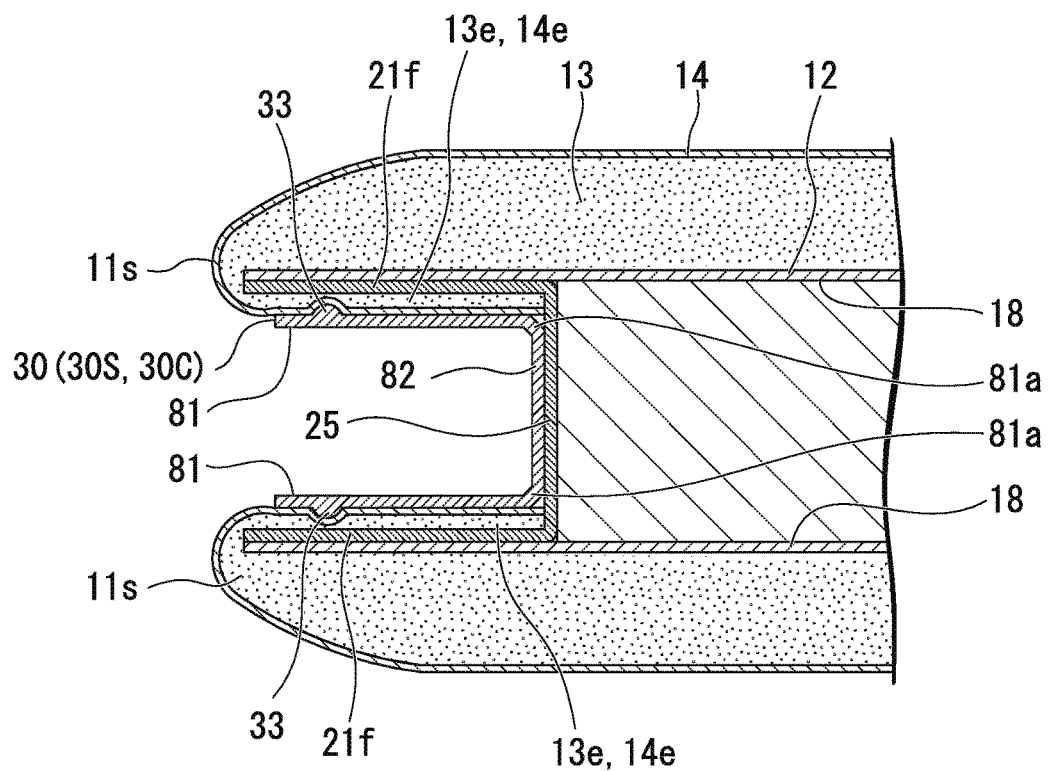
FIG. 14A is a sectional view showing two modification examples of a sectional shape of a fixing member shown in the above-described embodiment.
Figure 14B:
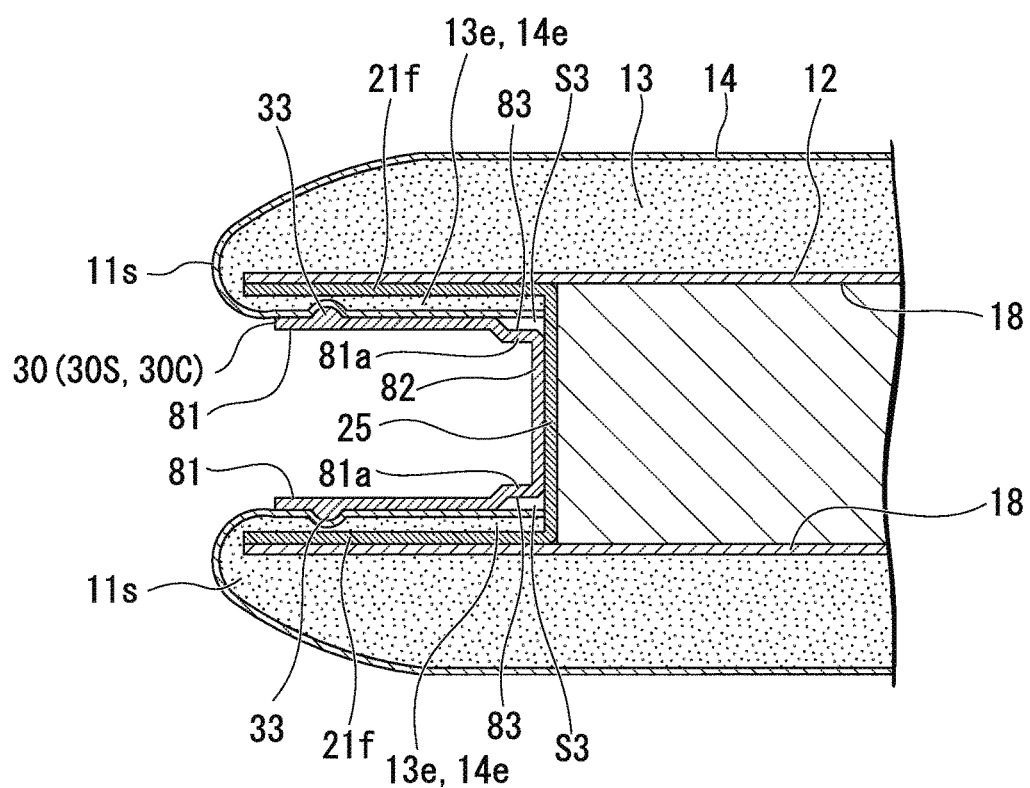
FIG. 14B is a sectional view showing two modification examples of the sectional shape of the fixing member shown in the above-described embodiment.
Figure 15:
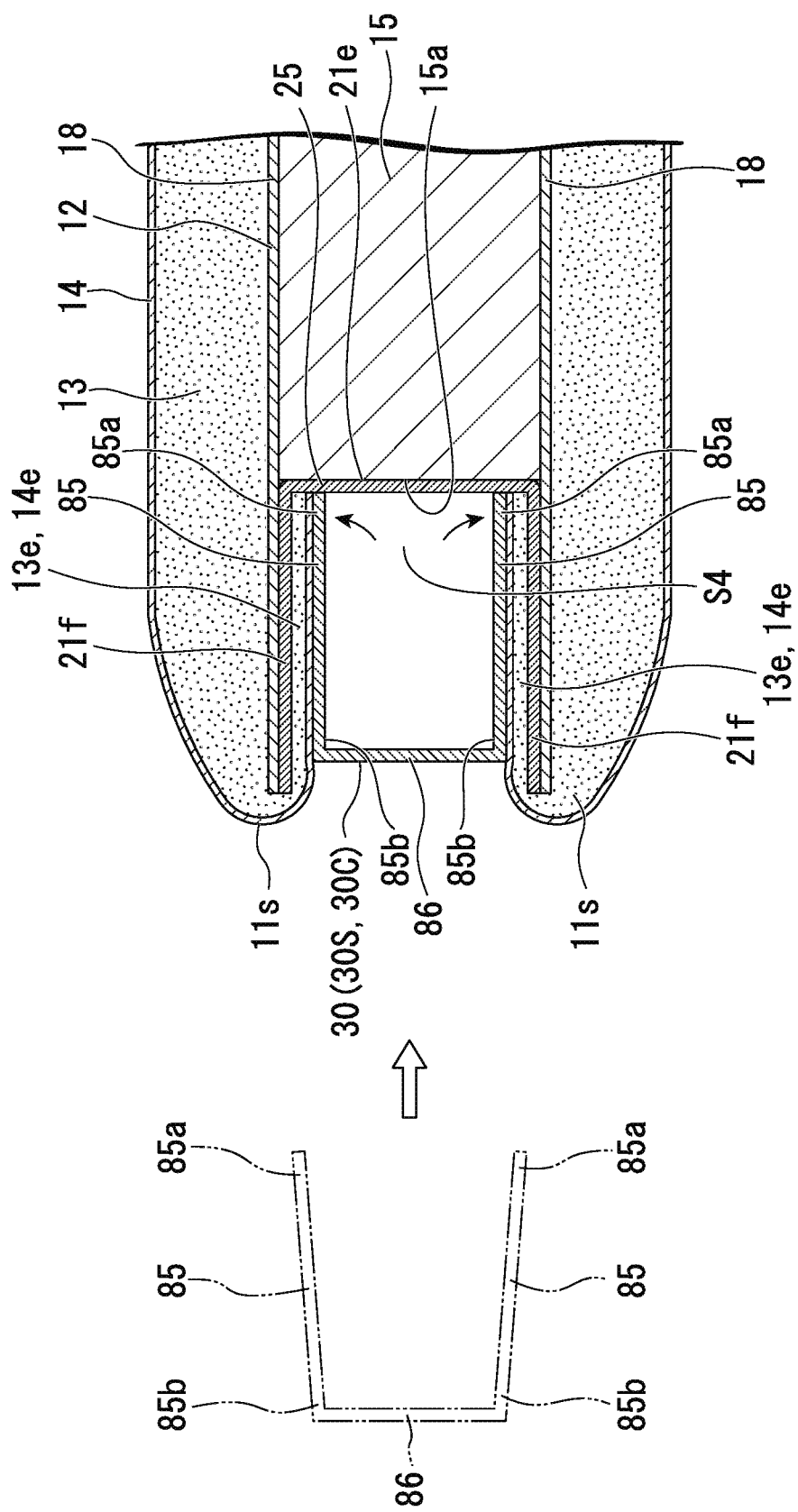
FIG. 15 is a sectional view showing another modification example of the sectional shape of the fixing member shown in the above-described embodiment.

FIGS. 14A, 14B, and 15 are views showing modification examples of the sectional shape of the fixing member 30.

In the modification example shown in FIG. 14A, the fixing member 30 (straight line part fixing member 30S, corner portion fixing member 30C) includes side part plate portions 81 and 81 which are positioned parallel to each other; and a linking plate portion 82 which integrally links the side part plate portions 81 and 81.

The side part plate portions 81 and 81 nip the outer circumferential end portions 13e and 14e of the cushion material 13 and the cover material 14 between the side part plate portions 81 and 81 and the side wall portion 21f which forms the groove 25 of the frame 20. In addition, in the side part plate portions 81 and 81, the projections 33 and 33 are formed on the side opposing the side wall portions 21f and 21f of the groove 25.

The linking plate portion 82 is formed to link tip end portions 81a and 81a of the side part plate portions 81 and 81. Accordingly, the fixing member 30 has a substantially U-shaped section, by the side part plate portions 81 and 81 and the linking plate portion 82. The fixing member 30 is formed so that the linking plate portion 82 abuts against the base portion 21e of the groove 25 in a state of being caught in the groove 25.

Furthermore, the tip end portions 81a of each side part plate portion 81 are chamfered. Accordingly, the residual portion of the outer circumferential end portions 13e and 14e of the cushion material 13 and the cover material 14 caught in the groove 25 can be accommodated between the tip end portion 81a of the side part plate portion 81, and the base portion 21e and the side wall portion 21f of the groove 25.

In the modification example shown in FIG. 14B, the fixing member 30 (straight line part fixing member 30S, corner portion fixing member 30C) includes the side part plate portions 81 and 81 which are positioned parallel to each other; and the linking plate portion 82 which integrally links the side part plate portions 81 and 81.

In the tip end portions 81a and 81a of the side part plate portions 81 and 81, a step portion 83 which is recessed in the direction of being separated from the side wall portion 21f is formed. Accordingly, at a part which is surrounded by the tip end portions 81a and 81a of the side part plate portions 81 and 81, the linking plate portion 82, and the base portion 21e and the side wall portion 21f of the groove 25, a space S3 is formed. The space S3 functions as an accommodation space which can accommodate the residual portion of the outer circumferential end portions 13e and 14e of the cushion material 13 and the cover material 14 caught in the groove 25.

A modification example of the sectional shape of the fixing member 30 (straight line part fixing member 30S, corner portion fixing member 30C) shown in FIG. 15, includes side part plate portions 85 and 85 which are positioned parallel to each other; and a linking plate portion 86 which integrally links the side part plate portions 85 and 85.

The side part plate portions 85 and 85 nip the outer circumferential end portions 13e and 14e of the cushion material 13 and the cover material 14 between the side part plate portions 85 and 85 and the side wall portion 21f which forms the groove 25 of the frame 20.

The linking plate portion 86 is formed to link base end portions 85b and 85b of the side part plate portions 85 and 85. Accordingly, the fixing member 30 has a substantially U-shaped section which is opened toward the base portion 21e of the groove 25, by the side part plate portions 85 and 85 and the linking plate portion 86. The fixing member 30 is formed so that tip end portions 85a and 85a of the side part plate portions 85 and 85 abut against the base portion 21e of the groove 25 in a state of being caught in the groove 25.

Accordingly, at a part which is surrounded by the tip end portions 85a and 85a of the side part plate portions 85 and 85, the linking plate portion 86, and the base portion 21e of the groove 25, a space S4 is formed. The space S4 functions as an accommodation space which can accommodate the residual portion of the outer circumferential end portions 13e and 14e of the cushion material 13 and the cover material 14 caught in the groove 25.

In a state where the fixing member 30 is not fitted into the groove 25, the interval between the side part plate portions 85 and 85 may be gradually widened when approaching the tip end portions 85a and 85a sides from the base end portions 85b and 85b sides on the linking plate portion 86 side.

When the fixing member 30 is fitted into the groove 25, the side part plate portions 85 and 85 are fitted into the groove 25 while the tip end portions 85a and 85a are pressed in the direction of approaching and are elastically deformed. Then, in the groove 25, the side part plate portions 85 and 85 attempt to restore their original shape by moving in the direction in which the tip end portions 85a and 85a are separated.

According to this, the outer circumferential end portions 13e and 14e of the cushion material 13 and the cover material 14 nipped between the side part plate portions 85 and 85 and the side wall portions 21f and 21f, are prevented from falling out of the groove 25.

In the partition equipment 10 configured in this manner, in a case where one pair of panel bodies 11 and 11 are linked, by disposing the locking portion 72 of the furniture upper linking member 71 in the groove 25 of the panel body 11, the nipping wall portion 75, the upper wall portion 76, and the front wall portion 77 of the furniture upper linking member 71, are provided on one surface side of the panel body 11. As the backrest portion of the sofa 100 is nipped by the nipping wall portion 75, the upper wall portion 76, and the front wall portion 77, the sofa can be attached along the panel body 11.

Since the groove 25 to which the furniture upper linking member 71 is attached is formed on the outer circumferential end surface 15a of the panel body 11 which is opposed to the other panel body 11, the cushion material 13 is provided on the surface of the panel base material 12, the attached part of the furniture upper linking member 71 is not distinct.

Since the void portion K is formed on both surface sides of the panel base material 12, it is possible to take out the furniture upper linking member 71 to both surface sides of the panel base material 12. Accordingly, since the sofa 100 can be provided on both surfaces of the panel base material 12, convenience can be improved.

The furniture upper linking member 71 of which a part is disposed in the groove 25, passes through the void portion K formed between the panel body 11 provided with the furniture upper linking member 71 and the other panel body 11, and is taken out to one surface side of the panel body 11 provided with the furniture upper linking member 71. Since the furniture upper linking members 71 are respectively pressed from the elastically deformed cushion material 13 provided with the panel body 11, and the elastically deformed cushion material 13 of the other panel body 11, it is possible to suppress generation of the void between the other panel body 11 and the furniture upper linking member 71, and between the furniture upper linking member 71 and the panel body 11 provided with the furniture upper linking member 71.

Next, with reference to the attached drawings, a second embodiment for realizing the partition equipment and a furniture system according to the present invention, will be described. In addition, the same parts as those in the above-described first embodiment, are given the same reference numerals, and a detailed description thereof will be omitted.

Figure 26:
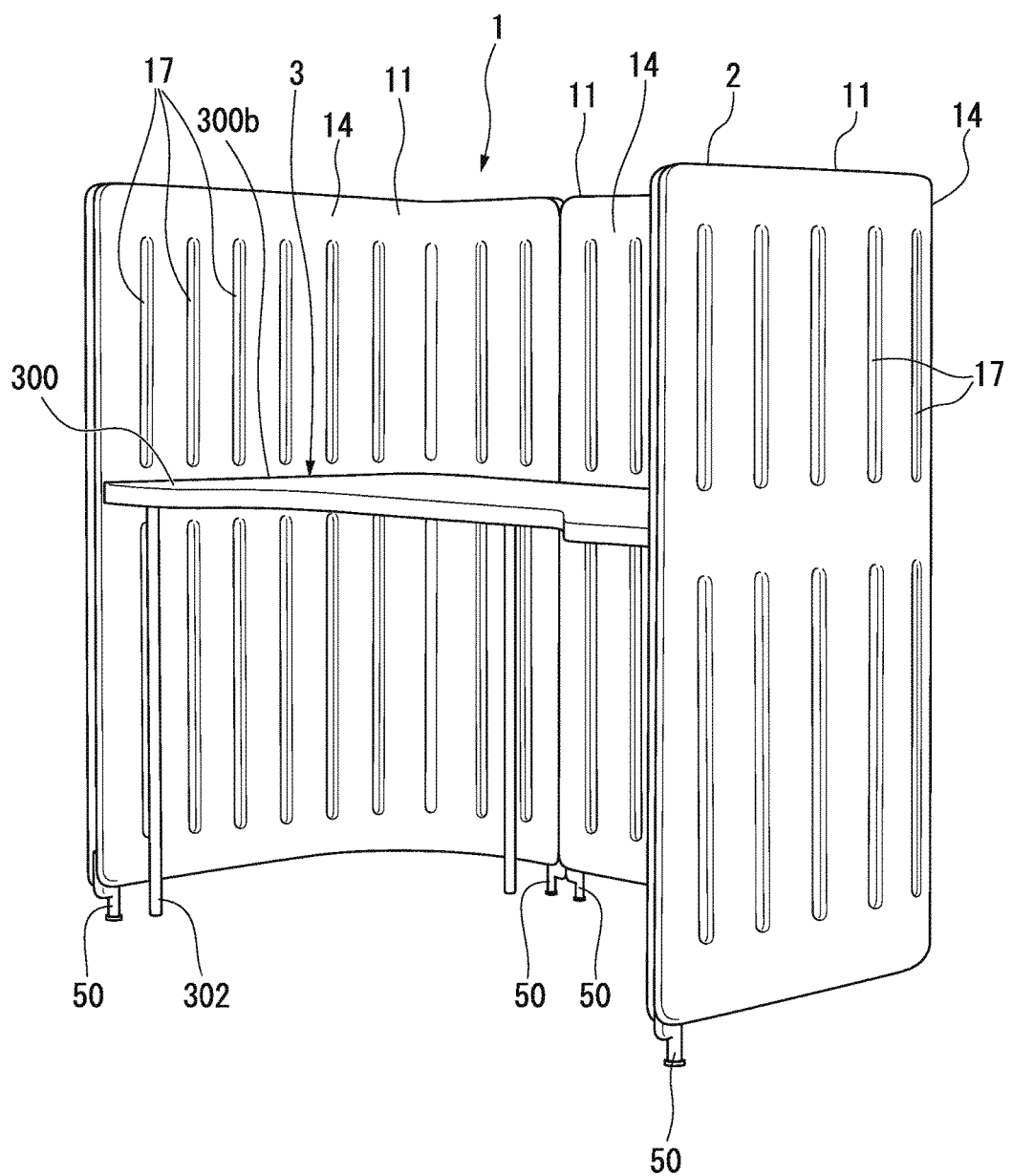
FIG. 26 is a perspective view showing the furniture system in the embodiment.
Figure 27:
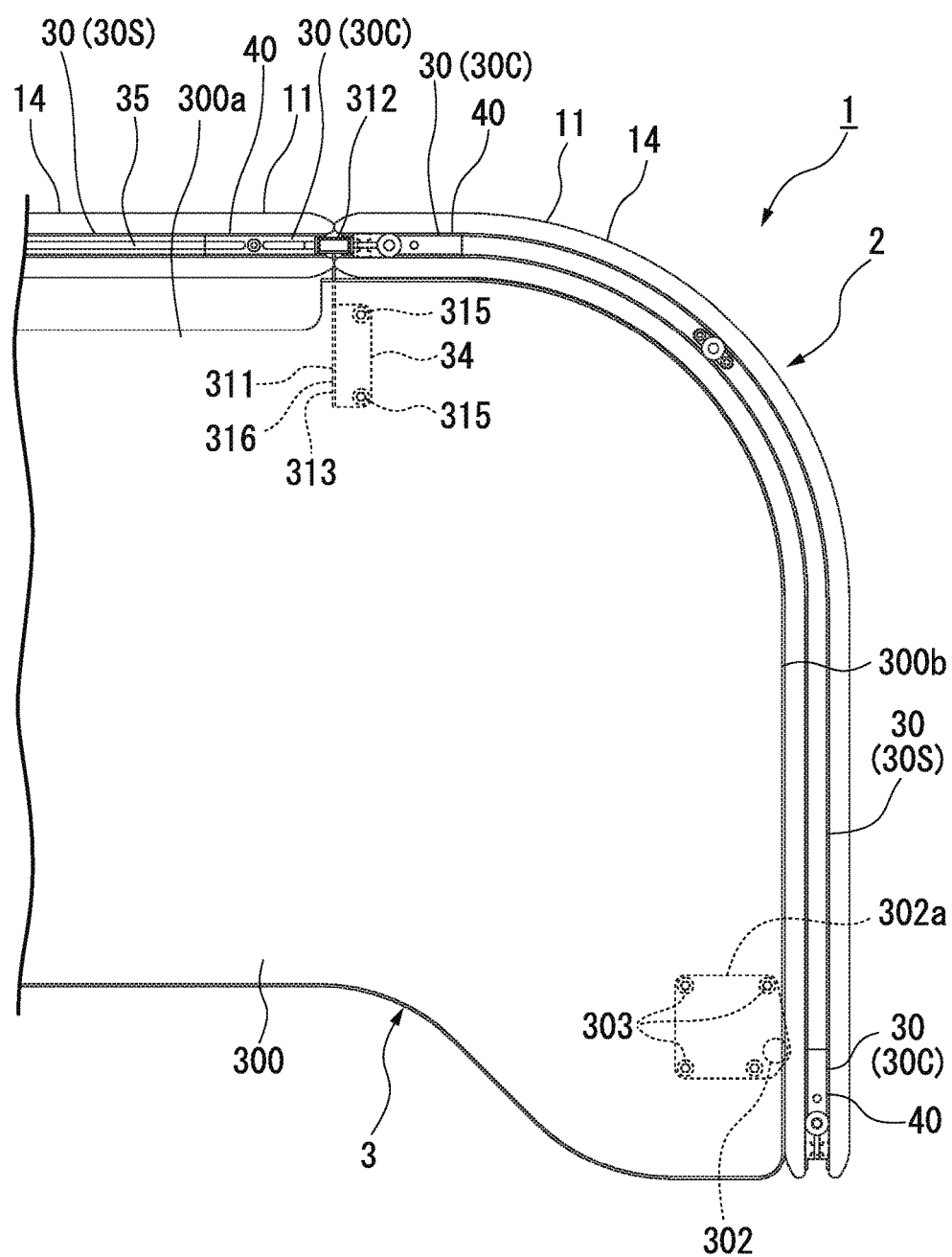
FIG. 27 is a plan view of the furniture system.
Figure 28:
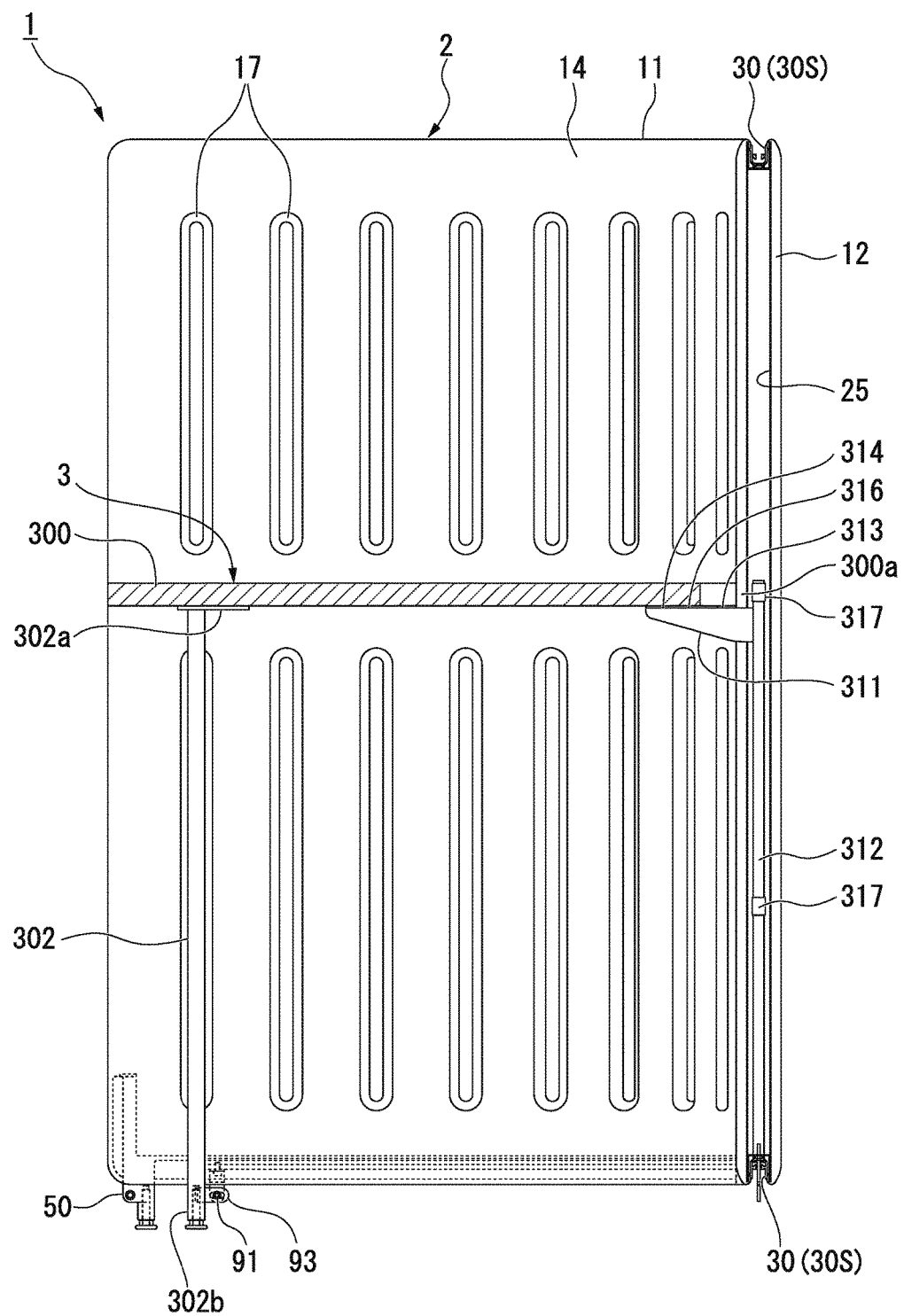
FIG. 28 is a side sectional view of the furniture system.

FIG. 26 is a perspective view showing a furniture system 1 in the embodiment. FIG. 27 is a plan view of the furniture system 1. FIG. 28 is a side sectional view of the furniture system 1.

(Furniture System)

As shown in FIGS. 26 to 28, the furniture system 1 includes partition equipment 2 and a desk (furniture) 3 which is provided along the partition equipment 2.

(Partition Equipment)

The partition equipment 2 has a configuration in which the plurality of panel bodies 11 are disposed along the outer circumferential end portion of a top board (article) 300 of the desk 3. The adjacent panel bodies 11 are linked to each other.

As shown in FIGS. 27 and 28, the partition equipment 2 supports a top board 300 of the desk 3 by a top board attaching member (article attaching member) 311 which is provided at the linking part of the panel bodies 11 and 11 which are adjacent in the direction along the outer circumferential end portion of the top board 300.

(Panel Body)

Figure 29:
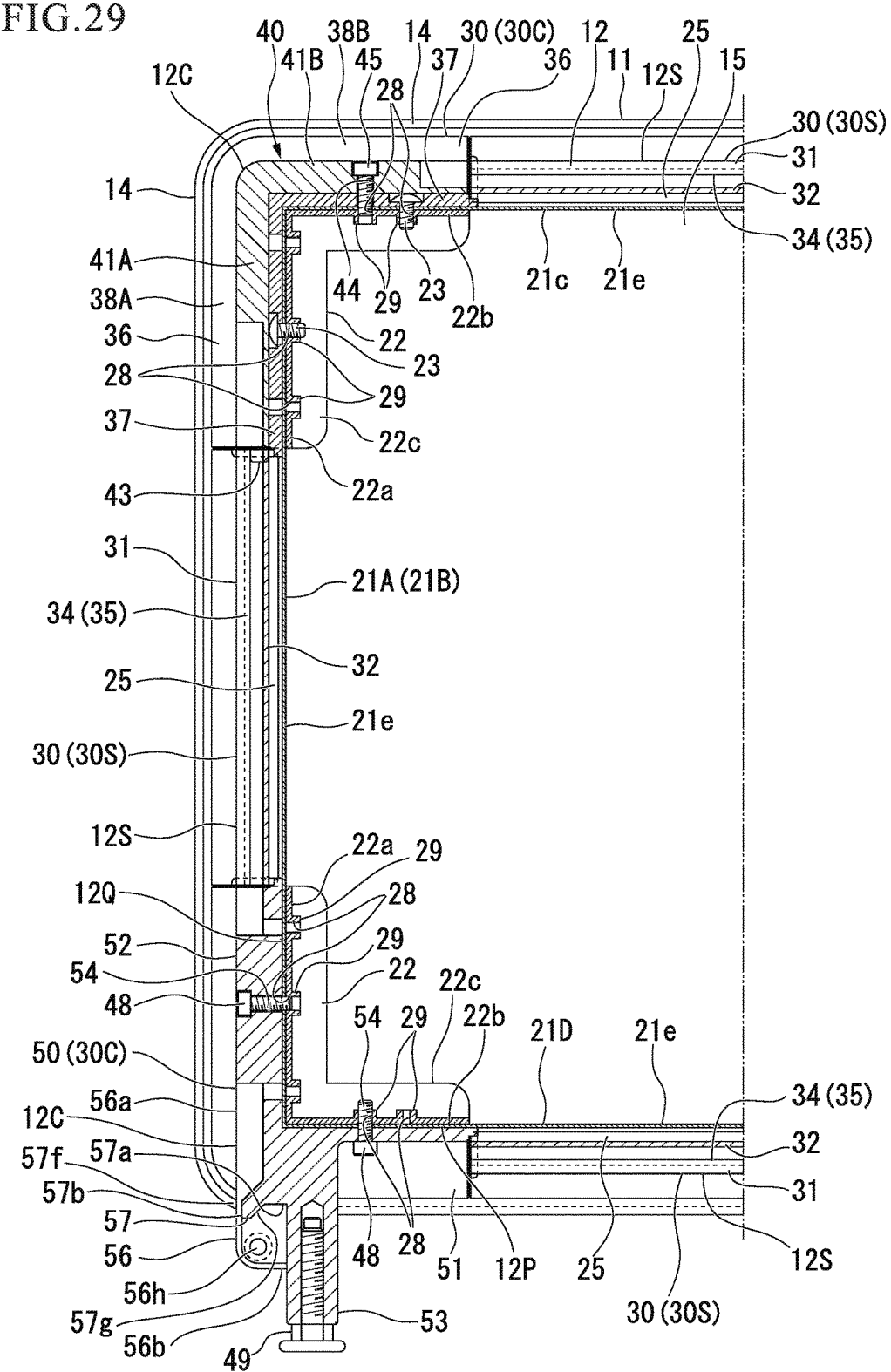
FIG. 29 is a half-sectional view of the intermediate portion in the board thickness direction of the panel body.

FIG. 2 is a perspective developed view showing the configuration of the panel body 11 in the embodiment. FIG. 29 is a half-sectional view in the intermediate portion in the board thickness direction of the panel body 11. FIG. 4 is an upper view showing the end portion of the panel body 11. FIG. 5 is a sectional view showing a structure of the straight line portion of the panel body 11. FIGS. 6A and 6B are sectional views showing structures of the corner portion of the panel body 11.

As shown in FIG. 2, each panel body 11 which configures the partition equipment 2 includes the panel base material (base material) 12; the cushion material (soft member) 13 which is provided along both surfaces of the panel base material 12; the cover material 14 which covers the panel base material 12 and the cushion material 13; and the fixing member 30.

Here, as shown in FIG. 29, in the L-shaped bracket 22, the first plate portion 22a which is provided in the end portion of the frame material 21A or 21B along the frame material 21A or 21B, the second plate portion 22b which is orthogonal to the first plate portion 22a, and is provided in the end portion of the frame material 21C or 21D along the frame material 21C or 21D, and the rib portion 22c which is provided on the inner side of the L-shaped bracket 22 in the bending direction along the first plate portion 22a and the second plate portion 22b, are integrally formed.

In the first plate portion 22a and the second plate portion 22b of the L-shaped bracket 22, the female screw hole portion 29 is formed. In the base portion 21e of the frame material 21A or 21B along the first plate portion 22a of the bracket 22, and the base portion 21e of the frame material 21C or 21D along the second plate portion 22b, through holes 28 are respectively formed at a position opposing the female screw hole portion 29. The female screw hole portion 29 and the through hole 28 are optional member attaching portions which attach various optional members which will be described later.

(Support Leg)

The support legs 50 can be respectively attached to the corner portions of both end portions of the lower portions of the panel body 11. The support legs 50 make the panel body 11 stand on the floor surface by being grounded on the floor surface.

The support leg 50 integrally includes the lower part support portion 51 which is accommodated in the groove 25 at a lower end portion 12P of the panel base material 12; the side part support portion 52 which extends upward from one end of the lower part support portion 51, and is accommodated in the groove 25 in a side part lower end portion 12Q of the panel base material 12; and the support leg portion 53 which extends further downward than the lower part support portion 51.

The lower part support portion 51 is fixed to abut against the base portion 21e which forms the bottom surface of the groove 25 of the lower end portion of the frame 20. The side part support portion 52 is fixed to abut against the base portion 21e which forms the bottom surface of the groove 25 of the side end portion of the frame 20.

In the lower part support portion 51 and the side part support portion 52, the bolt through hole 54 into which the bolt 48 is inserted is formed. The bolt 48 which is inserted into the bolt through hole 54 is screwed by the female screw hole portion 29 and the through hole 28. Accordingly, the support leg 50 is fixed to the panel body 11.

The support leg portion 53 extends further downward than the lower part support portion 51, and the height adjustment screw 49 can be screwed to the lower end portion thereof.

(Linking in Lower Portion of Panel Body)

Figure 30:
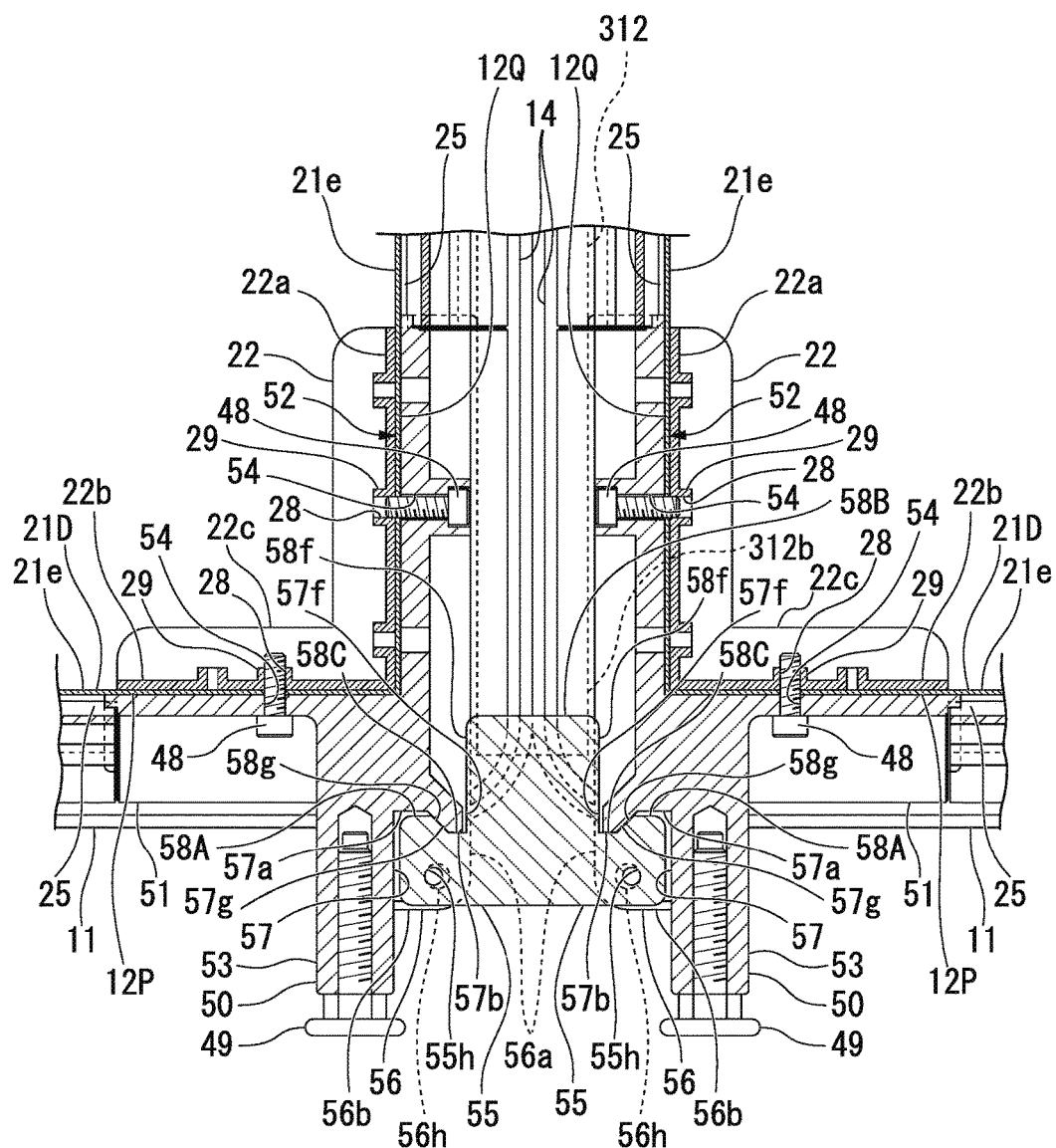
FIG. 30 is a sectional view showing a linking structure in a lower portion of the adjacent panel bodies.

FIG. 8 is a perspective view showing an example of the linking structure in the support leg 50 provided in the angle portion of the lower portion of the panel body 11. FIG. 30 is a sectional view showing the linking structure in the lower portions of the adjacent panel bodies 11 and 11.

As shown in FIGS. 8 and 30, the lower portions of the adjacent panel bodies 11 and 11 are linked to each other as follows.

As the optional member, one end of the linking member 55 that links the support leg 50 to the other panel body 11 disposed adjacent, can be locked to the support leg 50. Therefore, the bulged portion 56 which is bulged further downward than the lower part support portion 51 is integrally formed in the support leg 50.

In addition, in the bulged portion 56, the slit 57 into which one end of the plate-like linking member 55 can be inserted is formed in the intermediate portion of the support leg 50 which is along the thickness direction of the panel body 11. The slit 57 is opened to the side surface 56a and the lower surface 56b on the side adjacent to the other panel body 11 in the bulged portion 56.

As shown in FIG. 30, in the upper portion of the slit 57, the insertion recessed portion 57a into which the projection portion 58A of the linking member 55 which will be described later is inserted, is formed to be recessed upward. In the upper portion of the slit 57, on the side surface 56a side of the bulged portion 56, a projection portion 57b which is adjacent to the insertion recessed portion 57a and protrudes downward, is formed.

In the bulged portion 56, the locking hole 56h that locks the linking member 55 which is inserted into the slit 57 is formed to penetrate along the thickness direction of the panel body 11.

In both end portions of the linking member 55, the through holes 55h are respectively formed. In both end portions of the linking member 55, the projection portions 58A which protrude upward are respectively formed. In the linking member 55, the center projection portion 58B which protrudes upward is formed between the projection portions 58A and 58A of both end portions. The engagement recessed portion 58C which is recessed downward is formed between the center projection portion 58B and the projection portion 58A which is provided in both sides of the center projecting portion 58B.

In the projection portion 57b and the engagement recessed portion 58C, the side surface 56a side of the bulged portion 56 and the center projection portion 58B side are the perpendicular surfaces 57f and 58f which extend in the vertical direction, and the sides opposite thereto are the inclination surfaces 57g and 58g which are separated from the perpendicular surfaces 57f and 58f when approaching the upper part. Accordingly, the projection portion 57b and the engagement recessed portion 58C have a tapered shape of which a width dimension thereof gradually becomes smaller when approaching the lower part of any of the projection portion 57b and the engagement recessed portion 58C.

As the projection portion 57b of the slit 57 is fitted to the engagement recessed portion 58C, the linking member 55 and the support leg 50 can be easily positioned in the direction in which the panel bodies 11 and 11 are adjacent to each other.

In order to link the adjacent panel bodies 11 and 11, both end portions of the linking member 55 in which the through hole 55h is formed is inserted into the slit 57 of the support leg 50. The projection portions 57b of the support leg 50 provided in the panel bodies 11 on both sides are respectively fitted to the engagement recessed portions 58C of both end portions of the linking member 55. The projection portion 57b and the engagement recessed portion 58C have a tapered shape of which the width dimension gradually becomes smaller when approaching the lower part of any of the projection portion 57b and the engagement recessed portion 58C. Therefore, as the projection portion 57b is inserted into the engagement recessed portion 58C, the linking member 55 and the support leg 50 are respectively positioned in the direction in which the panel bodies 11 and 11 are adjacent to each other. Accordingly, the through hole 55h of the both end portions formed in the linking member 55, and the locking hole 56h of the support leg 50, communicate with each other. The linking bolt 59 is inserted and fastened to the through hole 55h and the locking hole 56h. Accordingly, the adjacent panel bodies 11 and 11 are linked in the lower end portion by the linking member 55.

(Linking in Upper Portion of Panel Body)

Figure 31:
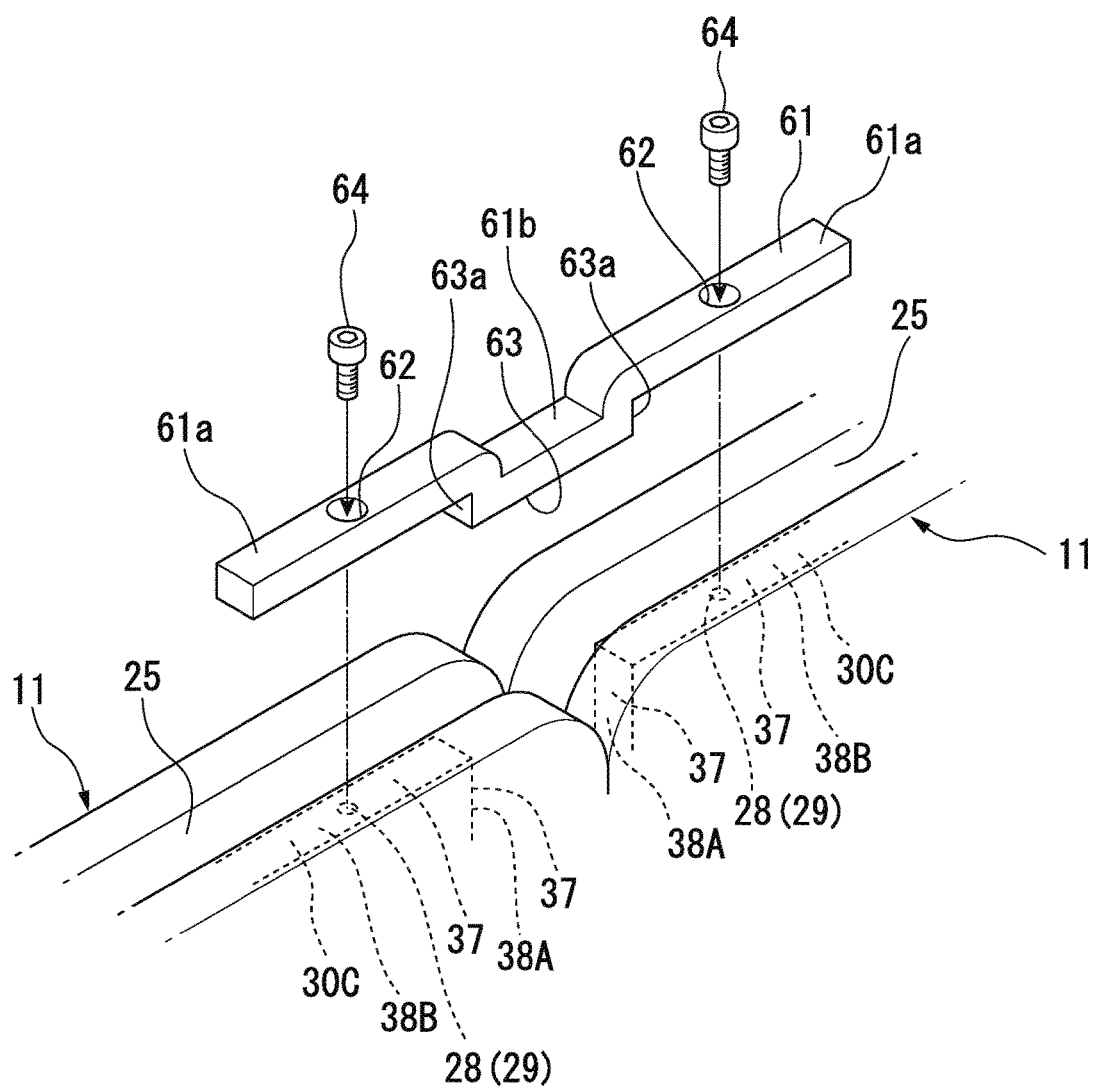
FIG. 31 is a perspective view showing an example of the linking structure in an upper portion of the adjacent panel bodies.

FIG. 31 is a perspective view showing an example of the linking structure in the upper portions of the adjacent panel bodies 11 and 11.

As shown in FIG. 31, the adjacent panel bodies 11 and 11 can respectively link the upper end portions thereof by an upper part linking member (linking member) 61.

Instead of the corner cap 40, the upper part linking member 61 is attached to the corner portion fixing member 30C. The bolt through hole 62 is formed in both end portions 61a and 61a of the upper part linking member 61.

On the lower surface side of the intermediate portion 61b of the upper part linking member 61, the interval regulation portion 63 which regulates the interval of the corner portion fixing members 30C and 30C which are disposed on the upper portions of the adjacent panel bodies 11 and 11, is formed to protrude downward. As the interval regulation portion 63 is inserted between the corner portion fixing members 30C and 30C which are disposed in the upper portions of the adjacent panel bodies 11 and 11, it is possible to regulate the interval between the adjacent panel bodies 11 and 11.

The upper end portions of the adjacent panel bodies 11 and 11 are linked by the upper part linking member 61 as follows.

First, the upper part linking member 61 is loaded onto the corner portion fixing members 30C and 30C which are disposed in the upper portions of the adjacent panel bodies 11 and 11. At this time, the lower surfaces of both end portions 61a and 61a of the upper part linking member 61 are inserted between the side part plate portions 36 and 36, and abut against the linking plate portion 37, with respect to the second straight line-like portion 38B of the corner portion fixing member 30C. As the interval regulation portion 63 is inserted between the corner portion fixing members 30C and 30C which are disposed in the upper portions of the adjacent panel bodies 11 and 11, it is possible to regulate the interval between the adjacent panel bodies 11 and 11. More specifically, as both side surfaces 63a and 63a of the interval regulation portion 63 abut against the linking plate portion 37 of the first straight line-like portion 38A of the corner portion fixing member 30C, it is possible to appropriately position the interval between the adjacent panel bodies 11 and 11. In this state, the upper part linking member 61, the corner portion fixing member 30C, the frame material 21C (refer to FIG. 5), and the second plate portion 22b (refer to FIG. 5) of the bracket 22, are integrally fastened by fastening the bolt 64 which is inserted into the bolt through hole 62 with the female screw hole portion 29 through the through hole 28. Accordingly, the upper end portions of the adjacent panel bodies 11 and 11 are linked.

(Desk)

Next, a linking structure of the desk 3 and the panel body 11 will be described.

As shown in FIGS. 26 to 28, the desk 3 includes the top board 300 having a work surface on an upper surface thereof; and a support leg 302 which supports the top board 300 on a front end side (a side on which the user of the desk 3 sits on a chair which is not shown, and which opposes the desk 3) of the top board 300.

The partition equipment 2 provided with the plurality of panel bodies 11 as described above has a substantial U shape in a plan view to surround a rear surface side 300a and both side surfaces 300b of the top board 300. In addition, the top board 300 is linked to the apparatus main body 2 as follows.

(Linking Structure of Desk and Panel Body)

Figure 32:
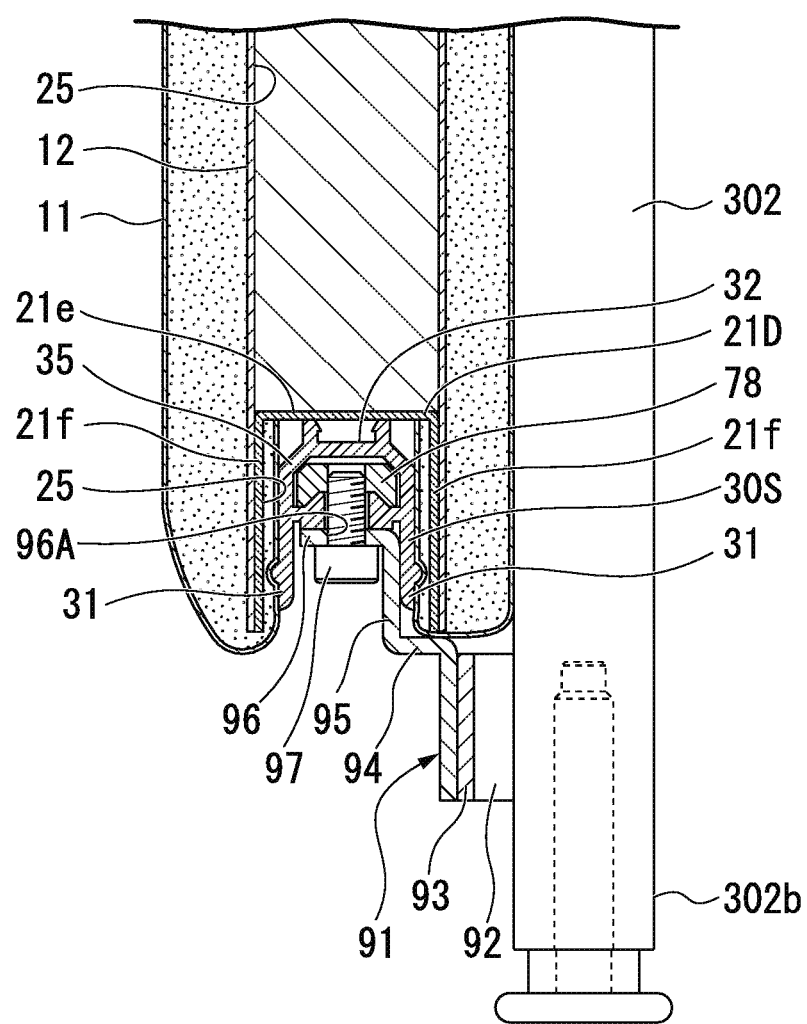
FIG. 32 is an elevation sectional view showing a structure of a linking part between a front portion of a top board and the panel body.
Figure 33:
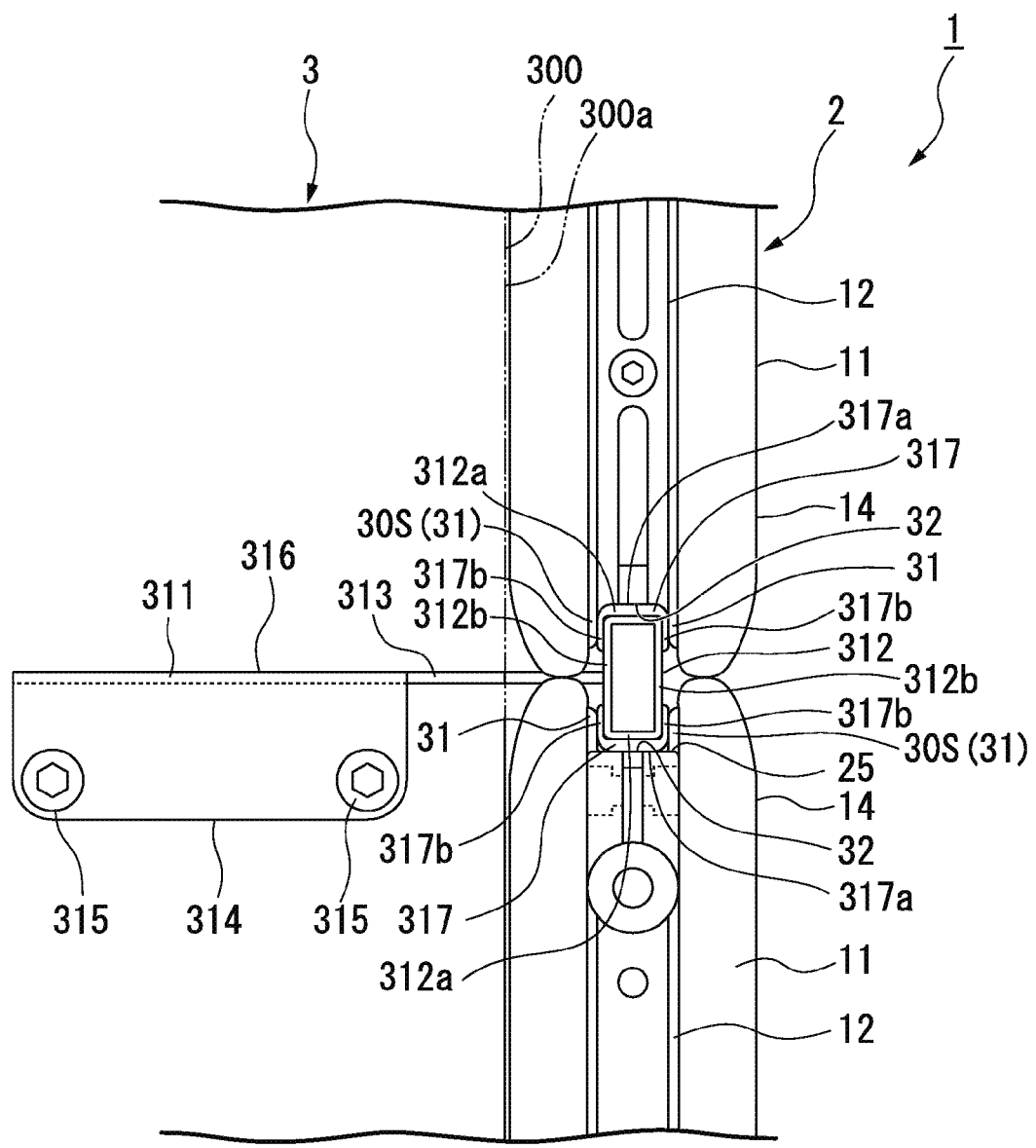
FIG. 33 is a planar sectional view showing a structure of a linking part between a rear portion of the top board and the panel body.

FIG. 32 is an elevation sectional view showing a structure of a linking part between a front portion of the top board 300 and the panel body 11. FIG. 33 is a planar sectional view showing a structure of a linking part between a rear portion of the top board 300 and the panel body 11.

As shown in FIGS. 27 and 28, in the support leg 302 provided in the front end portion of the top board 300, an upper end portion 302a is fixed to a lower surface of the top board 300 by a bolt 303 (refer to FIG. 27) which is not illustrated. A lower end portion 302b of the support leg 302 is grounded on the floor surface.

As shown in FIGS. 28 and 32, the lower end portion of the support leg 302 is fixed to the lower portion of the panel body 11 via a support leg linking bracket (bracket) 91.

The support leg linking bracket 91 includes a fixing portion 92 which is integrally fixed with a side surface of the lower end portion of the support leg 302 by welding or the like; and an extending portion 93 which extends from an end portion of the fixing portion 92. The support leg linking bracket 91 further includes a lower end wall 94 which is curved in the horizontal direction from an upper end portion of the extending portion 93, and is disposed along the lower end portion of the panel body 11; a side wall portion 95 which extends upward from the lower end wall 94, and extends along the side part plate portion 31 of the straight line part fixing member 30S provided in the groove 25 of the panel base material 12; and a locking portion 96 which extends in the horizontal direction from an upper end of the side wall portion 95.

In the locking portion 96, a through hole 96A is formed. A bolt 97 which is inserted from the through hole 96A is provided in the holding groove 35 of the straight line part fixing member 30S fixed to the frame material 21D of the panel body 11, and is screwed to the base portion 78 on which the female screw is formed. The base portion 78 can move to an arbitrary position along the holding groove 35 of the straight line part fixing member 30S. In other words, accordingly, in the support leg 302, the support leg linking bracket 91 of the lower end portion can be fixed at the arbitrary position of the panel body 11.

According to this, by the support leg linking bracket 91 which is fixed to the lower portion of the panel body 11, the support leg 302 is held. Since the lower end portion of the support leg 302 can move to the arbitrary position of the panel body 11, it is possible to change the attachment position of the support leg 302 in accordance with the length in the longitudinal direction of the panel body 11 or the top board 300.

As shown in FIGS. 27, 28, and 33, the rear surface side 300a of the top board 300 is supported by the panel body 11 by the top board attaching member 311 provided in the partition equipment 2.

The top board attaching member 311 is provided in the linking portion of two panel bodies 11 and 11 which are disposed to be adjacent to each other so that the grooves 25 and 25 of the outer circumferential end portion in the partition equipment 2 oppose each other.

Here, as shown in FIG. 33, in a state of being linked via the linking member 55 on the lower part (refer to FIGS. 8 and 30) and the upper part linking member 61 (refer to FIG. 31) at the linking part of the adjacent panel bodies 11 and 11, the end portion of the panel body 11, that is, the cover materials 14 and 14 of the surface of the adjacent panel bodies 11 and 11 abut against each other.

The top board attaching member 311 includes a tube-like member (rod) 312 having an angular cylindrical section which is continuous in the vertical direction along the outer circumferential end portion of the panel body 11; and a support bracket 316 which extends from the tube-like member 312.

At the linking part of the panel bodies 11 and 11, the tube-like members 312 extends in the direction along the groove 25 of one panel body 11 and the groove 25 of the other panel body 11 among the adjacent panel bodies 11 and 11, and is disposed in the grooves 25 and 25. For example, the tube-like member 312 is fitted between the linking plate portion 32 and the side part plate portions 31 and 31 which are respectively provided in the grooves 25 and 25 of the adjacent panel bodies 11 and 11, in the straight line part fixing member 30S.

As shown in FIG. 28, in the tube-like member 312, spacers 317 which are formed of a resin or the like are mounted in the upper end portion and in the intermediate portion. As shown in FIG. 33, the spacers 317 are respectively interposed between the tube-like member 312, and the grooves 25 and 25 of the panel bodies 11 and 11 on both sides.

The spacer 317 has a U-shaped section which is made of, for example, a base portion 317a, and side portions 317b and 317b which extend to be orthogonal from both end portions of the base portion 317a. The base portion 317a of the spacer 317 is nipped between the bottom surface of the groove 25 and a side end surface 312a of the tube-like member 312. The side portion 317b of the spacer 317 is nipped between the side surface of the groove 25 and a front/rear surface 312b of the tube-like member 312.

By the spacer 317, rattling of the tube-like member 312 in the groove 25 is prevented, and the tube-like member 312 is tightly fitted to the groove 25.

In this manner, the tube-like member 312 is fitted into the groove 25 of one panel body 11 and the groove 25 of the other panel body 11 among the adjacent panel bodies 11 and 11 and the tube-like member 312 links the adjacent panel bodies 11 and 11.

As shown in FIG. 30, in the tube-like member 312, the lower end portion of the front/rear surface 312b is linked to the center projection portion 58B of the linking member 55. The linking members 55 are linked to the support legs 50 which are respectively provided in the panel bodies 11 and 11 on both sides. Therefore, the tube-like member 312 is indirectly supported by the floor surface via the support leg 50.

As shown in FIGS. 27, 28, and 33, in the support bracket 316, a protrusion portion 313 and a support board portion 314 are integrally provided.

The protrusion portion 313 extends from the tube-like member 312, and is integrally provided with the tube-like member 312 to protrude in the direction (outward) orthogonal to the surface of the panel body 11 through the void of the linking part of the two adjacent panel bodies 11 and 11. As shown in FIG. 33, in the outer circumferential portion of the panel body 11, the cover material 14 which covers the panel base material 12 and the cushion material 13 goes around the outer circumferential edge portion of the panel base material 12 and is caught in the groove 25. Accordingly, the cover materials 14 and 14 on the surface of the two adjacent panel bodies 11 and 11 abut against each other. In addition, the protrusion portion 313 of the support bracket 316 protrudes in the direction orthogonal to the surface of the panel body 11 from between the cover materials 14 and 14 which abut against each other. Accordingly, the tube-like member 312 is not exposed by the cover materials 14 and 14.

The support board portion 314 extends in the horizontal direction being curved from the upper end of the protrusion portion 313, and is provided along the lower surface of the top board 300. The article is attachable to the support board portion 314, and in the embodiment, the article is fixed to the lower surface of the top board 300 by a bolt (refer to FIG. 27) 315 or the like.

In the above-described partition equipment 2, the tube-like member 312 of the top board attaching member 311 is fitted to the groove 25 of one panel body 11 and the groove 25 of the other panel body 11 among the adjacent panel bodies 11 and 11. Accordingly, it is possible to suppress the exposure of the tube-like member 312 from the void of the two adjacent panel bodies 11 and 11 to the minimum. By supporting the article by the support bracket 316 which extends from the tube-like member 312, it is possible to attach the optional member or other articles to the partition equipment 2.

In this manner, it is not necessary to provide the support column including the locking groove or the locking slit for attaching the optional member or other articles, on the surface of the panel body 11. According to this, it is possible to prevent the appearance of the partition equipment 2 and the furniture system 1 from being damaged. Furthermore, the partition equipment 2 which is light in weight, simple in structure, and inexpensive, can be achieved.

The protrusion portion 313 of the support bracket 316 protrudes from between the cover materials 14 and 14 which abut against each other. Accordingly, at the linking part of the adjacent panel bodies 11 and 11, the tube-like member 312 is not exposed. Therefore, the appearance of the partition equipment 2 and the furniture system 1 is further improved.

The top board attaching member 311 is a separated body from the panel body 11. Therefore, even at the linking part of the adjacent panel bodies 11 and 11, in the location where the top board attaching member 311 is not used, the top board attaching member 311 is not necessary. Accordingly, the panel body 11 can be simply configured since it is light in weight, and can be easily handled.

Furthermore, the lower end portion of the tube-like member 312 is indirectly supported by the support leg 50. Accordingly, the load of the top board 300 supported by the support bracket 316 is transmitted to the support leg 50 via the tube-like member 312. Therefore, it is possible to reduce the load of the top board 300 supported by the panel body 11. Accordingly, it is possible to reduce the strength and the weight of the panel body 11, and to simplify the configuration of the panel body 11.

Furthermore, the two adjacent panel bodies 11 and 11 are linked via the tube-like member 312 which is provided with the spacer 317 and is fitted to the groove 25. Since the tube-like member 312 is continuous to the outer circumferential end portion of the panel body 11, the adjacent panel bodies 11 and 11 are linked in a line-like region along the outer circumferential end portion. Accordingly, it is possible to firmly link the outer circumferential end portion of the two adjacent panel bodies 11 and 11.

Furthermore, according to the above-described panel body 11, the cover material 14 which covers the panel base material 12 and the cushion material 13 goes around the outer circumferential edge portion of the panel base material 12 and is caught in the groove 25, in the outer circumferential portion of the panel body 11. Therefore, the outer circumferential portion of the panel body 11 is covered by the cover material 14 without exposing the panel base material 12.

Furthermore, since the cover material 14 is fixed by the fixing member 30 in the groove 25, it is possible to prevent the fixing member 30 from being exposed to the outer circumferential portion of the panel body 11. Accordingly, the appearance of the panel body 11 can make a soft and organic impression.

In the embodiment, characteristics or effects of the same parts as those in the first embodiment, are similar to the characteristics or effects of the first embodiment.

Other Embodiments

The present invention is not limited to each of the above-described embodiments described with reference to the drawings, and various modified examples are considered within a technical range of the present invention.

For example, in the above-described embodiments, the groove 25 is formed across the entire outer circumferential portion of the panel base material 12, but the invention is not limited thereto. The groove 25 may be provided at least at a part of the outer circumferential portion of the panel base material 12, at least the cover material 14 may be caught in the groove 25. For example, the bottom portion or the like of the panel base material 12 may not be provided with the groove 25, and may press and fix the outer circumferential end portion 14e of the cover material 14 by a general frame or the like.

As an example of the fixing member which fixes the cover material 14 in the groove 25, the fixing member 30 is described. However, if the cover material 14 can be fixed, any configuration element may be employed. For example, the sectional shape or the structure of the fixing member 30 is not particularly limited. Furthermore, the cover material 14 may be fixed to the inside of the groove 25 by tacking or by adhering.

In the above-described embodiment, the elastic cushion material 14 is described as an example of the soft material, but the soft material may not have elasticity and have at least softness.

Furthermore, in the above-described embodiment, the panel base material 12 is formed of the core material 15, the frame 20, and the base sheet 18, but the invention is not limited thereto. For example, if the required strength can be ensured by a single body, for example, the panel which is made of a resin material or the like may be used as the panel base material 12, and the groove 25 may be formed on the outer circumferential portion. In addition, the base material can be made of a member or the like which configures the outer surface of various types of furniture. Accordingly, an uneven portion can be formed on the surface of the furniture, and the design can be improved.

Figure 12A:
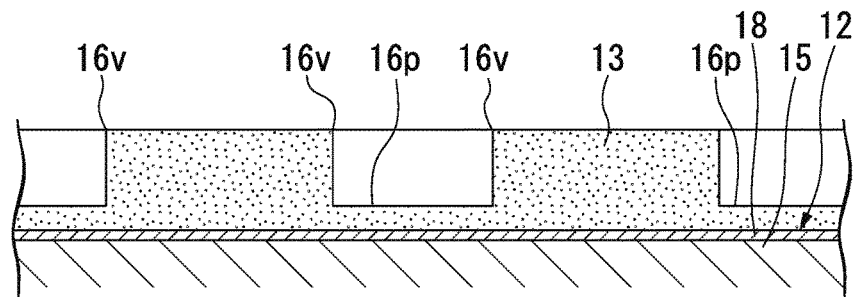
FIG. 12A is an example in which a recessed portion is formed in the cushion material, in a sectional view showing a plurality of modification examples of uneven shapes in the embodiment.
Figure 12B:
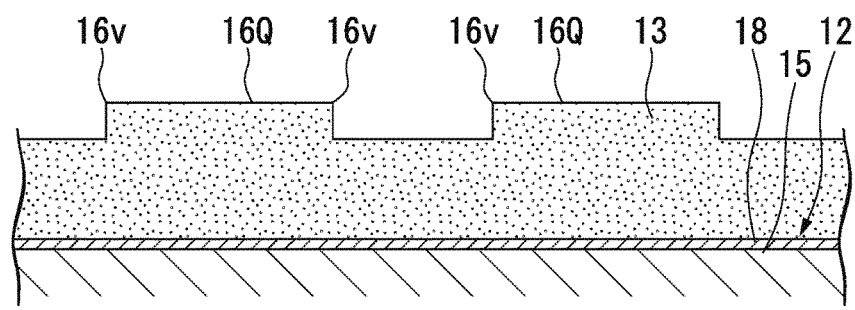
FIG. 12B is an example in which a projected portion is formed in the cushion material, in the sectional view showing the plurality of modification examples of uneven shapes in the embodiment.
Figure 12C:
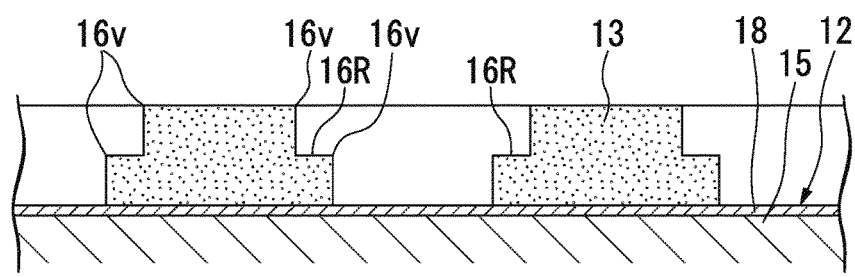
FIG. 12C is an example in which a step portion is formed in the cushion material, in the sectional view showing the plurality of modification examples of uneven shapes in the embodiment.
Figure 12D:
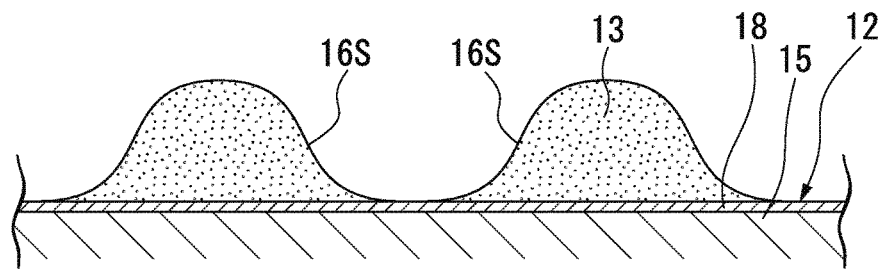
FIG. 12D is a view showing an example in which the uneven shape is a curved shape, in the sectional view showing the plurality of modification examples of uneven shapes in the embodiment.

In the above-described embodiment, the through hole 16 is formed in the cushion material 13 for forming the uneven shape on the surface of the panel base material 12, but the invention is not limited thereto. For example, as shown in FIGS. 12A to 12C, in the cushion material 13, a non-penetrating recessed portion 16P (refer to FIG. 12A), a projected portion 16Q (refer to FIG. 12B), and a step portion 16R (refer to FIG. 12C) may be formed. Furthermore, the sectional shape of the uneven shape may also be any shape, and for example, as shown in FIG. 12D, a curved projected portion 16S or the like may be employed.

In addition, in the above-described embodiment, the through hole 16 which forms the uneven shape is, for example, an oval shape of which the vertical direction is the long axial direction. However, other than the oval shape, a circular shape or a polygonal shape, or other shapes, such as company logo, may be employed.

Furthermore, in the above-described embodiment, as the inner circumferential surface 16f is orthogonal to the outer surface 13f, the through hole 16 forms the angle portion 16v in the outer circumferential edge portion. However, the inner circumferential surface 16f and the outer surface 13f may be inclined and intersect each other.

In addition, in the above-described embodiment, the outer circumferential end portions 13e and 14e of the cushion material 13 and the cover material 14 go around the side wall portion 21f of each of the frame materials 21A, 21B, 21C, and 21D which configures the panel base material 12, and are caught in the groove 25. However, by making the cushion material 13 smaller than the outer circumferential dimension of the panel base material 12, only the cover material 14 may be caught in the groove 25.

In the above-described embodiment, the cushion material 13 and the cover material 14 are respectively provided on both surfaces of the panel base material 12, but the cushion material 13 or the cover material 14 on both surfaces of the panel base material 12 may be integrated in a shape of a bag. In this case, the part of the cushion material 13 and the cover material 14 which has a shape of a bag may be pushed into the groove 25.

Figure 13:
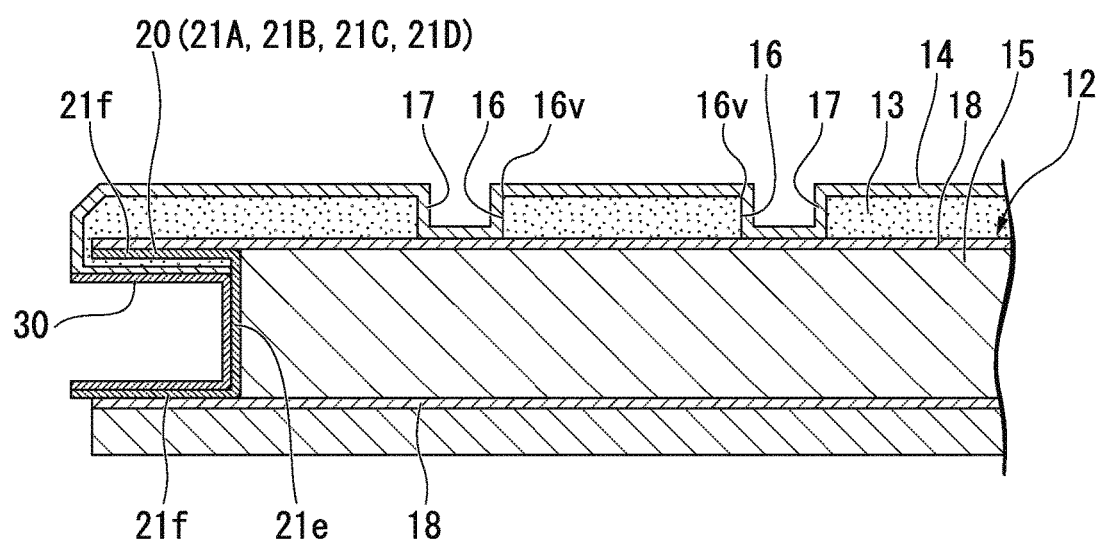
FIG. 13 is a view showing a modification example of the panel body in the embodiment, and is a sectional view showing an example in which the uneven shape is formed only on one surface side of the base material.

Furthermore, the cover structure described in the above-described embodiment is not limited to being formed on both surfaces of the panel base material 12, and as shown in FIG. 13, the cover structure may be formed only one surface side of the panel base material 12.

In the above-described embodiment, the support leg 50 is provided in the panel body 11, but if the panel body 11 is fixed to the furniture or the like by other brackets or the like, it is not necessary to provide the support leg 50.

In the embodiment, the cushion material 13 and the cover material 14 are provided, but the cushion material 13 and the cover material 14 are not necessary configuration elements.

Furthermore, the cushion material 13 described in the above-described embodiment is not limited to be formed on both surfaces of the panel base material 12, and as shown in FIG. 13, the cushion material 13 may be formed only on one surface side of the panel base material 12. Furthermore, the cushion material 13 may not be provided.

In the embodiment, in the fixing member 30, the accommodation space in which the residual portion of the outer circumferential end portions 13e and 14e of the cushion material 13 and the cover material 14 is formed, but the accommodation space is not a necessary configuration element.

Furthermore, in the fixing member 30, the corner portion fixing member 30C and the straight line part fixing member 30S are separately provided, but the corner portion fixing member 30C and the straight line part fixing member 30S may be integrally provided.

For example, in the above-described embodiment, the furniture upper linking member 71 attaches the sofa 100 to the panel body 11 as the optional member, but other equipment, such as a top board of a table, an illumination apparatus, or a shelf board, are employed as the optional member.

In the above-described embodiment, the furniture upper linking member 71 is provided in one groove 25 of one of the two adjacent panel bodies 11 and 11, and is taken out to the surface of the panel body 11 from between the panel bodies 11 and 11. However, the object to which the panel body 11 is attached is not limited to the panel body 11, one panel body 11 may be attached to a member, such as a wall or a side board of the shelf board of the selves 120, and the furniture upper linking member 71 may be taken out to the surface of the panel body 11 from the attached part.

The furniture upper linking member 71 is provided between the adjacent panel bodies 11 and 11 in the lateral direction, and not only that, the furniture upper linking member 71 may be provided between the adjacent panel bodies 11 and 11 in the vertical direction.

For example, in the above-described embodiment, the groove 25 is formed across the entire outer circumferential portion of the panel base material 12, but not being limited thereto, the groove 25 which makes the tube-like member 312 fitted to at least a part of the circumferential direction may be formed.

The tube-like member 312 is configured to be indirectly supported by the support leg 50 via the linking member 55, but the invention is not limited thereto. The tube-like member 312 may be configured to be directly supported by the support leg 50. Furthermore, the tube-like member 312 may be grounded on the floor surface without using the support leg 50, and may be directly supported by the floor surface.

The two adjacent panel bodies 11 and 11 are configured to be linked via the tube-like member 312 which is provided with the spacer 317 fitted to the groove 25, but the invention is not limited thereto. A configuration in which the spacer 317 is not provided, or a configuration in which clearance between the spacer 317, and the groove 25 or the tube-like member 312 is large, may be employed. In this case, the two adjacent panel bodies 11 and 11 are not linked via the tube-like member 312, but linked by the linking member 55 on the lower part or the upper part linking member 61.

In the above-described embodiment, the support leg 302 which supports the front end side of the top board 300 of the desk 3 is fixed to the lower portion of the panel body 11 via the support leg linking bracket 91, but the invention is not limited thereto. For example, the support leg 302 may independently stand from the floor surface without being fixed to the lower portion of the panel body 11. In a case where the linking part of the panel bodies 11 and 11 is in the vicinity of the support leg 302, the support leg 302 may be supported by the tube-like member 312 provided between the panel bodies 11 and 11.

In the above-described embodiment, the partition equipment 10 is provided along the rear surface side of the sofa 100, but the invention is not limited thereto. The partition equipment 10 may be provided to be assembled to a desk, a table, a counter, shelves, or a chair, other than the sofa 100. Furthermore, the partition equipment 10 may be free-standing on the floor surface by the support leg 50. The partition equipment 10 may be fixed and provided by the bracket or the like which is not shown, in construction, such as a wall or a column.

In the above-described embodiment, the partition equipment 2 is provided along the top board 300 of the desk 3, but the invention is not limited thereto. In addition to the desk 3, the partition equipment 2 may be provided being combined with various types of furniture, such as a table, a counter, or shelves.

In addition to this, it is possible to select a configuration described in the above-described embodiments, or to appropriate change the configuration to other configurations without departing from the scope of the present invention.

INDUSTRIAL APPLICABILITY

According to the present invention, the appearance of the panel body can make a softer impression.

REFERENCE SIGNS LIST

1 FURNITURE SYSTEM
2, 10, 110 PARTITION EQUIPMENT
3 DESK
11 PANEL BODY, OBJECT
11s OUTER CIRCUMFERENTIAL END PORTION
12 PANEL BASE MATERIAL (BASE MATERIAL)
13 CUSHION MATERIAL (SOFT MATERIAL)
13e, 14e OUTER CIRCUMFERENTIAL END PORTION
13t PROTRUSION PORTION
14 COVER MATERIAL
15 CORE MATERIAL
15a OUTER CIRCUMFERENTIAL END SURFACE
15h HOLE
16 THROUGH HOLE
16v ANGLE PORTION
16f INNER CIRCUMFERENTIAL SURFACE
17 RECESSED PORTION
18 BASE SHEET
20 FRAME
21A, 21B, 21C, 21D FRAME MATERIAL
25 GROOVE
30 FIXING MEMBER (FIXING MEANS)
30C CORNER PORTION FIXING MEMBER
30S STRAIGHT LINE PART FIXING MEMBER
31 SIDE PART PLATE PORTION

32 LINKING PLATE PORTION
33 PROJECTION (PROJECTED PORTION)
50 SUPPORT LEG
51 LOWER PART SUPPORT PORTION
52 SIDE PART SUPPORT PORTION
53 SUPPORT LEG PORTION
55 LINKING MEMBER
58B CENTER PROJECTION PORTION
57 SLIT
61 UPPER PART LINKING MEMBER
71 FURNITURE UPPER LINKING MEMBER (BRACKET)
72 LOCKING PORTION (ATTACHING PORTION)
100 SOFA
120 SELVES (FURNITURE, OBJECT)
300 DESK TOP BOARD (ARTICLE)
311 TOP BOARD ATTACHING MEMBER (ARTICLE ATTACHING MEMBER)
312 TUBE-LIKE MEMBER (ROD)
312b LOWER END PORTION
316 SUPPORT BRACKET
K VOID PORTION
S1 SPACE
S2 SPACE

The invention claimed is:

1. A panel body comprising:
a panel base material;
a groove which is continuous along at least a part of an outer circumferential end portion of the base material, and is recessed to an inside of the base material;
a resiliently compressible material which is provided on an outer surface of the base material;
a cover material which covers the base material and the soft material, an outer circumferential end portion of the cover material being secured in the groove in the outer circumferential edge portion of the base material; and
a fixing member which fixes the cover material in the groove, wherein the cover material and the resiliently compressible material wrap around a distal end of the outer circumferential end portion of the base material and are clamped between an inner circumferential surface of the groove and an outer circumferential surface of the fixing member.

2. The panel body according to claim 1,
wherein the resiliently compressible material forms an uneven shape on the outer surface of the base material, and
wherein the cover material forms an unevenness portion along the uneven shape by covering the base material and the resiliently compressible material.

3. The panel body according to claim 2,
wherein the resiliently compressible material has elasticity and forms the uneven shape having an angle portion on the outer surface of the base material, and
wherein the cover material applies a compressive force on the angle portion and elastically deforms the angle portion in a direction of compression, and covers the resiliently compressible material and the base material.

4. The panel body according to claim 1,
wherein the cover material is nipped by an inner circumferential surface of the groove and the fixing member.

5. The panel body according to claim 4,
wherein the fixing member forms an accommodation space in which a residual portion of the outer circumferential end portion of the cover material is accommodated between the fixing member and the groove.

6. A panel unit comprising:
the panel body according to claim 1 wherein the panel base material includes a panel core material and the resiliently compressible material is provided along an outer surface of the core material and forms a protrusion portion which protrudes from an edge portion of the core material; and a linking member which fixes an object to the panel body such that the protrusion portion of the resiliently compressible material of the panel body abuts against the object, wherein the protrusion portion is an edge portion of the resiliently compressible material.

7. The panel unit according to claim 6,
wherein the resiliently compressible material is also provided on a surface opposite to the outer surface of the core material.

8. The panel body according to claim 1 provided with a bracket attaching structure which attaches a bracket to the panel base material for attaching an object to the panel body,
wherein the groove is recessed to the inside of the base material from a side surface of the base material opposing the object,
wherein a void portion which communicates with the groove from a side of the the outer surface of the base material is formed between the side surface of the base material and the object, and
wherein the bracket passes through the void portion from the inside of the groove, and is disposed on the outer surface of the base material.

9. The panel body according to claim 8,
wherein the bracket includes an attachment portion which is attached to a wall surface of the groove.

10. The panel body according to claim 8,
wherein the void portion is formed on an opposite surface side opposite to the one or more surfaces of the base material.

11. A partition equipment assembly comprising:
a plurality of the panel bodies according to claim 1 which include the panel base material, and the groove which is provided along at least at the part of the outer circumferential end portion of the base material, and is recessed to the inside of the base material; and
an article attaching member provided between two of the plurality of the panel bodies which are adjacent to each other so that the grooves oppose each other, and to which an article can be attached,
wherein the article attaching member includes a rod which extends along and is disposed in the groove of one of the adjacent panel bodies, and a support bracket which extends from the rod protrudes outwardly from between the two adjacent panel bodies, and supports the article.

12. The partition equipment according to claim 11,
wherein a lower end portion of the rod is directly or indirectly supported by a floor surface.

13. The panel body according to claim 2,
wherein the resiliently compressible material forms an uneven shape on the surface of the base material, and
wherein the cover material forms an unevenness portion along the uneven shape by covering the base material and the resiliently compressible material.

14. The panel body according to claim 9,
wherein the void portion is formed on an opposite surface side opposite to the outer surface of the base material.

* * * * *